United States Patent
Chen et al.

(10) Patent No.: US 9,924,174 B2
(45) Date of Patent: Mar. 20, 2018

(54) IMAGE-ENCODING METHOD AND A DEVICE THEREFOR, AND IMAGE-DECODING METHOD AND A DEVICE THEREFOR

(71) Applicant: SAMSUNG ELECTRONICS CO., LTD., Suwon-si (KR)

(72) Inventors: Jianle Chen, Suwon-si (KR); Jae-chool Lee, Suwon-si (KR); Sang-rae Lee, Suwon-si (KR); Min-su Cheon, Suwon-si (KR); Kyo-hyuk Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/604,286

(22) Filed: Jan. 23, 2015

(65) Prior Publication Data

US 2015/0146796 A1 May 28, 2015

Related U.S. Application Data

(63) Continuation of application No. 12/997,747, filed as application No. PCT/KR2009/002942 on Jun. 3, 2009, now abandoned.

(Continued)

(30) Foreign Application Priority Data

Oct. 20, 2008 (KR) .................. 10-2008-0102464
May 11, 2009 (KR) .................. 10-2009-0040890

(51) Int. Cl.
 *H04N 19/172* (2014.01)
 *H04N 19/91* (2014.01)
(Continued)

(52) U.S. Cl.
 CPC ........ *H04N 19/172* (2014.11); *H04N 19/129* (2014.11); *H04N 19/13* (2014.11);
(Continued)

(58) Field of Classification Search
 None
 See application file for complete search history.

(56) References Cited

U.S. PATENT DOCUMENTS 5,822,000 A 10/1998 Yoon
6,522,694 B1 2/2003 Ryan
(Continued)

FOREIGN PATENT DOCUMENTS

CN 1650636 A 8/2005
CN 1719904 A 1/2006
(Continued)

OTHER PUBLICATIONS

Wiegand et al. ("Overview of H.264/AVC Video Coding Standard" IEEE Trans on Circuits and system for video technology, Vo. 13, No. 17, Jul. 2003).*

(Continued)

*Primary Examiner* — Kato Luo
(74) *Attorney, Agent, or Firm* — Sughrue Mion, PLLC

(57) ABSTRACT

An image encoding method is provided, in which image data divided into basic blocks is classified in units of groups and subgroups, wherein each group comprises at least one basic block and each subgroup comprises at least one basic block and is included in each group; an encoding mode for a predetermined group is determined in order to encode the predetermined group, wherein the encoding mode represents a mode for encoding data included in the predetermined group in units of one data processing unit selected from a group, a subgroup, and a basic block; and the data of the predetermined group is encoded according to the determined (Continued)

encoding mode. Detailed operations in the image encoding method are performed in consideration of the encoding mode of the group.

6 Claims, 50 Drawing Sheets

Related U.S. Application Data

(60) Provisional application No. 61/082,338, filed on Jul. 21, 2008, provisional application No. 61/061,175, filed on Jun. 13, 2008.

(51) Int. Cl.
  *H04N 19/13* (2014.01)
  *H04N 19/184* (2014.01)
  *H04N 19/70* (2014.01)
  *H04N 19/129* (2014.01)
  *H04N 19/174* (2014.01)

(52) U.S. Cl.
  CPC ......... *H04N 19/174* (2014.11); *H04N 19/184* (2014.11); *H04N 19/70* (2014.11); *H04N 19/91* (2014.11)

(56) References Cited

U.S. PATENT DOCUMENTS

| | | | |
|---|---|---|---|
| 7,865,027 B2 | 1/2011 | Kim | |
| 8,081,678 B2 | 12/2011 | Lu et al. | |
| 9,532,068 B2 | 12/2016 | Sato et al. | |
| 2001/0046326 A1* | 11/2001 | Felts | H04N 19/647 382/240 |
| 2002/0036717 A1* | 3/2002 | Abiko | H04N 19/61 348/700 |
| 2003/0007698 A1* | 1/2003 | Govindaswamy | H04N 19/176 382/250 |
| 2003/0063809 A1* | 4/2003 | Andrew | G06T 9/007 382/240 |
| 2003/0202602 A1 | 10/2003 | Apostolopoulos et al. | |
| 2004/0218675 A1 | 11/2004 | Kim et al. | |
| 2004/0228415 A1* | 11/2004 | Wang | H04N 19/86 375/240.29 |
| 2005/0089094 A1 | 4/2005 | Yoo et al. | |
| 2005/0099869 A1 | 5/2005 | Crinon et al. | |
| 2005/0117646 A1* | 6/2005 | Joch | H04N 19/51 375/240.16 |
| 2005/0249291 A1* | 11/2005 | Gordon | H04N 19/159 375/240.18 |
| 2006/0008007 A1 | 1/2006 | Olivier et al. | |
| 2006/0078051 A1* | 4/2006 | Liang | H04N 19/176 375/240.24 |
| 2006/0098884 A1 | 5/2006 | Kim | |
| 2007/0058715 A1 | 3/2007 | Kim et al. | |
| 2007/0064803 A1* | 3/2007 | Miao | H04N 19/56 375/240.16 |
| 2007/0183496 A1* | 8/2007 | Kadono | H04N 19/176 375/240.08 |
| 2007/0189392 A1 | 8/2007 | Tourapis et al. | |
| 2007/0237240 A1* | 10/2007 | Lee | H04N 19/33 375/240.24 |
| 2007/0263727 A1 | 11/2007 | Sekiguchi et al. | |
| 2008/0002769 A1* | 1/2008 | Matsui | H04N 19/61 375/240.13 |
| 2008/0111721 A1* | 5/2008 | Reznik | H03M 7/40 341/67 |
| 2008/0310512 A1* | 12/2008 | Ye | H04N 19/197 375/240.16 |

FOREIGN PATENT DOCUMENTS

| | | | | |
|---|---|---|---|---|
| CN | 1929613 A | 3/2007 | | |
| EP | 2 369 846 A1 | 9/2011 | | |
| EP | 2369846 A1 * | 9/2011 | .......... | H04N 19/176 |
| JP | 9-200777 A | 7/1997 | | |
| JP | 11-164305 A | 6/1999 | | |
| JP | 2000-32461 A | 1/2000 | | |
| JP | 2002513251 A | 5/2002 | | |
| JP | 2003-319394 A | 11/2003 | | |
| JP | 2004-254327 A | 9/2004 | | |
| JP | 2005-130509 A | 5/2005 | | |
| JP | 2006-54846 A | 2/2006 | | |
| JP | 2006-148892 A | 6/2006 | | |
| JP | 2007-243427 A | 9/2007 | | |
| JP | 2007-528675 A | 10/2007 | | |
| JP | 2007-336468 A | 12/2007 | | |
| JP | 2008-92137 A | 4/2008 | | |
| WO | 9956461 A1 | 11/1999 | | |
| WO | 2007/081908 A1 | 7/2007 | | |
| WO | 2008/027192 A2 | 3/2008 | | |

OTHER PUBLICATIONS

ITU-T H.264 (May 2003).*
International Search Report for PCT/KR2009/002942 dated Jan. 13, 2010 [PCT/ISA/210].
Communication dated Sep. 28, 2012 issued by the State Intellectual Property Office of P.R. China in counterpart Chinese Patent Application No. 200980131662.X.
Communication dated Nov. 20, 2012 issued by the Japanese Patent Office in counterpart Japanese Patent Application No. 2011-513412.
Siwei Ma et al; "High-definition Video Coding with Super-macroblocks", Visual Communications and Image Processing, Jan. 29, 2007, 12 pgs.
Communication dated Jun. 10, 2013, issued by the Ministry of Justice and Human Rights of the Republic of Indonesia Directorate General of Intellectual Property Rights in counterpart Indonesian Application No. W00201100155.
Alexis Michael Tourapis et al.; "New results on reduced-resolution update mode"; 23. VCEG Meeting; 69. MPEG Meeting; Redmond, WA, US; ITU-T Video Coding Experts Group; No. VCEG-W04; Jul. 16, 2004; pp. 1-15; XP030003413.
Communication dated Aug. 6, 2014 issued by the Australian Government IP Australia in counterpart Australian Patent Application No. 2009258401.
Communication dated Sep. 3, 2014 issued by the European Patent Office in counterpart European Patent Application No. 09762619.6.
Jie Dong et al.; "16×16 Integer Cosine Transform for HD Video Coding"; PCM; LNCS 4261; 2006; pp. 114-121.
S. Naito et al.; "Efficient coding scheme for super high definition video based on extending H.264 high profile"; Proceedings of SPIE International Society for Optical Engineering; vol. 6077; No. 607727; Jan. 18, 2006; 8 pages; XP002538136.
Office Action dated Jun. 23, 2015, issued by the Australian Patent Office in counterpart Australian Patent Application No. 2014210684.
Communication dated Nov. 14, 2016, issued by the State Intellectual Property Office of P.R. China in counterpart Chinese Application No. 201410334485.8.
Communication dated Jul. 4, 2017, issued by the Japanese Patent Office in counterpart Japanese Application No. 2016-094169.

* cited by examiner

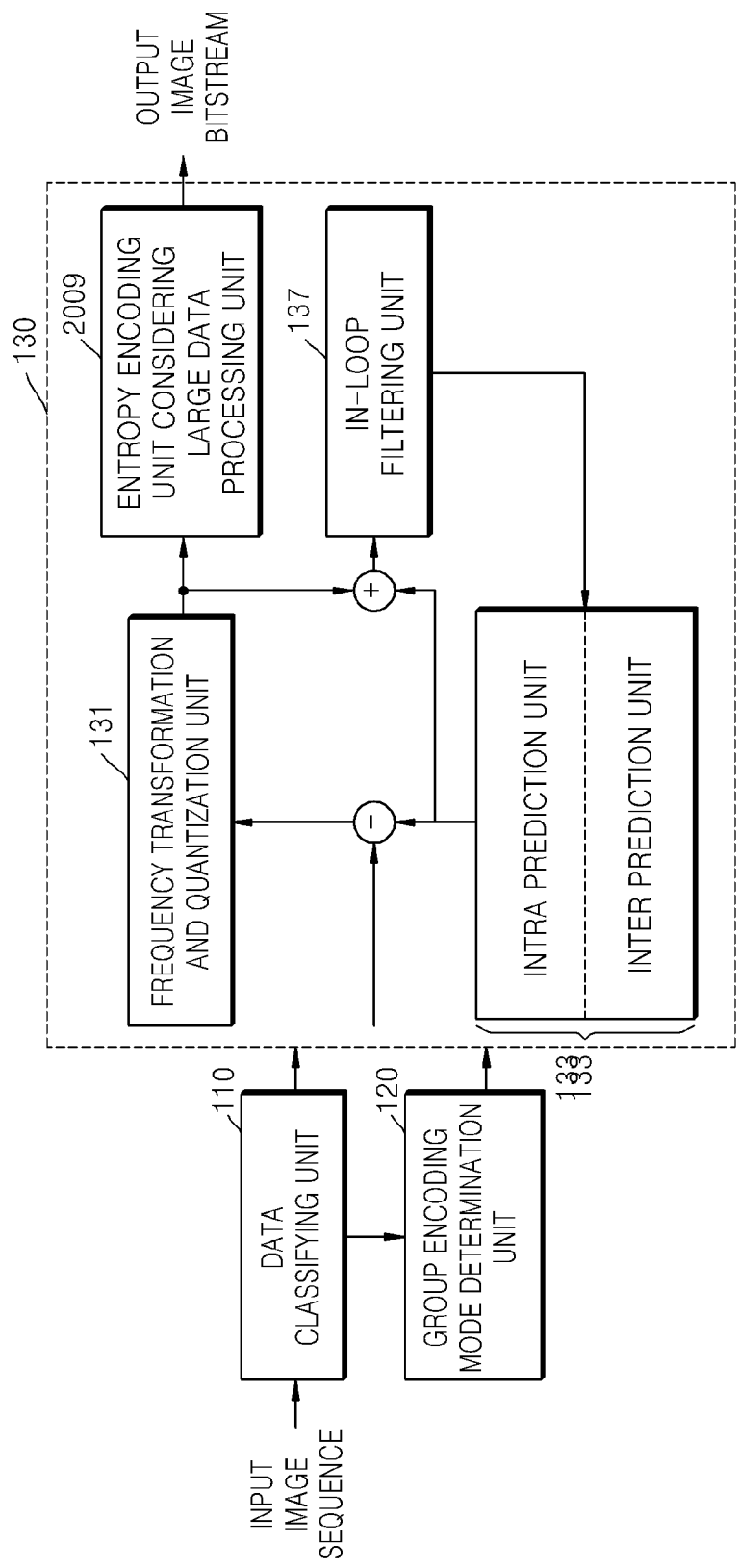

☐ : Group Skip

0 : No Skip
1 : Skip
2 : Group Skip Start

FIG. 27

| IMAGE FORMAT | PREDICTION TYPE | SIZE OF DCT BLOCK FOR LUMA COMPONENT | SIZE OF DCT BLOCK FOR CHROMA COMPONENT |
|---|---|---|---|
| YUV 420 | INTRA PREDICTION | 32x32 | 16x16 |
| | | 16x16, 8x8, 4x4 | 8x8 |
| | INTER PREDICTION | 16x16, 8x8, 4x4 | 8x8 |
| YUV 444 | INTRA PREDICTION | 32x32 | 32x32 |
| | | 16x16 | 16x16 |
| | | 8x8, 4x4 | 8x8 |
| | INTER PREDICTION | 16x16 | 16x16 |
| | | 8x8, 4x4 | 8x8 |

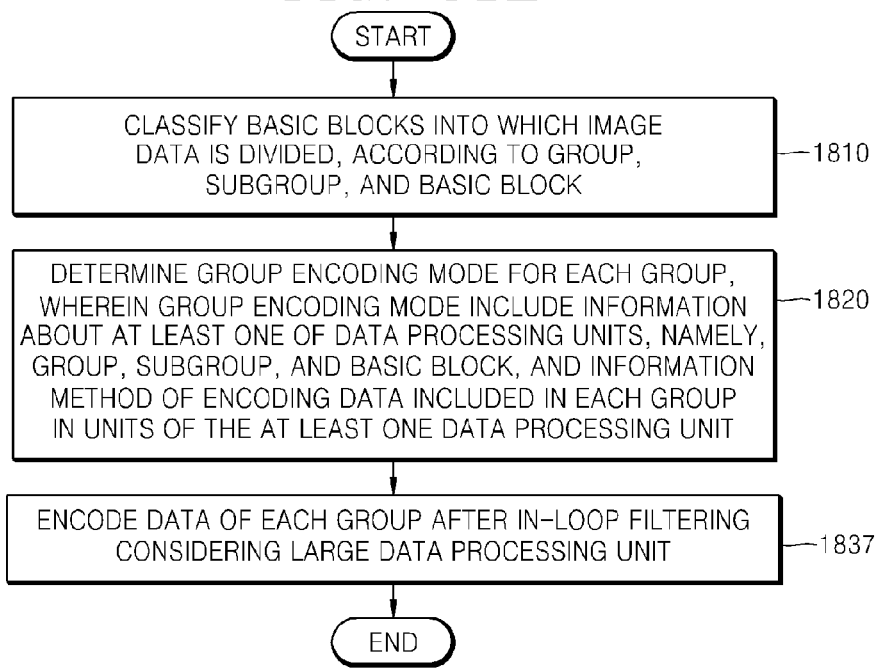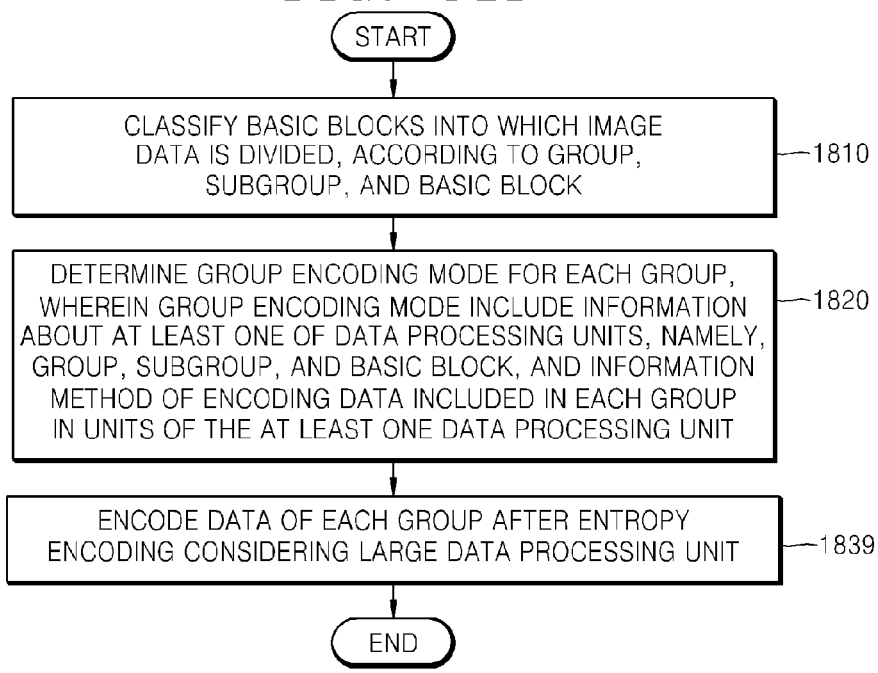

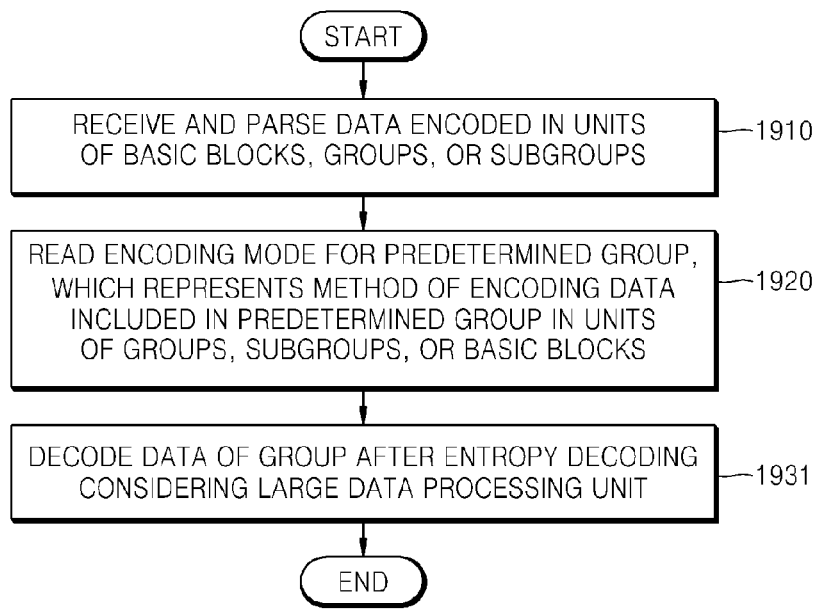
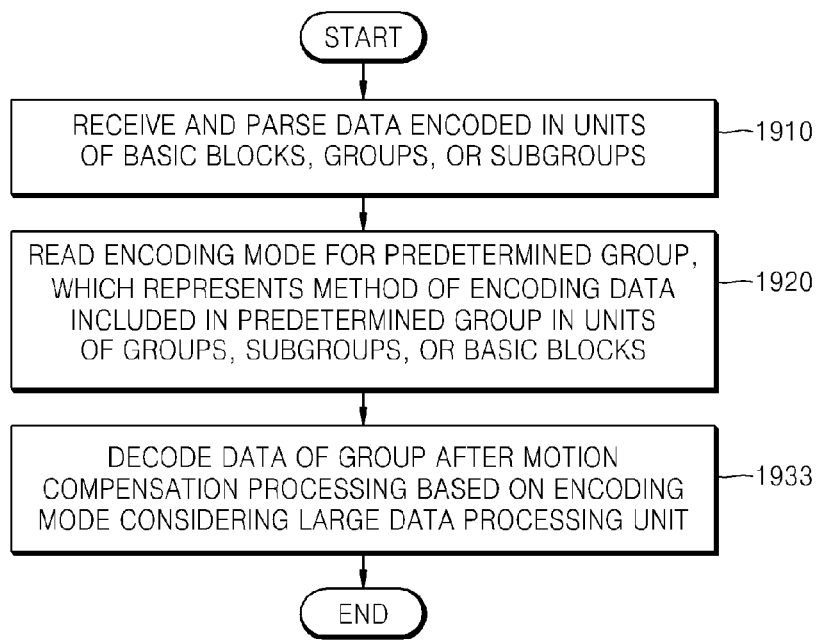

IMAGE-ENCODING METHOD AND A DEVICE THEREFOR, AND IMAGE-DECODING METHOD AND A DEVICE THEREFOR

CROSS-REFERENCE TO RELATED APPLICATIONS

This is a continuation application of U.S. patent application Ser. No. 12/997,747, which is a National Stage of International Application No. PCT/KR2009/002942 filed Jun. 3, 2009, claiming priority based on U.S. Provisional Application Nos. 61/061,175 filed on Jun. 13, 2008, 61/082,338 filed on Jul. 21, 2008, and Korean Application Nos. 10-2008-0102464 filed on Oct. 20, 2008 and 10-2009-0040890 filed on May 11, 2009, the disclosures of which are incorporated herein by reference in their entireties.

BACKGROUND

Field

The present application relates to image encoding and image decoding.

Description of the Related Art

In conventional block-based video encoding and decoding methods, such as Moving Pictures Experts Group (MPEG)2, MPEG4, and H.264/Advanced Video Coding (AVC), the size of a macroblock is fixed to 16×16. In addition, in H.264/AVC, image data may be divided into blocks less than or equal to 8×8 blocks, namely, into 4×4 blocks, in order to achieve more accurate estimation or prediction.

SUMMARY

According to an exemplary embodiment, there is provided an image encoding method comprising classifying image data divided into basic blocks, in units of groups and subgroups, wherein each group comprises at least one basic block and each subgroup comprises at least one basic block and is included in each group; determining an encoding mode for a predetermined group in order to encode the predetermined group, wherein the encoding mode represents a mode for encoding data included in the predetermined group in units of one data processing unit selected from a group, a subgroup, and a basic block; and encoding the data of the predetermined group according to the determined encoding mode.

According to an exemplary embodiment, there is provided an image encoding method comprising classifying image data divided into basic blocks, in units of groups and subgroups, wherein each group comprises at least one basic block and each subgroup comprises at least one basic block and is included in each group; determining an encoding mode for a predetermined group in order to encode the predetermined group, wherein the encoding mode represents a mode for encoding data included in the predetermined group in units of one data processing unit selected from a group, a subgroup, and a basic block; and encoding the data of the predetermined group according to the determined encoding mode.

The image encoding method may further comprise encoding a flag that represents the encoding mode for the predetermined group.

The classifying of the image data may comprise determining a size of the predetermined group and a shape of the predetermined group, wherein the size represents the number of basic blocks included in the predetermined group and the shape is formed by the basic blocks included in the predetermined group.

The classifying of the image data may comprise determining subgroups for the predetermined group based on a level representing the number of subgroups included in the predetermined group and a scan sequence in which the basic blocks are scanned.

The encoding mode may comprise at least one of information about the type of data processing units in which the data of the predetermined group is encoded, wherein the type is one of a group, a subgroup, and a basic block; information about the size of the data processing unit, wherein the size represents the number of basic blocks included in the data processing unit; and information about an prediction mode that represents a mode for determining reference information corresponding to the data processing unit in order to perform motion estimation on the data processing unit.

The determining of the encoding mode for the predetermined group may comprise encoding the predetermined group according to at least one prediction mode in units of different types of data processing units which are groups, subgroups, and basic blocks; determining error rates that are generated by encoding performed on the predetermined group in units of combinations of the different types of data processing units and the at least one prediction mode; and determining a prediction mode for a predetermined data processing unit generating a smallest error rate from among the determined error rates.

The determining of the encoding mode for the predetermined group may comprise comparing encoding error rates generated by considering the at least one prediction mode in units of the different types of data processing units with one another and determining, as the encoding mode for the predetermined group, a combination of a data processing unit and an prediction mode, which generates the smallest error rate.

The image encoding method may further comprise rearranging frequency-transformed coefficients of each group or each subgroup, in units of a plurality of basic blocks.

The image encoding method may further comprise encoding a flag that represents whether the frequency-transformed coefficients have been rearranged in units of basic blocks.

The image encoding method may further comprise encoding a flag that represents a data processing unit of units in which the data of the predetermined group is frequency-transformed.

In the classifying of the image data, the sizes, shapes, and maximum levels of groups may be determined in units of a data unit selected from pictures, sequences, and groups of the image data.

According to an exemplary embodiment, there is provided an image decoding method comprising receiving and parsing image data encoded in units of at least one data processing unit selected from a basic block, a group, and a subgroup, wherein each group comprises at least one basic block and each subgroup comprises at least one basic block and is included in each group; reading an encoding mode for a predetermined group from the parsed image data, wherein the encoding mode represents a mode for encoding image data included in the predetermined group in units of one data processing unit selected from a group, a subgroup, and a basic block; and decoding the image data of the predetermined group according to the read encoding mode.

The reading of the encoding mode for the predetermined group may comprise reading information about a shape of a group set as a data processing unit in which decoding is performed, information about a size of a group representing the number of basic blocks included in the group, and information about a maximum level associated with a maximum number of subgroups included in the group; and determining the group which is the data processing unit by which decoding is performed, by classifying the parsed image data by using the information about the shape and size of the group.

In the image decoding method, the groups may be set in units of a data unit selected from a picture, a sequence, and a group of the image data.

In the image decoding method, the subgroups may be set based on a level representing the number of subgroups included in the group, and a scan sequence in which basic blocks included in the group are scanned.

The reading of the encoding mode for the predetermined group may comprise extracting an encoding mode flag that represents the encoding mode for the predetermined group, from parsed data associated with the predetermined group; and reading the encoding mode for the predetermined group on the basis of the encoding mode flag.

The encoding mode for the predetermined group may comprise at least one of information about the type of data processing units in which the data of the predetermined group is encoded, wherein the type is one of a group, a subgroup, and a basic block; information about the size of the data processing unit, wherein the size represents the number of basic blocks included in the data processing unit; and information about a prediction mode that represents a mode for determining reference information corresponding to the data processing unit in order to perform motion estimation on the data processing unit.

The decoding of the data of the predetermined group may comprise determining a data processing unit in units in which decoding is to be performed, based on the information about the type and size of the data processing unit; determining a prediction mode of the data processing unit on the basis of the information about the prediction mode; and decoding the data of the group according to the determined data processing unit and the determined prediction mode.

In the image decoding method, the predetermined group may be encoded according to at least one prediction mode in units of different types of data processing units, namely, groups, subgroups, and basic blocks so as to calculate error rates for the at least one prediction mode, a combination of a predetermined data processing unit and a prediction mode, which corresponds to a smallest error rate from among the calculated error rates, may be determined; and encoding error rates generated by considering the at least one prediction mode in units of the different types of data processing units, may be compared with one another so as to determine, as the encoding mode for the predetermined group, a combination of a data processing unit and a prediction mode, which correspond to the smallest error rate.

In the image decoding method, the basic blocks may be decoded in a zigzag scan sequence.

The image decoding method may further comprise rearranging frequency transformed coefficients of a plurality of basic blocks, in units of one of groups and subgroups.

The image decoding method may further comprise reading, from the parsed data, a flag that represents a data processing unit of units in which the data included in the predetermined group is frequency transformed.

According to an exemplary embodiment, there is provided an image encoding apparatus comprising a data classifying unit classifying image data divided into basic blocks, in units of groups and subgroups, wherein each group comprises at least one basic block and each subgroup comprises at least one basic block and is included in each group; a group encoding mode determination unit determining at least one data processing unit selected from a group, a subgroup, and a basic block and determining an encoding mode for a predetermined group in order to encode the predetermined group, wherein the encoding mode represents a mode for encoding data included in the predetermined group in units of the at least one data processing unit; and a group encoding unit encoding the data of the predetermined group according to the determined encoding mode.

According to an exemplary embodiment, there is provided an image decoding apparatus comprising a receiving unit receiving and parsing image data encoded in units of at least one data processing unit selected from a basic block, a group, and a subgroup, wherein each group comprises at least one basic block and each subgroup comprises at least one basic block and is included in each group; a group encoding mode reading unit reading an encoding mode for a predetermined group from the parsed image data, wherein the encoding mode represents a mode for encoding image data included in the predetermined group in units of one data processing unit selected from a group, a subgroup, and a basic block; and a group decoding unit decoding the image data of the predetermined group according to the read encoding mode.

When an encoding mode representing the type of a data processing unit for an image and a motion prediction method is determined, the image is encoded considering the data processing unit and a motion prediction mode that correspond to the encoding mode.

The image encoding method based on a data processing unit dynamically determined according to an embodiment of the present invention further comprises performing frequency transformation and quantization for encoding of the input image on the basis of a large data processing unit corresponding to the determined group encoding mode; performing motion estimation for the encoding of the input image, based on the large data processing unit; performing in-loop filtering for the encoding of the input image, based on the large data processing unit; and performing entropy encoding for the encoding of the input image, based on the large data processing unit.

The image decoding method based on the data processing unit dynamically determined according to an embodiment of the present invention further comprises performing entropy decoding for decoding of data of the group on the basis of a large data processing unit corresponding to the encoding mode for the determined group; performing inverse quantization and inverse frequency transformation for the decoding of the data of the group, based on the large data processing unit; performing motion compensation for the decoding of the data of the group, based on the large data processing unit; and performing in-loop filtering for the decoding of the data of the group, based on the large data processing unit.

The image encoding apparatus based on the data processing unit dynamically determined according to an embodiment of the present invention may further comprise a frequency transformation and quantization unit for performing frequency transformation and quantization for encoding of the input image on the basis of a large data processing unit corresponding to the determined group encoding mode; a motion estimation unit for performing motion estimation for the encoding of the input image, based on the large data processing unit; an in-loop filtering unit for performing in-loop filtering for the encoding of the input image, based on the large data processing unit; and an entropy encoding unit for performing entropy encoding for the encoding of the input image, based on the large data processing unit.

The image decoding apparatus based on the data processing unit dynamically determined according to an embodiment of the present invention may further comprise an entropy decoding unit for performing entropy decoding for decoding of data of the group on the basis of a large data processing unit corresponding to the determined group encoding mode; an inverse quantization and inverse frequency transformation unit for performing inverse quantization and inverse frequency transformation for the decoding of the data of the group, based on the large data processing unit; a motion compensation unit for performing motion compensation for the decoding of the data of the group, based on the large data processing unit; and an in-loop filtering unit for performing in-loop filtering for the decoding of the data of the group, based on the large data processing unit.

In the image encoding method or the image decoding method, a size of a data processing unit for the frequency transformation may be determined based on a size of a data processing unit for the motion estimation.

In connection with the performing of the motion estimation in the image encoding method or the image decoding method, a scanning sequence for each data processing unit for sequential motion estimation may be determined based on the large data processing unit, and neighbor availability corresponding to whether a neighboring data processing unit located on a right upper end of a current data processing unit can be used as a reference block may be determined based on the large data processing unit.

The motion estimation based on the large data processing unit may use a square-shaped data processing unit from among the data processing units. The size of the data processing unit for the frequency transformation based on the square-shaped data processing unit may be restricted to a predetermined size smaller than or equal to the square-shaped data processing unit.

The motion estimation based on the large data processing unit may comprise intra prediction based on the large data processing unit, and comprise intra prediction performed in units of the large data processing units in an intra mode of a complex plain type. A data processing unit whose motion can be estimated in an intra mode may be previously determined based on the large data processing unit.

The motion estimation based on the large data processing unit may comprise motion estimation performed in a prediction mode in which an intra mode and an inter mode are mixed, based on the large data processing unit. A motion vector for motion estimation of an inter mode may be determined based on the large data processing unit. A motion vector predictor for an inter mode corresponding to the motion vector determined based on the large data processing unit may be induced.

In connection with the motion estimation based on the large data processing unit, a skip mode of an extended shape may be determined based on the large data processing unit. A skip group comprising adjacent data processing units of at least one skip mode may be determined, and motion estimation may be performed in units of skip groups in a skip mode.

The frequency transformation based on the large data processing unit may comprise integer discrete cosine transformation based on a large block, based on the large data processing unit. Frequency transformation may be performed with respect to a chroma component of a current data processing unit, to a predetermined size determined based on the large data processing unit. Modified frequency transformation may be performed to reduce calculation complexity of frequency transformation considering the large data processing unit.

The entropy encoding based on the large data processing unit may use a coded block pattern hierarchically determined according to the size of each data processing unit based on the large data processing unit.

In the entropy encoding based on the large data processing unit, the coded block pattern may be scanned for each of regions into which a current data processing unit is classified based on the possibility that a quantized coefficient which is not 0 from among the quantized coefficients of the current data processing unit exists. A coefficient strip of a region including a coefficient which is not 0 may be scanned based on the coded block pattern for each region of the current data processing unit. A flag representing the coefficient strip of a region including a coefficient which is not 0 may be encoded to be included in a bitstream, and the flag may be read during decoding of the bitstream.

The entropy encoding or the entropy decoding may use Context-based Adaptive Binary Arithmetic Coding (CABAC) or Context-based Adaptive Variable Length Coding (CAVLC) modified based on the large data processing unit.

The entropy encoding or the entropy decoding based on the large data processing unit may use a coded block pattern determined as a single context with respect to an intra mode or a chroma component based on the large data processing unit.

In the in-loop filtering based on the large data processing unit, it may be determined based on the large data processing unit whether deblocking filtering is performed on a lower data processing unit in a current data processing unit, based on the large data processing unit. The deblocking filtering with respect to the current data processing unit may not comprise deblocking filtering with respect to a left or upper boundary of a lower data processing unit in the current data processing unit, and deblocking filtering with respect to a boundary of a lower data processing unit in the current data processing unit on which frequency-transformation has been performed in units of a predetermined data processing unit.

In the in-loop filtering based on the large data processing unit, deblocking filtering with respect to a boundary of a chroma component of the current data processing unit may not comprise deblocking filtering with respect to a boundary of a chroma component of the lower data processing unit in the current data processing unit. In the in-loop filtering based on the large data processing unit, deblocking filtering with respect to a boundary of the current data processing unit on which motion estimation has been performed in a mixed mode in which an inter mode and an intra mode are mixed may not comprise deblocking filtering with respect to a boundary of the lower data processing unit in the current data processing unit.

In connection with the in-loop filtering based on the large data processing unit, the degree of deblocking filtering with respect to each boundary may be set for a boundary of at least one lower data processing unit in the large data processing unit.

The in-loop filtering based on the large data processing unit may comprise additional filtering for reducing a ringing effect is performed on a current data processing unit having a large size, based on the large data processing unit.

According to an exemplary embodiment, there is provided a computer readable recording medium having recorded thereon a program for executing the image encoding method based on the data processing unit dynamically determined according to an embodiment.

According to an exemplary embodiment, there is provided a computer readable recording medium having recorded thereon a program for executing the image decoding method based on the data processing unit dynamically determined according to an embodiment.

BRIEF DESCRIPTION OF THE DRAWINGS

The above and other features and advantages will become more apparent by describing in detail exemplary embodiments thereof with reference to the attached drawings in which:

FIGS. 20A, 20B, 20C, 20D, 20E, and 20F are block diagrams of modified embodiments of the image encoding apparatus of FIG. 1 that consider a dynamically determined data processing unit, according to an exemplary embodiment;

FIG. 27 is a table illustrating a method of inducing the size of a data processing unit for a chroma component of a large data processing unit, according to an exemplary embodiment;

FIGS. 31A, 31B, 31C, 31D, 31E, and 31F are flowcharts of modified exemplary embodiments of the image encoding method of FIG. 18 that consider a dynamically determined data processing unit, according to an exemplary embodiment; and FIGS. 32A, 32B, 32C, 32D, 32E, and 32F are flowcharts of modified exemplary embodiments of the image decoding method of FIG. 19 that consider a dynamically determined data processing unit, according to an exemplary embodiment.

DETAILED DESCRIPTION OF EXEMPLARY EMBODIMENTS

Figure 1:
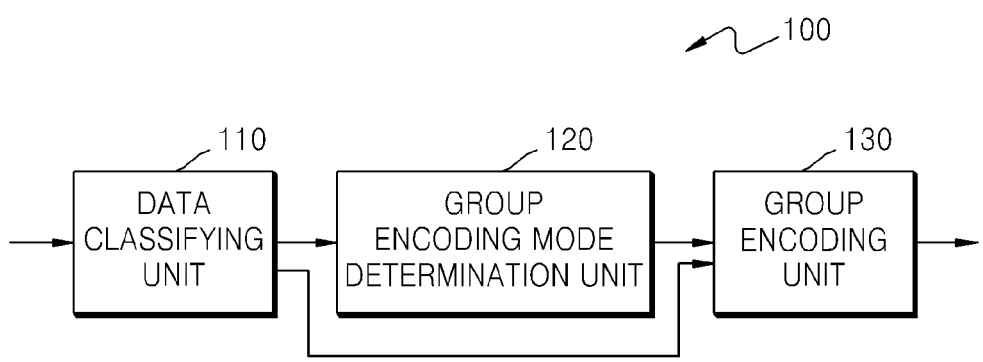
FIG. 1 is a block diagram of an image encoding apparatus, according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

In the exemplary embodiments, "unit" may or may not refer to a unit of size, depending on its context.

First, a data processing unit and an encoding mode which are dynamically determined according to an exemplary embodiment will be described in section [I. dynamic determination of data processing unit].

An apparatus for encoding image based on the data processing unit and the encoding mode dynamically determined above will be described in section [II. Image encoding apparatus based on dynamically determined data processing unit].

Detailed operations of the image encoding apparatus based on the dynamically determined data processing unit according to an exemplary embodiment will now be described in sections [III. Motion prediction process], [III-1. Intra prediction], [III-2. Inter prediction], [IV. Frequency transformation and quantization], and [V. entropy encoding].

An apparatus for decoding image based on the dynamically determined data processing unit, according to an exemplary embodiment, which corresponds to the image encoding apparatus based on the dynamically determined data processing unit according to an exemplary embodiment, will be described in section [VII. Image decoding apparatus based on dynamically determined data processing unit].

An image encoding method based on the dynamically determined data processing unit according to an exemplary embodiment, and an image decoding method corresponding to the image encoding method, will be described in section [VIII. Image encoding method and image decoding method based on dynamically determined data processing unit].

I. Dynamic Determination of Data Processing Unit

FIG. 1 is a block diagram of an image encoding apparatus 100 according to an exemplary embodiment. Referring to FIG. 1, the image encoding apparatus 100 includes a data classifying unit 110, a group encoding mode determination unit 120, and a group encoding unit 130.

When received image data has been divided into basic blocks, the data classifying unit 110 classifies pieces of the received image data in units of basic blocks, in units of groups each including at least one basic block, or in units of subgroups each including at least one basic block and being included in a group. The data classifying unit 110 outputs the classified image data to the group encoding mode determination unit 120 and the group encoding unit 130.

The basic block, the group, and the subgroup are types of data processing units, that is, units by which image data is encoded.

A group may have a property "size" representing the number of basic blocks and a property "shape" representing a shape formed by the basic blocks included in the group. A subgroup is determined according to a level representing the number of subgroups included in a group and a scan sequence in which the basic blocks included in the group are scanned. At least one property of each group from among a size, a shape, a maximum level, and a scan sequence may be determined individually for each group, each picture, or each sequence.

A method of determining such a group will be described later with reference to FIG. 3, and a method of determining such a subgroup will be described later with reference to FIGS. 4 and 5.

The group encoding mode determination unit 120 determines a group encoding mode for each group, which includes information about a method of encoding the data included in each group in units of at least one of data processing units, namely, a group, a subgroup, and a basic block.

In an exemplary embodiment, the group encoding mode determination unit 120 may determine error rates that are generated by encoding the data of each group in units of respective data processing units, namely, in units of groups, subgroups, and basic blocks, and determine the group encoding mode for each group on the basis of the error rates corresponding to the respective data processing units. Accordingly, the image data is encoded in units of a data processing unit that is dynamically determined based on the error rates of each group for the respective data processing units.

The group encoding mode determined by the group encoding mode determination unit 120 includes at least one piece of information from among information about the type of a data processing unit that is used to encode the data of each group from among a group, a subgroup, and a basic block, information about the size of the data processing unit, the size representing the number of basic blocks included in the data processing unit, and information about a prediction mode that represents a method of determining reference information required to perform motion estimation based on the data processing unit.

The group encoding mode determination unit 120 may calculate and compare an error rate generated when the data of each group is encoded in units of basic blocks, an error rate generated when the data of each group is encoded in units of subgroups, and an error rate generated when the data of each group is encoded in units of groups. The group encoding mode determination unit may determine a data processing unit having the smallest error rate as a unit by which the data of each group is encoded. In other words, the encoding and the error rate calculation are performed in units of groups, subgroups, and basic blocks.

In an exemplary embodiment, the group encoding mode determination unit 120 may compare error rates generated when each group has been encoded in plural prediction modes in units of different types of data processing units, and determine a prediction mode having the smallest error rate for each type of data processing unit.

For example, the group encoding mode determination unit 120 may encode the data of each group in a skip mode, an inter mode, and an intra mode, as prediction modes in units of different types of data processing units, calculate and compare encoding error rates for the skip mode, the inter mode, and the intra mode, and determine a prediction mode that generates the smallest error rate as a representative prediction mode for each of the data processing units. In other words, the comparison of the error rates generated due to the encoding in the respective prediction modes and the determination of the representative prediction mode may be performed in units of groups, subgroups, and basic blocks.

The group encoding mode determination unit 120 may compare error rates of the representative prediction modes for the respective data processing units with one another and determine a data processing unit having the smallest error rate as a representative data processing unit for the data of each group. Based on a combination of a representative data processing unit and a representative prediction mode that both generate the smallest error rates, information about the type, the size, and the representative prediction mode of the representative data processing unit for each group is determined so as to be included in the group encoding mode for each group.

The group encoding unit 130 encodes and outputs the image data received from the data classifying unit 110 according to the group encoding mode for each group, which is determined by the group encoding mode determination unit 120. The image encoding apparatus 100 may also encode a group encoding mode flag that represents the group encoding mode for each group, in addition to the image data.

The image encoding apparatus 100 may encode data included in one picture according to a zigzag scanning method, instead of a raster scanning method in which raster scanning is performed, between basic blocks.

The image encoding apparatus 100 may rearrange coefficients into which each group or each subgroup is frequency-transformed, in units of a plurality of basic blocks. The image encoding apparatus 100 may frequency-transform the image data in units of basic blocks or subgroups. A data processing unit by which frequency transformation is performed may not be identical to a data processing unit by which motion estimation is performed.

The image encoding apparatus 100 may encode a flag that represents whether frequency-transformed coefficients of the data of a predetermined data processing unit have been rearranged according to a variable data processing unit.

Figure 2:
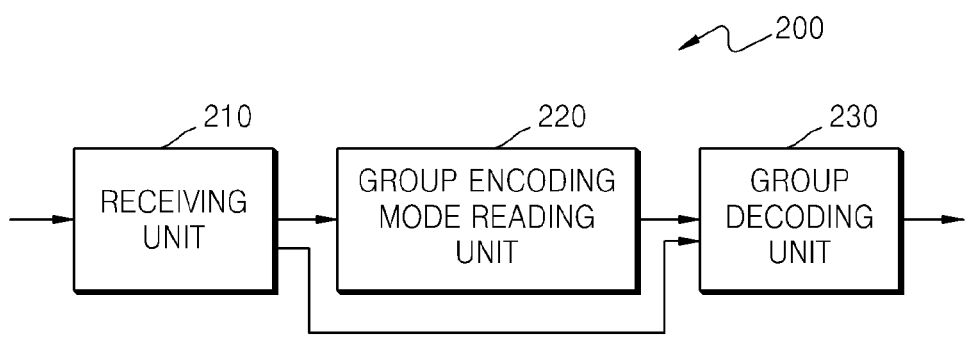
FIG. 2 is a block diagram of an image decoding apparatus, according to an exemplary embodiment.

FIG. 2 is a block diagram of an image decoding apparatus 200 according to an exemplary embodiment. Referring to FIG. 2, the image decoding apparatus 200 includes a receiving unit 210, a group encoding mode reading unit 220, and a group decoding unit 230. The concepts of a basic block, a group, a subgroup, an encoding mode, etc. in relation to FIG. 2 are the same as those of the basic block, the group, the subgroup, the encoding mode, etc. described above in relation to the image encoding apparatus 100.

The receiving unit 210 receives and parses data that has been encoded in units of basic blocks, groups, or subgroups, extracts data pieces to be decoded from the parsed data, and outputs the extracted data pieces to the group encoding mode reading unit 220 and the group decoding unit 230.

In an exemplary embodiment, the group encoding mode reading unit 220 reads a group encoding mode from the parsed data output by the receiving unit 210 and outputs the group encoding mode to the group decoding unit 230. The group encoding mode reading unit 220 may read information about the shape, size, and maximum level of each group from the parsed data and determine each group based on the read-out information about the group shape and size. The properties of the group may be set differently for each group, or each unit of data units, such as, pictures and sequences.

In another exemplary embodiment, the group encoding mode reading unit 220 may extract from the parsed data a group encoding mode flag that represents a group encoding mode for each group, and read the group encoding mode for each group by using the group encoding mode flag. The read-out group encoding mode for each group includes information about the type, size, prediction mode, etc. of a data processing unit which is to be used when the data of each group is decoded.

The group decoding unit 230 decodes and outputs the data of each group, received from the receiving unit 210, by using the group encoding mode for each group received from the group encoding mode reading unit 220.

The group decoding unit 230 may determine a data processing unit to be used to decode the data of each group, based on the information about the type and size of the data processing unit, from among the pieces of information included in the group encoding mode for each group, and determine a prediction mode for the determined data processing unit on the basis of the information about a prediction mode, from among the pieces of information included in the group encoding mode for each group. The group decoding unit 230 may decode the data of each group on the basis of the data processing unit and the prediction mode that have been determined based on the group encoding mode for each group.

The group decoding unit 230 may read and decode the group encoding mode for each group by scanning the data of a single picture according to a zigzag scanning method in which scanning is performed in units of basic blocks.

The image decoding apparatus 200 may rearrange frequency-transformed coefficients of a plurality of basic blocks, in units of either groups or subgroups. The image decoding apparatus 200 may inversely frequency-transform coefficients classified in units of basic blocks or subgroups.

The image decoding apparatus 200 may also extract, from the parsed data, a flag that represents whether frequency-transformed coefficients of either each group or each subgroup, have been rearranged in units of basic blocks during encoding. Based on the flag, representing whether the coefficients have been rearranged, the coefficients may be rearranged in either units of groups or subgroups during decoding.

Figure 3:
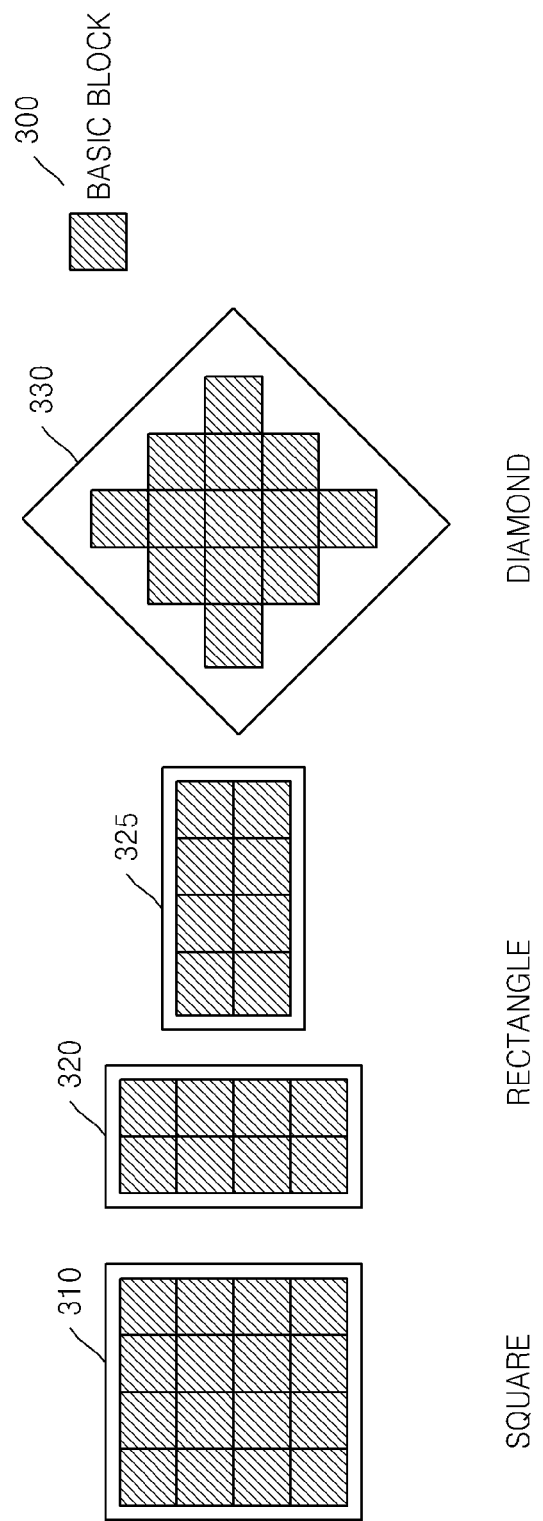
FIG. 3 illustrates a concept of a group as a data processing unit, according to an exemplary embodiment.

FIG. 3 illustrates a concept of a group, which is a data processing unit, according to an exemplary embodiment.

As hardware and a network environment that allow large-capacity data processing are established, an existing macroblock may be considered as a data processing unit, which is too small to store useful information compared with large-capacity data. For example, in high-definition (HD) resolution or higher resolution, which is higher than a standard definition (SD) resolution, bits to be used in actual texture coding, due to small-sized macroblocks being allocated to additional information corresponding to a macroblock symbol such as, a macroblock mode, a motion vector, or the like, and may reduce a rate-distortion (RD) cost.

In the exemplary embodiment, a group including at least one basic block is used as a data processing unit.

A basic block 300 is a data processing unit that includes at least one piece of data. For example, the basic block 300 may be an 8×8 macroblock, a 16×16 macroblock, or the like in standard MPEG or H.264.

In a group, which is a data processing unit including at least one basic block, a shape and a size, which represent the number of basic blocks, may be arbitrarily determined. For example, there exist a group 310 having a size of 16 and a square shape, groups 320 and 325 each having a size of 8 and a rectangular shape, and a group 330 having a size of 13 and a diamond shape. The shapes and sizes of the groups may be set constantly in units of pictures and picture sequences. Alternatively, the shapes and sizes of the groups may be set individually for each group.

Figure 4:
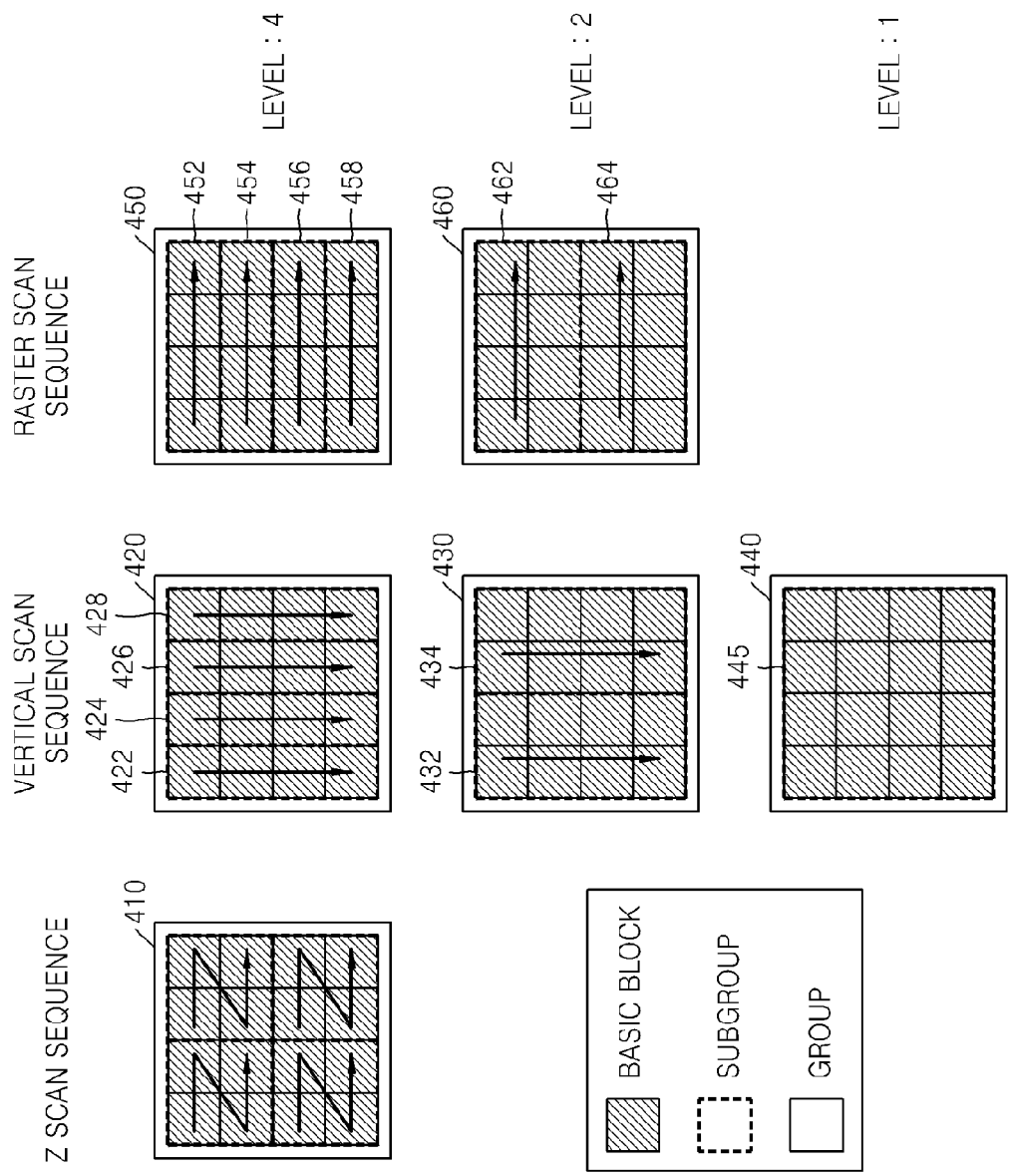
FIG. 4 illustrates a subgroup as a data processing unit, according to an exemplary embodiment.

FIG. 4 illustrates a subgroup, which is a data processing unit, according to an exemplary embodiment.

A subgroup is included in a group and includes at least one basic block. In a first method of determining a subgroup, a subgroup is determined according to a level and a scanning sequence. FIG. 4 illustrates groups that have square shapes, sizes of 16, and levels of 1 through 4.

The groups may be divided into a class of groups with a level of 4, namely, groups 410, 420, and 450, a class of groups with a level of 2, namely, groups 430 and 460, and a class of groups with a level of 1, namely, a group 440, according to the number of sub groups included in each group.

The groups may also be divided into a class of groups with a zigzag scanning sequence, namely, the group 410, a class of groups with a vertical scanning sequence, namely, the groups 420, 430, and 440, and a class of groups with a raster scanning sequence, namely, the groups 450 and 460, according to a scan sequence in which the basic blocks included in each group are scanned.

Accordingly, if subgroups for the group 410 with a size of 16 and a square shape are set according to a level of 4 and a zigzag scanning sequence, four subgroups with sizes of 4 and square shapes may be formed. If subgroups for the group 420 with a size of 16 and a square shape are set according to a level of 4 and a vertical scanning sequence, four subgroups 422, 424, 426, and 428 with sizes of 4 and rectangular shapes may be formed. Similarly, if subgroups for the group 450 with a size of 16 and a square shape are set according to a level of 4 and a raster scanning sequence, four subgroups 452, 454, 456, and 458 with sizes of 4 and rectangular shapes may be formed.

If subgroups are set for the group 430 with a size of 16 and a square shape according to a level of 2 and a vertical scanning sequence, two subgroups 432 and 434 with sizes of 8 and rectangular shapes may be formed. Similarly, if subgroups for the group 460 with a size of 16 and a square shape are set according to a level of 2 and a raster scanning sequence, two subgroups 462 and 464 with sizes of 8 and rectangular shapes may be formed.

If subgroups for the group 440 with a size of 16 and a square shape are set according to a level of 1 and a vertical scanning sequence, a single subgroup 445 with a size of 16 and a square shape may be formed.

Although several scanning sequences may be set for each level as illustrated in FIG. 4, a predetermined scanning sequence may be set for each level. A data processing unit for frequency transformation may be equal to or smaller than the predefined sizes of the group and the subgroup.

Figure 5:
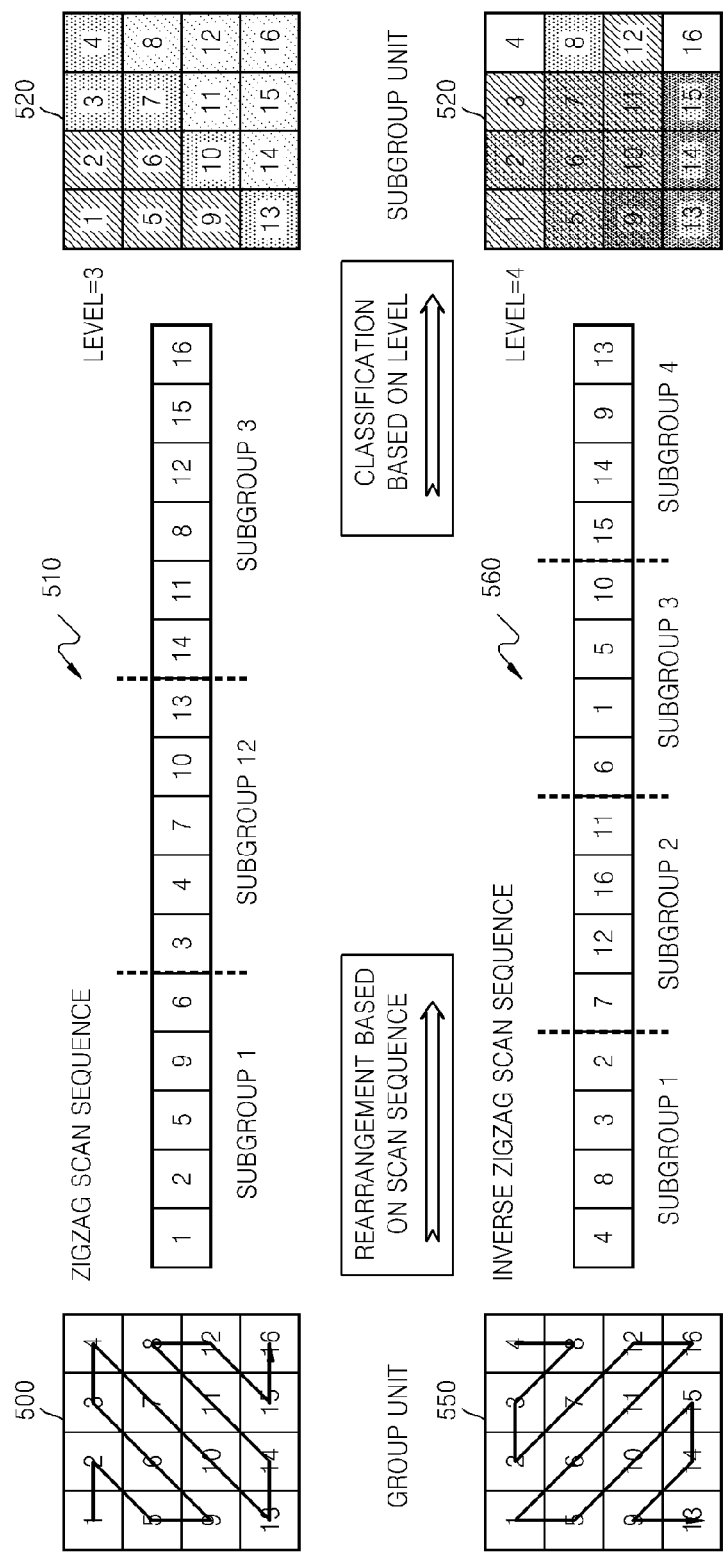
FIG. 5 illustrates a subgroup as a data processing unit, according to an exemplary embodiment.

FIG. 5 illustrates another example of a subgroup, which is a data processing unit, according to an exemplary embodiment.

A second method of determining a subgroup is to divide a sequence of basic blocks which are arrayed according to a sequence in which the basic blocks included in each group are scanned. The second method of determining a subgroup will now be described in greater detail with reference to FIG. 5, which illustrates groups 500 and 550 that have square shapes and sizes of 16.

Basic blocks 1 through 16 of the group 500 may be rearranged according to a zigzag scan sequence so as to generate a basic block sequence 510 in which the basic blocks 1 through 16 are arranged in a sequence of basic blocks 1, 2, 5, 9, 6, 3, 4, 7, 10, 13, 14, 11, 8, 12, 15, and 16. If the level of the group 500 is 3, the basic block sequence 510 may be divided into a first subgroup including the basic blocks 1, 2, 5, 9, and 6, a second subgroup including the basic blocks 3, 4, 7, 10, and 13, and a third subgroup including the basic blocks 14, 11, 8, 12, 15, and 16. Accordingly, if the group 500 is divided into subgroups with a level of 3 according to the zigzag scan sequence, the group 500 may be divided into subgroups included in a group 520.

Basic blocks 1 through 16 of the group 550 may be rearranged according to an inverse zigzag scan sequence so as to generate a basic block sequence 560 in which the basic blocks are arranged in a sequence of basic blocks 4, 8, 3, 2, 7, 12, 16, 11, 6, 1, 5, 10, 15, 14, 9, 13. If the level of the group 550 is 4, the basic block sequence 560 may be divided into a first subgroup including the basic blocks 4, 8, 3, and 2, a second subgroup including the basic blocks 7, 12, 16, and 11, a third subgroup including the basic blocks 6, 1, 5, and 10, and a fourth subgroup including the basic blocks 15, 14, 9, and 13. Accordingly, if the group 550 is divided into subgroups with a level of 4 according to the inverse zigzag scan sequence, the group 550 may be divided into subgroups as in a group 570.

Figure 6:
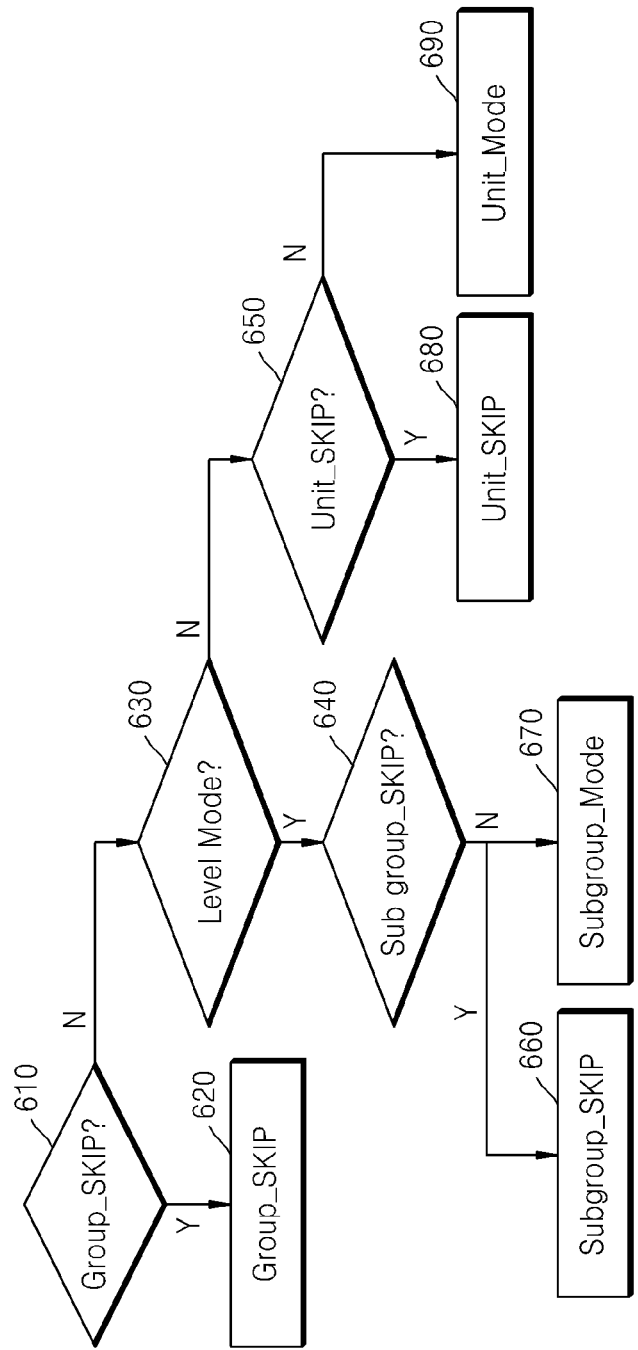
FIG. 6 is a flowchart of an encoding mode, according to an exemplary embodiment.

FIG. 6 is a flowchart explaining a syntax that represents an encoding mode for a predetermined group, according to an exemplary embodiment.

FIG. 6 is a flowchart of a process in which the group encoding mode reading unit 220 of the image decoding apparatus 200 reads out a group encoding mode according to the syntax of the encoding mode for the predetermined group.

In operation 610, the group encoding mode reading unit 220 checks a flag Group_SKIP that represents whether the data included in the predetermined group has been encoded in a skip mode of a group unit. If the value of the flag 'Group_SKIP' is 1, the data of the predetermined group is decoded in the skip mode of a group unit, in operation 620. On the other hand, if the value of the flag 'Group_SKIP' is 0, the process proceeds to operation 630.

In operation 630, the group encoding mode reading unit 220 determines whether subgroups have been set based on a level. If subgroups based on a level are set, the group encoding mode reading unit 220 checks a method of performing decoding in units of subgroups, in operation 640. On the other hand, if subgroups have not been set based on a level, the group encoding mode reading unit 220 checks a method of performing decoding in units of basic blocks, in operation 650.

In an exemplary embodiment, the level of subgroups should be greater than 1 and smaller than the size of a group corresponding to the subgroups, because if the level is 1, a set subgroup is identical with a group.

In operation 640, the group encoding mode reading unit 220 checks a flag Subgroup_SKIP that represents whether the data of the predetermined group has been encoded in a skip mode of a subgroup unit. If the value of the flag 'Subgroup_SKIP' is 1, the group decoding unit 230 decodes the data of the predetermined group in the skip mode of a subgroup unit, in operation 660. If the value of the flag 'Subgroup_SKIP' is 0, the group decoding unit 230 decodes the data of the predetermined group in units of subgroups in a prediction mode other than the skip mode, in operation 670.

To differentiate the skip mode of the subgroup unit from the skip mode of the group unit, all the values of the flags 'Subgroup_SKIP' of subgroups should not be set to be 1.

In an exemplary embodiment, in the decoding on a subgroup-by-subgroup basis (Subgroup_Mode), a general mode is determined according to a level and a scan sequence of a subgroup. The level needs to be less than or equal to a maximum level.

In operation 650, the group encoding mode reading unit 220 checks a flag Unit_SKIP that represents whether the data of the predetermined group has been encoded in a skip mode of a basic block unit. If the value of the flag 'Unit_SKIP' is 1, the group decoding unit 230 decodes the data of the predetermined group in the skip mode of a basic block unit, in operation 680. If the value of the flag 'Unit_SKIP' is 0, the group decoding unit 230 decodes the data of the predetermined group in units of basic blocks in a prediction mode other than the skip mode, in operation 690.

In an exemplary embodiment, to differentiate the skip mode of the basic block unit from the skip mode of the subgroup unit or the skip mode of the group unit, all of the values of the flags 'Unit_SKIP' of subgroups should not be set to be 1.

Figure 7:
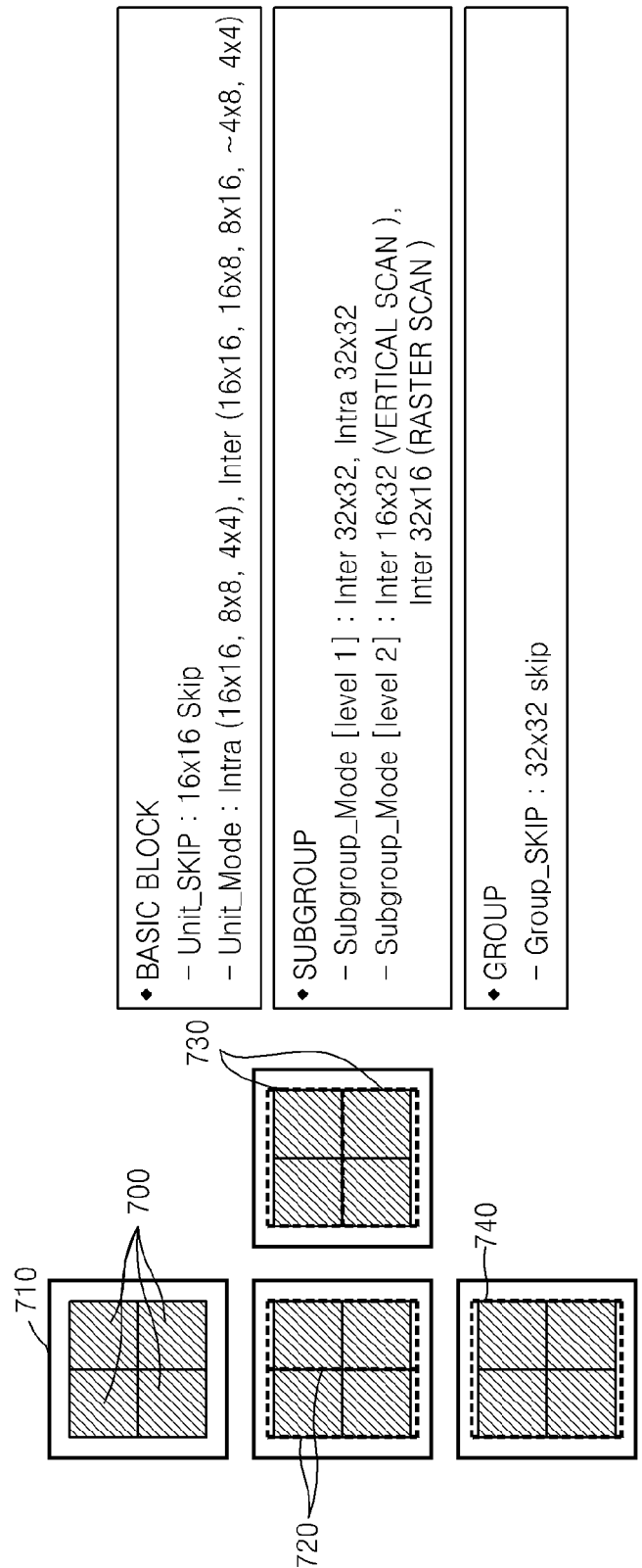
FIG. 7 illustrates an encoding method performed in units of the data processing unit, according to an exemplary embodiment.

FIG. 7 illustrates methods of encoding different types of data processing units, according to an exemplary embodiment.

The methods of encoding the different types of data processing units may be determined according to circumstances. An example of a method of encoding a group 710 with a square shape, a size of 4, and a maximum level of 2 in units of each type of data processing unit will now be described.

When the group 710 has a level of 2, a subgroup 720 with a vertical scan sequence and a subgroup 730 with a raster scan sequence may be set. When the group 710 has a level of 1, a subgroup 740 is set.

In a method of encoding basic blocks 700, a 16×16 skip mode may be used as a skip mode Unit_SKIP, and one of 16×16, 8×8, and 4×4 intra modes and 16×16, 16×8, 8×16, 8×8, 4×8, 8×4, and 4×4 inter modes may be used as a general mode Unit_Mode.

In a method of encoding the subgroup 740 with the level of 1, a 32×32 inter mode or a 32×32 intra mode may be used as a general mode Subgroup_Mode. In a method of encoding the subgroups 720 and 730 with the level of 2, a 16×32 inter mode or a 32×16 inter mode may be used as a general mode Subgroup_Mode.

In a method of encoding the group 720, a 32×32 skip mode may be used as a skip mode Group_SKIP.

Figure 8:
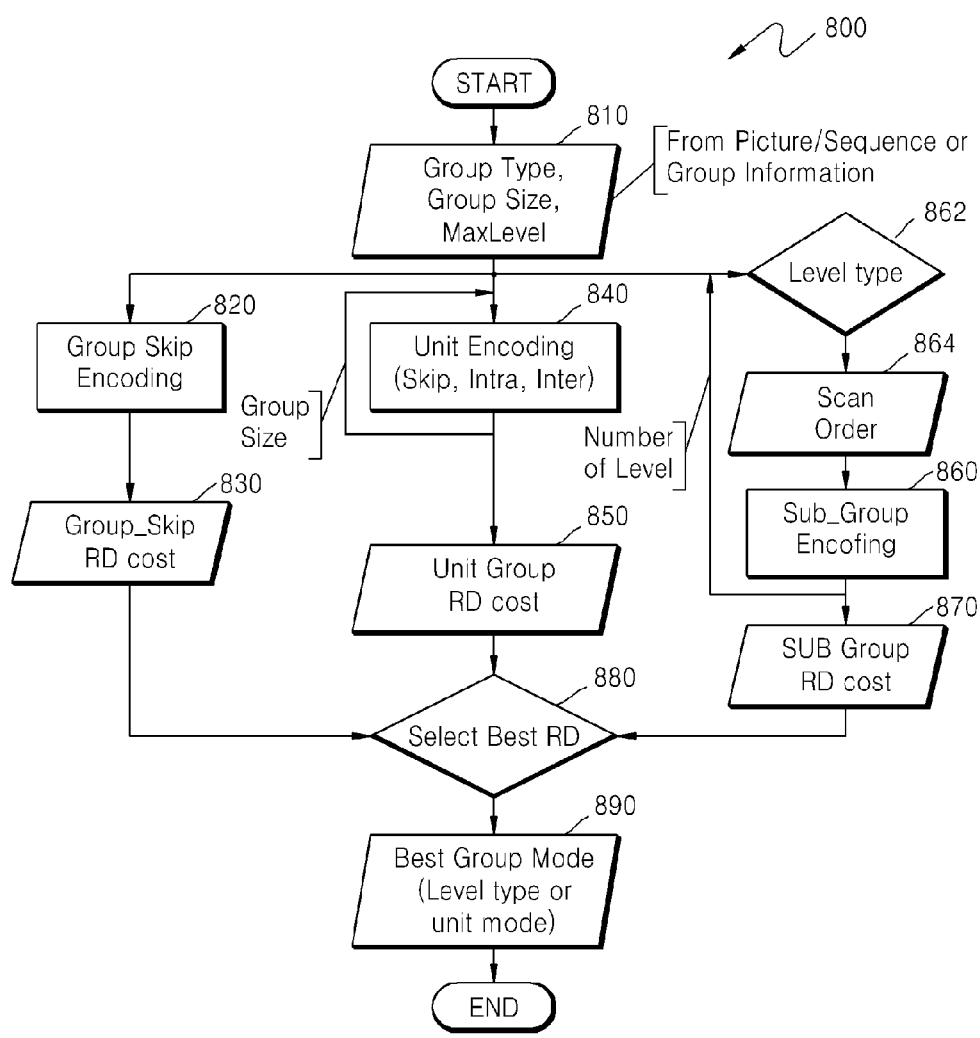
FIG. 8 is a flowchart of an encoding method of determining a group encoding mode, according to an exemplary embodiment.

FIG. 8 is a flowchart of an encoding method 800 of determining a group encoding mode, according to an exemplary embodiment. A method of determining an optimal data processing unit and an optimal prediction mode in connection with an encoding mode for each data processing unit will now be described with reference to FIG. 8.

The encoding method 800 is a process in which the image encoding apparatus 100, particularly, the group encoding mode determination unit 120, determines an encoding mode for a predetermined group.

In operation 810, the predetermined group is determined from data to be encoded, based on information about a group shape, a group size, and a group maximum level which is acquired from the to-be-encoded data. The information about the group shape, the group size, and the group maximum level may be set individually for each group, or each unit of data units such as pictures or sequences.

Encoding performed on the predetermined group in units of each data processing unit will now be described.

First, in operation 820, encoding is performed on the predetermined group in a skip mode of a group unit. In operation 830, an RD cost is calculated as an error rate generated due to the encoding performed on the predetermined group in the skip mode of the group unit. For example, an RD cost generated when a 32×32 group is encoded in a 32×32 skip mode is calculated.

In operation 840, encoding is performed on the predetermined group in units of basic blocks. The encoding in units of basic blocks may be performed in each of a skip mode, an intra mode, and an inter mode. Since encoding should be performed on each of the basic blocks included in each group, operation 840 is repeated a number of times equal to the number of basic blocks included in each group, wherein the number of basic blocks corresponds to the size of each group.

In operation 850, RD costs generated due to the encoding of the basic blocks included in the predetermined group are calculated. For example, a basic block having the smallest RD cost from among RD costs which are generated due to encoding of the basic blocks included in the predetermined group in a 16×16 skip mode, a 16×16/8×8/4×4 intra mode, and a 16×16/16×8/8×16/8×8/4×8/8×4/4×4 inter mode is detected. In other words, a combination of a basic block size and a prediction mode that correspond to the smallest RD cost is selected for each basic block.

In operation 860, encoding is performed on the predetermined group in units of subgroups. More specifically, subgroups for the predetermined group are set by checking a level in operation 862 and checking a scan sequence in operation 864. Then, in operation 860, encoding is performed on each of the subgroups corresponding to the checked level. The encoding in units of subgroups may be performed in each of an intra mode and an inter mode. Since encoding needs to be performed on each of the subgroups included in the predetermined group, operations 862, 864, and 860 are repeated a number of times corresponding to the value of the checked level.

In operation 870, RD costs generated due to the encoding of the subgroups included in the predetermined group are calculated. An optimal prediction mode having the smallest RD cost from among RD costs generated due to encoding performed on the subgroups included in the predetermined group in an intra mode and an inter mode is determined, and a combination of a subgroup having the smallest RD cost from among the subgroups included in the predetermined group and the determined optimal prediction mode is determined. For example, a subgroup having the smallest RD cost from among RD costs which are generated due to encoding of the subgroups in a 32×32 inter mode/32×32 intra mode or a 16×32/32×16 inter mode is detected. In other words, a combination of a subgroup size and a prediction mode that correspond to the smallest RD cost is selected for each subgroup.

In operation 880, the group encoding mode determination unit 120 compares the RD cost of the predetermined group calculated in operation 830, the minimum RD cost of the basic block combination selected in operation 850, and the minimum RD cost of the subgroup combination selected in operation 870 with one another and selects a smallest RD cost from the three RD costs.

In operation 890, the group encoding mode determination unit 120 determines the encoding mode for the predetermined group on the basis of a data processing unit corresponding to the smallest RD cost selected in operation 880 or on the basis of a data processing unit combination which corresponds to the smallest RD cost selected in operation 880. For example, the encoding mode for the predetermined group may include information about the type of a data processing unit from among the group, the subgroup, and the basic block, information about the size (for example, 32×32, 32×16, 16×32, 16×16, 16×8, 8×16, 8×8, 4×8, 8×4, 4×4) of the data processing unit, and information about a prediction mode (for example, a skip mode, an intra mode, and an inter mode).

Figure 9:
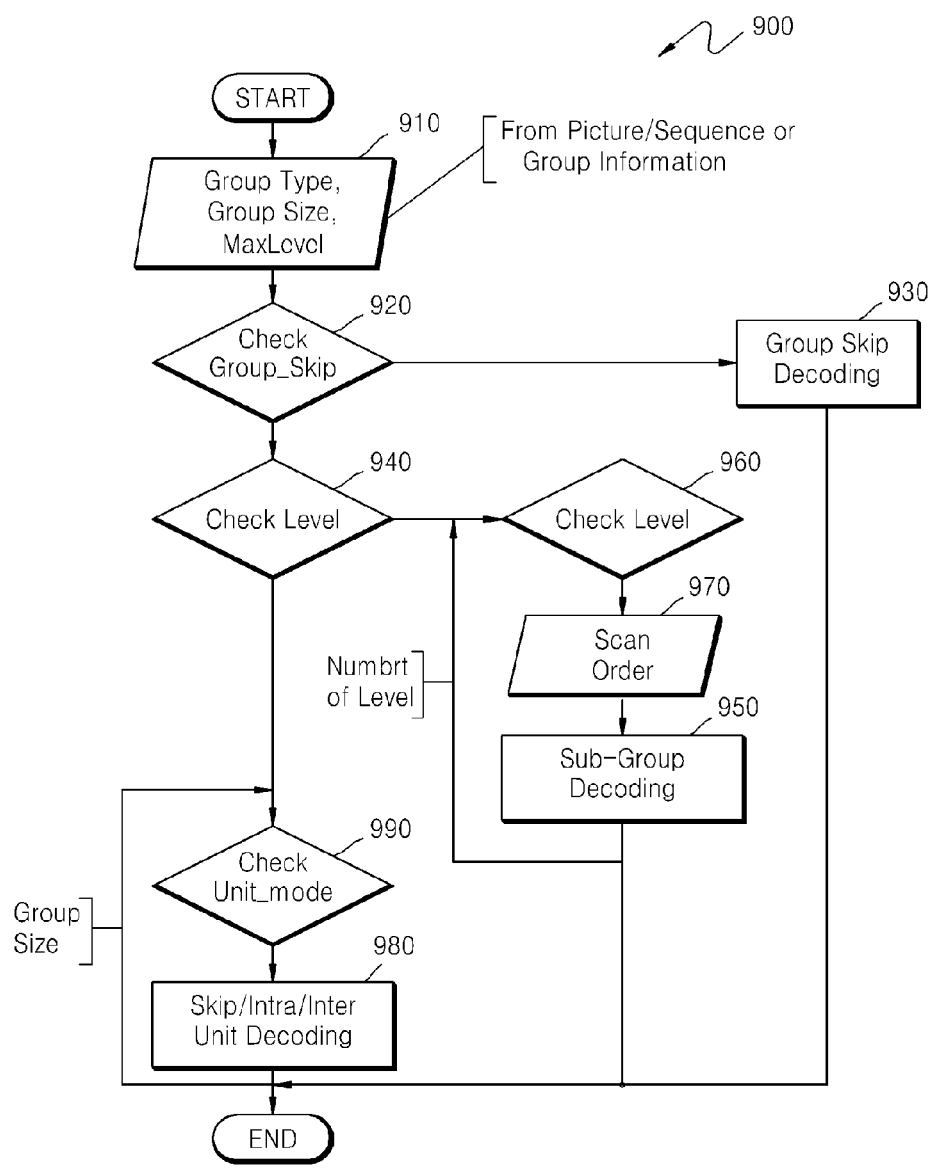
FIG. 9 is a flowchart of reading and decoding an encoding mode, according to an exemplary embodiment.

FIG. 9 is a flowchart of a method 900 of reading an encoding mode for a predetermined group to perform decoding, according to an exemplary embodiment.

The method 900 illustrates a process in which the image decoding apparatus 200, particularly, the group encoding mode reading unit 220, reads the encoding mode for the predetermined group to decode the predetermined group.

In operation 910, the group encoding mode reading unit 220 acquires information about the shape, size, and maximum level of the predetermined group from data to be decoded. The information about the shape, size, and maximum level of the predetermined group may be set individually for each group, or each unit of data units such as pictures or sequences.

In operation 920, the group encoding mode reading unit 220 checks a flag Group_Skip that represents whether the predetermined group has been encoded in a group-by-group skip mode. If it is determined that the predetermined group has been encoded in the group-by-group skip mode, the predetermined group is decoded in the group-by-group skip mode, in operation 930. On the other hand, if it is determined that the predetermined group has not been encoded in the group-by-group skip mode, the method 900 proceeds to operation 940.

In operation 940, the group encoding mode reading unit 220 checks the maximum level of the predetermined group. If it is determined that subgroups have not been set, the group encoding mode reading unit 220 investigates a method of decoding each basic block, in operation 990. On the other hand, if it is determined that subgroups have been set, the group encoding mode reading unit 220 checks a level for the set subgroups in operation 960, and determines a scan sequence in operation 970. In operation 950, the group encoding mode reading unit 220 performs decoding on subgroups determined according to the level and the scan sequence. Since the decoding is performed on each of the subgroups of the predetermined group, operations 960, 970, and 950 are repeated a number of times corresponding to the value of the level of the predetermined group.

In operation 990, the group encoding mode reading unit 220 checks a flag Unit_mode that represents a prediction mode of a basic block unit. In operation 980, the group encoding mode reading unit 220 decodes a corresponding basic block according to the prediction mode determined according to the result of the checking. Since the decoding is performed on each of the basic blocks included in the predetermined group, operations 990 and 980 are repeated a number of times that corresponds to the size of the predetermined group.

Various exemplary embodiments of encoding and decoding in units of various data processing units such as a group, a subgroup, and a basic block will now be described in detail.

In an exemplary embodiment, in a motion vector estimating method based on an inter mode, a median value of motion vectors of all data processing units neighboring a current data processing unit may be determined as a motion vector of the current data processing unit.

In an exemplary embodiment, the motion vector estimating method based on an inter mode may vary according to the sizes of a group, a subgroup, and a basic block. For example, the size, type, etc. of neighboring blocks which are to be referred to, may vary according to the size of a data processing unit.

In an exemplary embodiment, in a motion vector estimating method based on an intra mode, 5 adjacent pixels located at a certain angle or in a certain direction of a current data processing unit are referred to, and thus a weighted average of the values of the 5 adjacent pixels may be estimated as a current pixel value.

In an exemplary embodiment, in an example of the motion vector estimating method based on an intra mode, the data of a predetermined group may be rearranged in units of a data processing unit by which the predetermined group is frequency transformed, and the rearranged data pieces may be used as reference pixels. In another example of the motion vector estimating method based on an intra mode, an x-axis variation and a y-axis variation of a motion vector may be represented as a gradation $\nabla$.

In a block motion estimating method based on a 32×32 intra mode, a current block may be estimated using a weighted average of two estimation signals such as motion vectors. The weighted average may be obtained according to a method of giving a greater weighted value to a reference pixel closest to each pixel than to other reference pixels neighboring each pixel.

In an exemplary embodiment, flags that represent skip modes for groups may be collected in units of pictures and processed all at once. Only flags that represent skip modes for the groups included in a B picture may be processed all at once.

An exemplary embodiment proposes a method of inducing information corresponding to a current data processing unit, as a method compared with a skip mode. For example, both motion vector information and texture information may be induced instead of being received. The motion vector information may be received, and the texture information may be induced. Alternatively, the motion vector information may be induced, and the texture information may be received. A prediction mode in which only information regarding direct current (DC) coefficients is received may be possible. Various motion vector information inducing methods may be defined for each quantization parameter (Qp).

In an exemplary embodiment, a data processing unit of a skip mode may have a hierarchical structure. For example, if a 16×16 block included in a 32×32 block of a skip mode is processed in a skip mode, a flag that represents a hierarchical structure of a 32×32 skip flag and a 16×16 skip flag may be set. In addition, a group that is a collection of basic blocks corresponding to a skip mode may be formed.

According to exemplary embodiments, video compression performance may be improved by increasing the size of an existing macroblock to bigger sizes so as to efficiently cope with encoding/decoding of the increasing resolution of video contents.

By contrast with an existing H.264 moving picture encoding/decoding method, there is proposed another exemplary embodiment in which a hierarchical concept of a group, a subgroup, and a basic block is implemented as a hierarchical structure of data processing units, namely, a 32×32 super macroblock ('SMB' or 'S-MB'), a 16×16 macroblock (MB), and an 8×8 macroblock. This proposed exemplary embodiment will now be described with reference to FIGS. 10 through 17.

Figure 10:
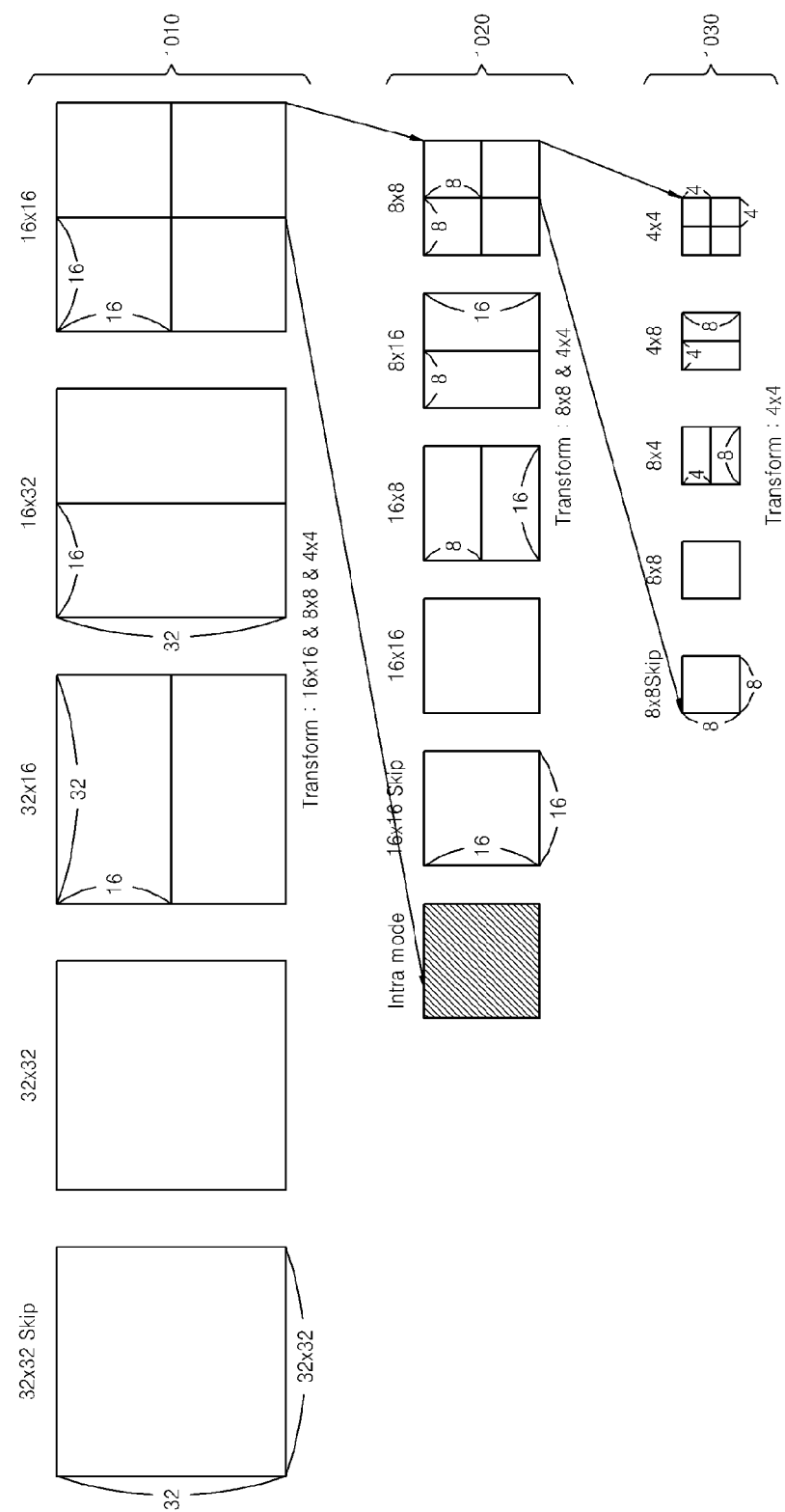
FIG. 10 illustrates a hierarchical structure of a data processing unit, according to an exemplary embodiment.

FIG. 10 illustrates a hierarchical structure 1000 of a data processing unit, according to an exemplary embodiment.

The hierarchical structure 1000 may have three layers, namely, a first layer 1010, a second layer 1020, and a third layer 1030. The first layer 1010 is a 32×32 super macroblock which is the largest. For example, the first layer 1010 may be a single macroblock of a 32×32 skip mode, a single macroblock of a 32×32 inter mode, two macroblocks of a 32×16 inter mode, two macroblocks of a 16×32 inter mode, or four macroblocks of a 16×16 inter mode. The first layer 1010 may be frequency-transformed in units of 16×16 blocks, 8×8 blocks, and 4×4 blocks.

The second layer 1020 is a 16×16 macroblock which is a part of the 32×32 super macroblock of the first layer 1010. For example, the second layer 1020 may be a single macroblock of a 16×16 intra mode, a single macroblock of a 16×16 skip mode, a single macroblock of a 16×16 inter mode, two macroblocks of a 16×8 inter mode, two macroblocks of an 8×16 inter mode, or four macroblocks of an 8×8 inter mode. The second layer 1020 may be frequency-transformed in units of 8×8 blocks and 4×4 blocks.

The third layer 1030 corresponds to an 8×8 macroblock which is a part of the 16×16 macroblock of the second layer 1020. For example, the 8×8 macroblock of the third layer 1030 may be a single block of an 8×8 skip mode, a single block of an 8×8 inter mode, two blocks of an 8×4 inter mode, two blocks of a 4×8 inter mode, or four blocks of a 4×4 inter mode. The third layer 1030 may be frequency-transformed in units of 4×4 blocks.

According to an extended hierarchical structure of a macroblock of an exemplary embodiment, encoding and decoding may be performed in a 32×32 super macroblock mode for large-capacity video data and also in a macroblock mode less than or equal to an 8×8 macroblock mode. In addition, since prediction modes (such as a skip mode, an intramode, etc.) and processing of macroblocks smaller than or equal to a 16×16 macroblock in an extended hierarchical structure of a macroblock according to the exemplary embodiment may be the same as those in an existing encoding/decoding method, costs and time required to establish a new encoding/decoding system may be reduced.

Figure 11:
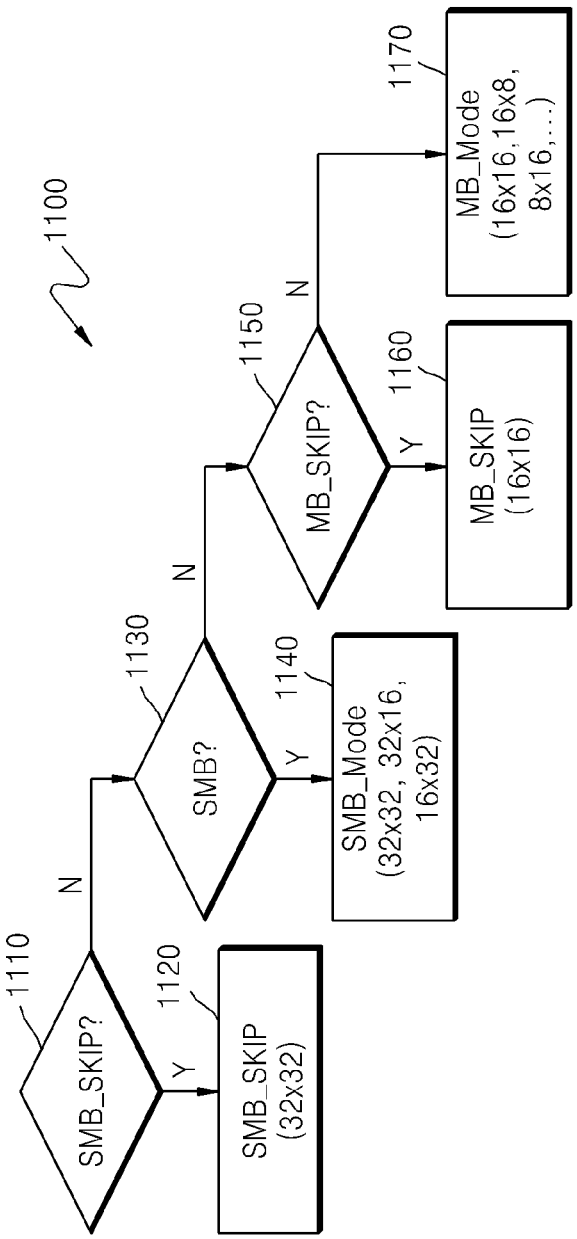
FIG. 11 is a flowchart of an encoding mode in which encoding is performed in units of super macroblocks and macroblocks, according to an exemplary embodiment.

FIG. 11 is a flowchart explaining a syntax of an encoding mode in which encoding is performed in units of SMBs and MBs, according to an exemplary embodiment.

In operation 1110, the group encoding mode reading unit 220 of the image decoding apparatus 200 checks a flag SMB_SKIP that represents whether a current group has been encoded in a skip mode for super macroblocks to determine an encoding mode for the current group. If the value of the flag 'SMB_SKIP' is 1, the group decoding unit 230 performs decoding through motion estimation in a skip mode for 32×32 super macroblocks, in operation 1120.

On the other hand, if the value of the flag 'SMB_SKIP' is 0, the group encoding mode reading unit 220 determines whether the current group has been encoded in units of super macroblocks, in operation 1130. If it is determined in operation 1130 that the current group has been encoded in units of super macroblocks in prediction modes other than a skip mode, a result of the determination is transmitted to the group decoding unit 230, and the group decoding unit 230 performs decoding through motion estimation in units of super macroblocks of a 32×32 inter mode, a 32×16 inter mode, a 16×32 inter mode, and a 16×16 inter mode according to a flag 'SMB_mode', in operation 1140.

A method of performing motion estimation in units of 16×16 inter mode super macroblocks according to an exemplary embodiment may be the same as an existing method of performing motion estimation in units of 16×16 inter mode macroblocks.

On the other hand, if it is determined in operation 1130 that the current group has not been encoded in an inter mode for super macroblocks, the group encoding mode reading unit 220 checks a flag MB_SKIP that represents whether the current group has been encoded in a macroblock-by-macroblock skip mode, in operation 1150.

If it is determined in operation 1150 that the current group has been encoded in the macroblock-by-macroblock skip mode, the result of the determination is transmitted to the group decoding unit 230, and the group decoding unit 230 performs decoding through motion estimation of a skip mode in units of 16×16 super macroblocks according to the flag 'MB_SKIP', in operation 1160.

On the other hand, if it is determined in operation 1150 that the current group has not been encoded in the macroblock-by-macroblock skip mode, the result of the determination is transmitted to the group decoding unit 230, and the group decoding unit 230 performs decoding in units of 16×16 intra mode macroblocks, 16×16 inter mode macroblocks, 16×8 inter mode macroblocks, 8×16 inter mode macroblocks, or 8×8 inter mode macroblocks or in units of sub macroblocks smaller than 8×8 macroblocks according to a flag 'SMB_mode', in operation 1170.

Figure 12:
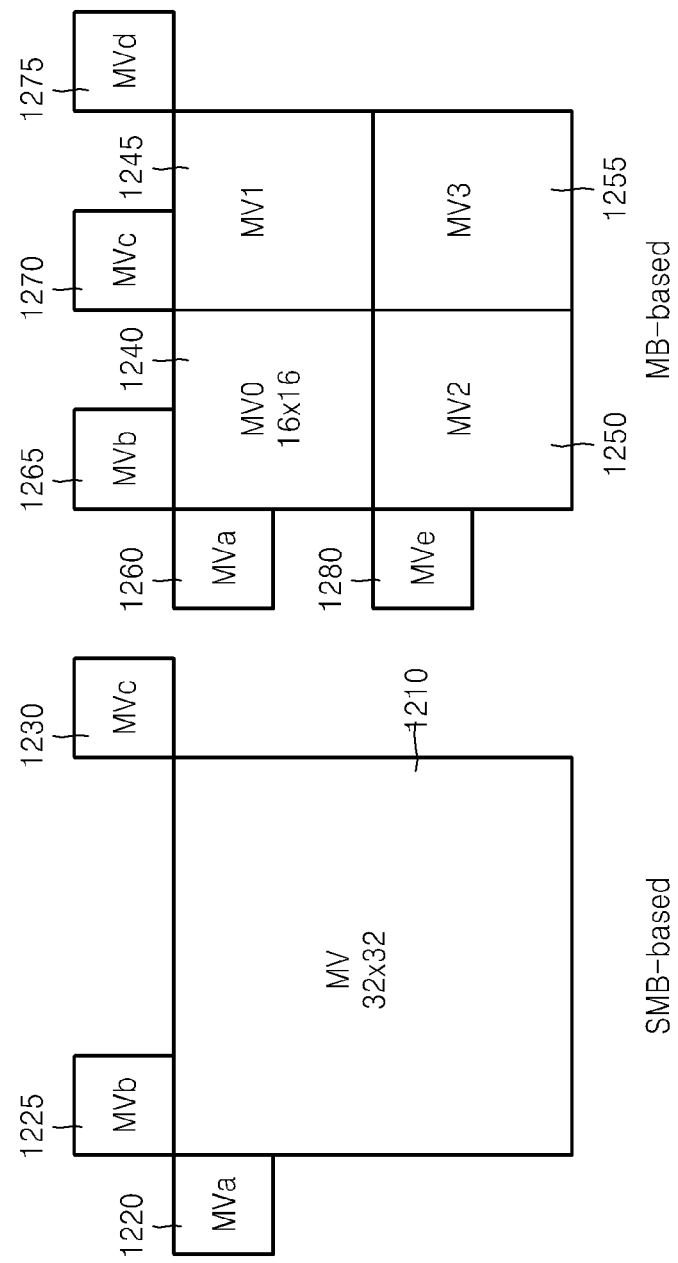
FIG. 12 illustrates a motion vector estimating method performed when an encoding mode is a skip mode, according to an exemplary embodiment.

FIG. 12 illustrates a motion vector estimating method performed when an encoding mode is a skip mode, according to an exemplary embodiment.

The image encoding apparatus 100 and the image decoding apparatus 200 may use a motion vector estimating method based on super macroblocks or a motion vector estimating method based on macroblocks, to estimate motion vectors of blocks corresponding to a skip mode.

In an example of the motion vector estimating method based on super macroblocks, a motion vector of a 32×32 skip mode super macroblock may be estimated using motion vectors of blocks neighboring the 32×32 skip mode super macroblock. The neighboring blocks may be macroblocks or super macroblocks. For example, a motion vector of a super macroblock is estimated according to Equation 1:

$$MV = \text{Median}(MVa, MVb, MVc) \quad \text{Equation (1)}$$

wherein a function Median(•) denotes a function of outputting a median value of an input. In other words, a motion vector MV 1210 of a super macroblock is determined to be a motion vector having a median value of a motion vector MVa 1220 of a left block located on the left side of the super macroblock from among blocks neighboring the super macroblocks, a motion vector MVb 1225 of an upper block located on the upper side of the super macroblock, and a motion vector MVc 1230 of a right block located on the right side of the super macroblock.

In an example of the motion vector estimating method based on macroblocks, a motion vector of a 16×16 skip mode macroblock may be estimated using motion vectors of blocks neighboring the 16×16 skip mode macroblock. For example, a motion vector of a macroblock may be estimated according to Equations 2, 3, 4, and 5:

$$MV0 = \text{Median}(MVa, MVb, MVc) \quad \text{Equation (2)}$$

$$MV1 = \text{Median}(MV0, MVc, MVd) \quad \text{Equation (3)}$$

$$MV2 = \text{Median}(MVe, MV0, MV1) \quad \text{Equation (4)}$$

$$MV3 = \text{Median}(MV0, MV1, MV2) \quad \text{Equation (5)}$$

Each of the motion vectors of 16×16 skip mode macroblocks MV0 1240, MV1 1245, MV2 1250, and MV3 1255 is determined to be a motion vector having a median value of respective motion vectors of a left block, an upper block, and a left upper block, from among blocks neighboring each of the 16×16 skip mode macroblocks MV0 1240, MV1 1245, MV2 1250, and MV3 1255. In other words, the motion vector of the macroblock MV0 1240 is determined to be a median value of motion vectors of blocks MVa 1260, MVb 1265, and MVc 1270 according to Equation 2, the motion vector of the macroblock MV1 1245 is determined to be a mean value of motion vectors of the blocks MV0 1240 and MVc 1270 and a block MVd 1275 according to Equation 3, the motion vector of the macroblock MV2 1250 is determined to be a mean value of motion vectors of a block MVe 1280 and the blocks MV0 1240 and MV1 1245 according to Equation 4, and the motion vector of the macroblock MV3 1255 is determined to be a mean value of motion vectors of the blocks MV2 1250, MV0 1240, and MV1 1245 according to Equation 5.

The image encoding apparatus 100 may encode a flag that represents whether a motion vector estimating method is performed in units of super macroblocks or in units of macroblocks, and insert the flag into slices or data pieces of a predetermined data unit. The image decoding apparatus 200 may extract the flag associated with the motion vector estimating method from each slice or each predetermined data unit and use the flag when estimating a motion vector of a super macroblock or a macroblock.

Figure 13:
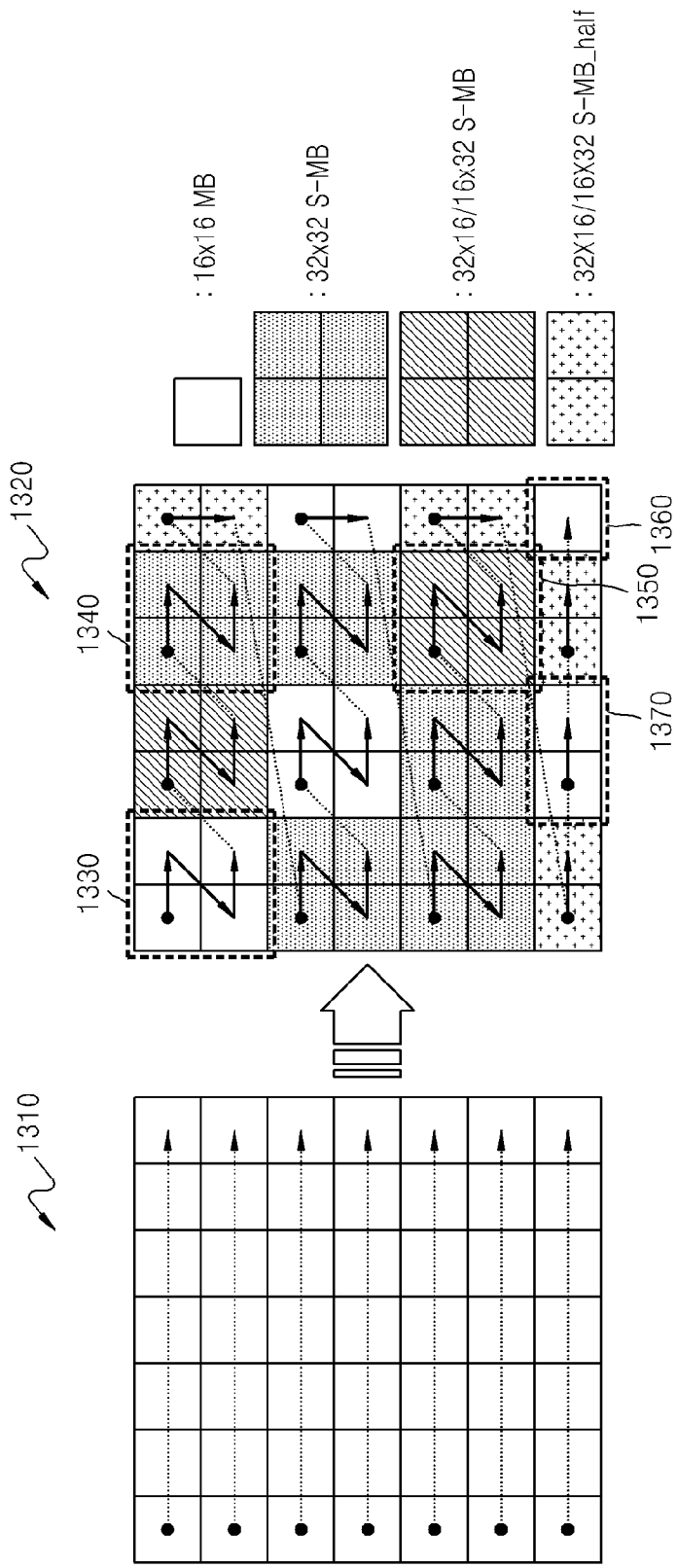
FIG. 13 illustrates a sequence of encoding and decoding each data processing unit, according to an exemplary embodiment.

FIG. 13 illustrates a sequence of encoding and decoding each data processing unit, according to an exemplary embodiment.

To support an extended macroblock mode having a three-layered hierarchical structure, a zigzag scanning method 1320 in units of 16×16 macroblocks, instead of a raster scanning method 1310 that horizontally scans each macroblock, is used in an image encoding or decoding operation of the exemplary embodiment.

For example, a current macroblock may be a 16×16 macroblock (MB) included in a collection of 16×16 MBs like a block 1330, an MB included in a 32×32 super macroblock S-MB like a block 1340, an MB included in a pair of 32×16 or 16×32 super macroblocks 32×16/16×32 S-MB like a block 1350, an MB included in a 32×16 or 16×32 half-super macroblock 32×16/16×32S-MB_half like a block 1370, or a 16×16 MB like a block 1360.

The group encoding mode determination unit 120 of the image encoding apparatus 100 may compare an RD cost generated due to encoding of a single 32×32 super macroblock with that generated due to encoding of four 16×16 macroblocks, and determine whether encoding is performed in either a 32×32 super macroblock mode or a 16×16 macroblock mode.

Since an existing encoding or decoding system can be used without big changes in its structure, that is, by only changing a scanning method, due to the use of a macroblock zigzag-scanning method, the exemplary embodiment can be implemented using an existing encoding or decoding system.

An edge portion of an image that does not conform to the size of a super macroblock may be processed using a 32×16 or 16×32 half-super macroblock like the block 1370 or a 16×16 macroblock like the block 1360.

Figure 14:
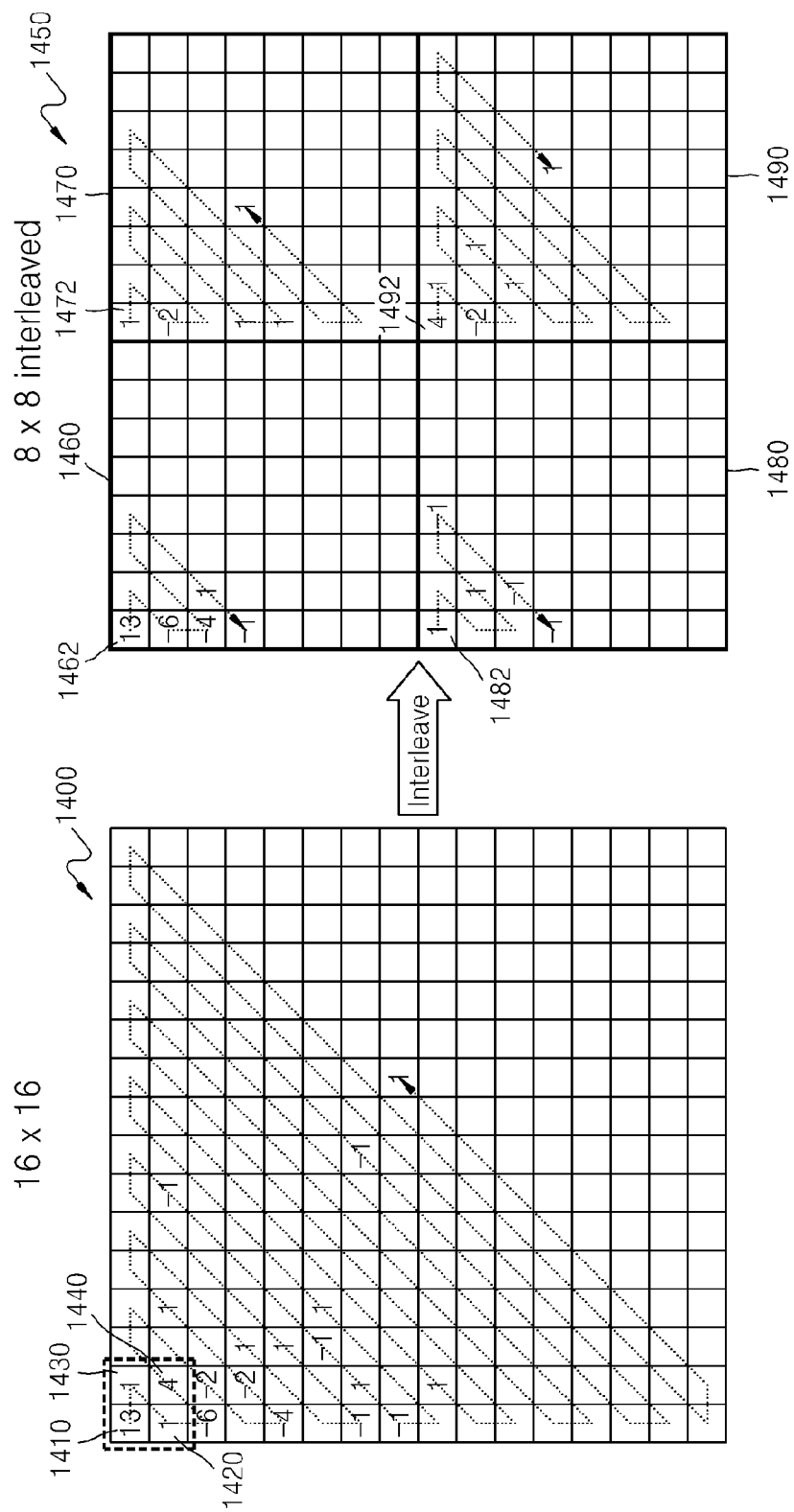
FIG. 14 illustrates a method of arranging frequency coefficients, according to an exemplary embodiment.

FIG. 14 illustrates a method of arranging frequency coefficients, according to an exemplary embodiment.

In an image encoding process and an image decoding process according to the exemplary embodiment, frequency coefficients 1400 of a 16×16 block may be rearranged into 8×8 macroblocks 1450 according to an interleaving method. The frequency coefficients 1400 rearranged in units of 8×8 macroblocks 1450 may be entropy-encoded or decoded in units of 8×8 macroblocks 1450.

In an example of a method of rearranging the coefficients of a 16×16 block according to an interleaving method performed in units of 8×8 macroblocks, the coefficients of the 16×16 block may be rearranged into a left upper 8×8 macroblock, a right upper 8×8 macroblock, a left lower 8×8 macroblock, and a right lower 8×8 macroblock according to the positions of the coefficients of the 16×16 block.

According to the coefficient rearrangement sequence, a left upper coefficient from among the coefficients included in a 2×2 block of a 16×16 block is arranged into a left upper 8×8 macroblock 1460. In other words, a coefficient 1410 of the 16×16 block is arranged as a coefficient 1462 of the left upper 8×8 macroblock 1460.

A right upper coefficient from among the coefficients included in the 2×2 block of the 16×16 block is arranged into a right upper 8×8 macroblock 1470. In other words, a coefficient 1430 of the 16×16 block is arranged as a coefficient 1472 of the right upper 8×8 macroblock 1470.

Similarly, a left lower coefficient from among the coefficients included in the 2×2 block of the 16×16 block is arranged into a left lower 8×8 macroblock 1480. In other words, a coefficient 1420 of the 16×16 block is arranged as a coefficient 1482 of the left lower 8×8 macroblock 1480.

Similarly, a right lower coefficient from among the coefficients included in the 2×2 block of the 16×16 block is arranged into a right lower 8×8 macroblock 1490. In other words, a coefficient 1440 of the 16×16 block is arranged as a coefficient 1492 of the right lower 8×8 macroblock 1490.

Figure 15:
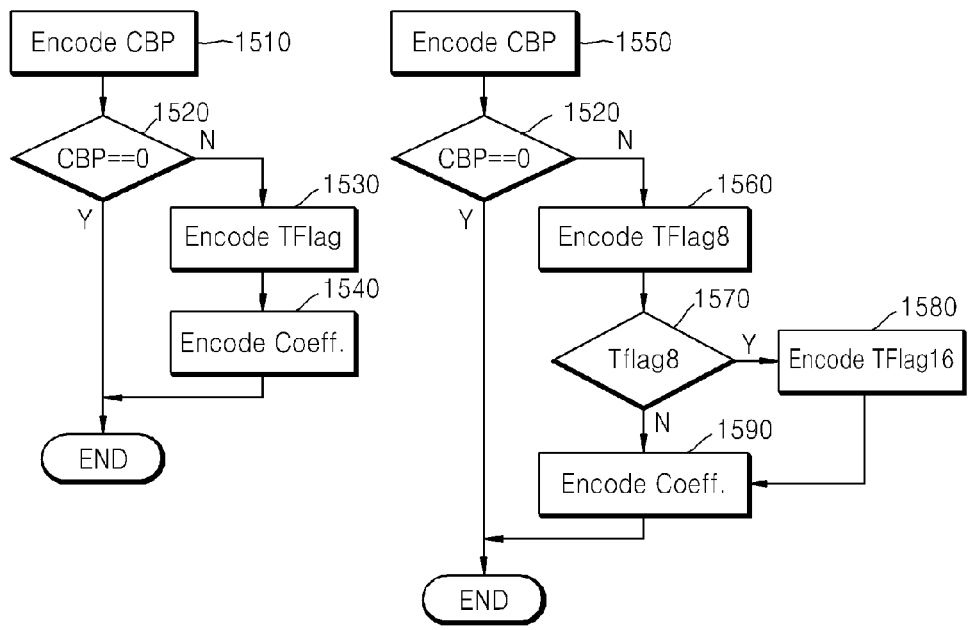
FIG. 15 illustrates a related encoding method (left) and a syntax encoding method (right) associated with a coded block pattern (CBP) and the size of a coefficient block, according to an exemplary embodiment.

FIG. 15 illustrates an related encoding method 1510 (on the left of FIG. 15) and a syntax encoding method 1550 (on the right of FIG. 15) according to an exemplary embodiment, wherein the latter is associated with a coded block pattern (CBP) and the size of a coefficient block.

In the related encoding method 1510 of encoding a coefficient obtained in consideration of a CBP, in operation 1520, the value of the CBP is checked. If the CBP value is 0, the method 1510 is concluded. On the other hand, if the CBP value is not 0, a flag TFlag representing the size of a coefficient block is encoded, in operation 1530. In operation 1540, a current coefficient is encoded. In this way, the encoding of the coefficient obtained in consideration of the CBP is completed. When coefficients obtained by frequency transformation in units of 8×8 or 4×4 blocks are arranged according to a related encoding and decoding method, the flag 'Tflag' may represent whether the coefficients have been obtained in units of 8×8 or 4×4 blocks.

In the syntax encoding method 1550 of the exemplary embodiment which considers a CBP, in operation 1520, the value of the CBP is checked. If the CBP value is 0, the method 1550 is concluded. On the other hand, if the CBP value is not 0, a flag TFlag8 representing where a current coefficient is a coefficient obtained in units of 8×8 or 4×4 blocks is encoded, in operation 1560. In operation 1570, it is determined whether the current coefficient is a coefficient obtained in units of 4×4 blocks. If the current coefficient is a coefficient obtained in units of 4×4 blocks, the current coefficient is encoded, in operation 1590. In this way, the encoding of the coefficient obtained in consideration of the CBP is completed.

On the other hand, if the current coefficient is not obtained in units of 4×4 blocks, a flag TFlag16 representing where the current coefficient is a coefficient obtained in units of 8×8 or 16×16 blocks is encoded, in operation 1580. In operation 1590, the current coefficient is encoded. In this way, the encoding of the coefficient obtained in consideration of the CBP is completed.

Accordingly, encoding by performing frequency transformation, and decoding by performing frequency inverse-transformation in data processing units of variable block sizes may be performed by using the two flags TFlag8 and TFlag16 associated with the data processing units into which frequency-transformed coefficients are arranged.

In connection with frequency transformation, an exemplary embodiment may use not only the size of a block into which frequency-transformed coefficients are arranged, but also frequency transformation in units of integers. The length of an End of Block (EOB) may be reduced through a coefficient block obtained according to an 8×8 interleaving method. When the value of the flag 'Tflag8' is 1, an overhead for a 16×16 inter mode additionally requires only one bit.

Since energy compression efficiency is increased due to various size blocks, a frequency transformation frequency may be reduced.

Figure 16:
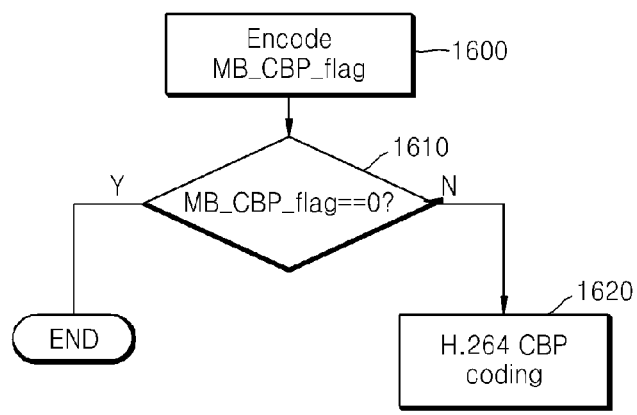
FIG. 16 is a flowchart of a CBP-related syntax, according to an exemplary embodiment.

FIG. 16 is a flowchart for explaining a CBP-related syntax according to an exemplary embodiment.

The image encoding apparatus 200 uses a method of encoding a hierarchical CBP. In operation 1600, a flag MB_CBP_flag representing whether the CBP has been encoded is encoded. In operation 1610, it is determined whether the value of the flag 'MB_CBP_flag' is 0. If it is determined that the value of the flag 'MB_CBP_flag' is 0, additional information is not needed, and thus the CBP encoding is concluded. On the other hand, if it is determined that the value of the flag 'MB_CBP_flag' is 1, encoding of the CBP for a corresponding macroblock is performed, in operation 1620.

The image decoding apparatus 200 may extract the flag 'MB_CBP_flag' from received data and determine whether CBP decoding with respect to a macroblock to be decoded is needed.

Figure 17:
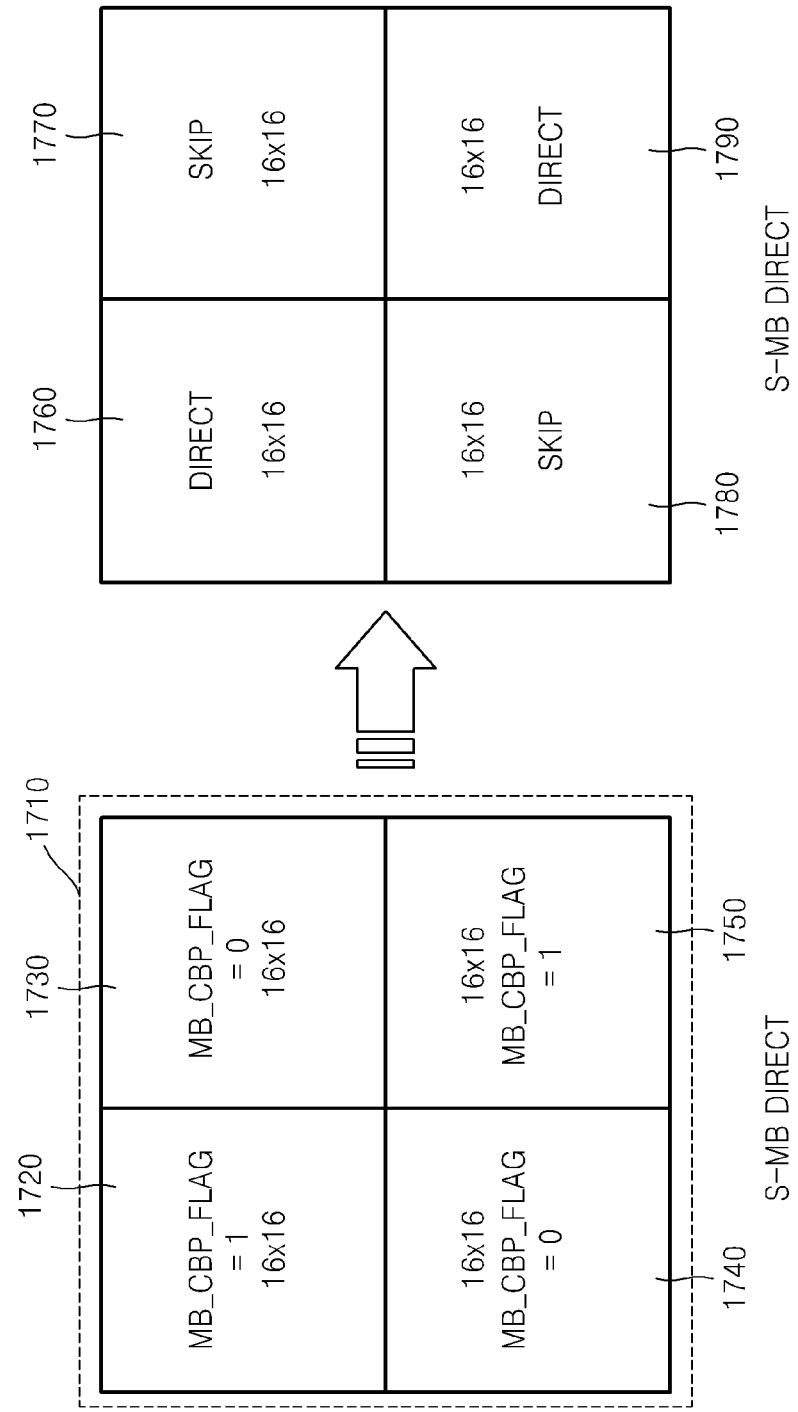
FIG. 17 illustrates an encoding mode for a B frame, according to an exemplary embodiment.

FIG. 17 illustrates an encoding mode for a B frame, according to an exemplary embodiment.

The image encoding apparatus 100 and the image decoding apparatus 200 may use an S-MB direct mode as the encoding mode for a B frame. If an encoding mode for a current super macroblock is the S-MB direct mode, texture coding should be performed.

For example, flags MB_CBP_FLAG respectively included in 16×16 macroblocks 1720, 1730, 1740, and 1750 of a 32×32 super macroblock 1710, each flag representing whether CBP encoding has been performed, represent whether the 16×16 macroblocks 1720, 1730, 1740, and 1750 have been encoded in a skip mode or a direct mode.

That is, since the 16×16 macroblocks 1720 and 1750 having flags 'MB_CBP_FLAG' of 1 are macroblocks 1760 and 1790 of the direct mode, a motion vector of 16×16 macroblocks 1720 and 1750 may be predicted using a motion prediction method which is the same as a direct mode conforming to the H.264 standard.

Since the 16×16 macroblocks 1730 and 1740 having flags 'MB_CBP_FLAG' of 0 are macroblocks 1770 and 1780 of the direct mode, further information for motion vector estimation is not needed.

In an example of the image encoding apparatus 100 and the image decoding apparatus 200, a block which is a data processing unit for a dynamic range division method may be determined based on a quantization parameter, a resolution, or sequence characteristics. In addition, data pieces corresponding to a data processing unit may be classified in not only horizontal and vertical directions but also various other directions.

In the above-described three-level hierarchical structure, a first level may include not only super macroblocks of a skip mode and an intermode, but also a super macroblock of a prediction mode corresponding to a combination of an intramode and an intermode.

An encoding mode or a data processing unit may be set for each data unit, such as a picture, a sequence, a slice, and a macroblock, and may be represented as a maximum or minimum basic block size and a branched layer level. A binary tree of the hierarchical structure of data processing units may be extended into an n-ary tree (where n is an integer more than 2).

In an exemplary embodiment of the image encoding apparatus 100 and the image decoding apparatus 200, block sizes may be maintained in a decreasing order from the size of a block for motion estimation, to the size of a block for frequency transformation, through to the size of a block for deblocking filtering. In addition, a data processing unit for motion estimation and a data processing unit for frequency transformation may be incorporated or separated when represented.

Intra-mode or inter-mode macroblocks that constitute a group may be formed as a group including an arbitrary number of basic blocks. In this case, block estimation may be performed based on the size of a group, or frequency transformation may be performed based on the size of a group.

An arbitrary number of skip-mode macroblocks may constitute a group.

Figure 18:
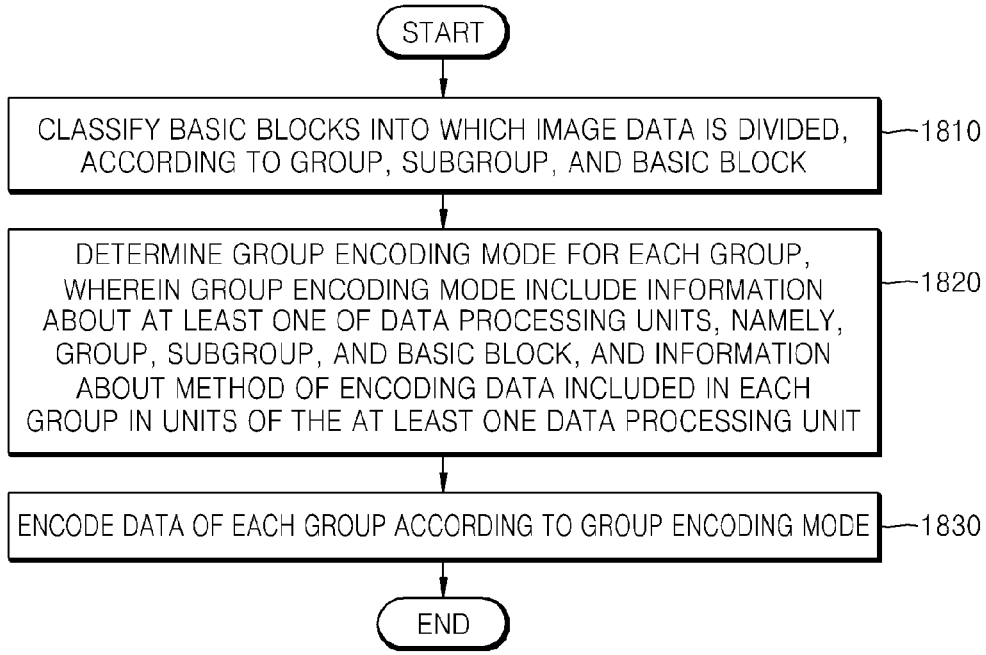
FIG. 18 is a flowchart of an image encoding method, according to an exemplary embodiment.

FIG. 18 is a flowchart of an image encoding method according to an exemplary embodiment.

In operation 1810, basic blocks into which image data is divided are classified according to an extended concept including a group, a subgroup, and a basic block. A group may have properties such as a size representing the number of basic blocks included in the group, a shape of the group, and a maximum level of the group. A subgroup may be set according to a level and a scan sequence.

In operation 1820, a group encoding mode for each group is determined, including information about at least one of data processing units, namely, a group, a subgroup, and a basic block, and information about a method of encoding the data included in each group in units of the at least one data processing unit.

The group encoding mode for each group may be determined based on error rates that are generated due to encoding of the data of each group in units of different types of data processing units that are each smaller than or equal to the size of each group. An encoding error rate of a predetermined group, a lowest error rate of the encoding error rates of the subgroups included in the group, and a lowest error rate of the encoding error rates of the basic blocks included in the group are compared with one another, and thus an optimal data processing unit and an optimal prediction mode are selected. The group encoding mode for each group includes information about an optimal data processing unit and an optimal prediction mode for each group.

In operation 1830, the data of each group is encoded according to the group encoding mode. Not only information representing image data and an encoding mode for each group, but also information about whether frequency-transformed coefficients of the data of each group have been rearranged in units of a predetermined data processing unit, CBP encoding information, etc. may be encoded and inserted into transmission data.

Figure 19:
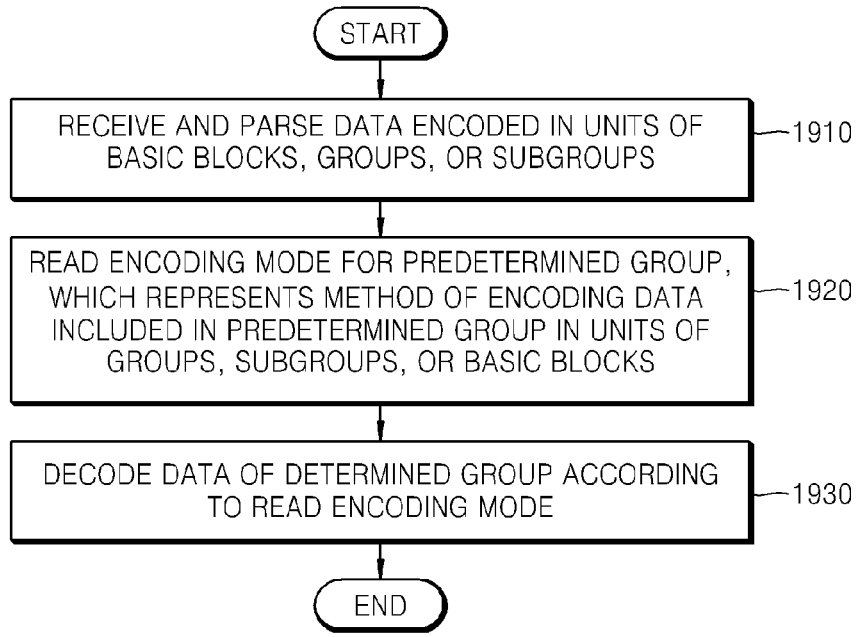
FIG. 19 is a flowchart of an image decoding method, according to an exemplary embodiment.

FIG. 19 is a flowchart of an image decoding method according to an exemplary embodiment.

In operation 1910, data encoded in data processing units of one of a basic block, a group, and a subgroup, is received, and information required during encoding is parsed from the received data. Image data which is to be decoded may be parsed from the received data. Parameters required for image decoding may be parsed from the received data.

In operation 1920, an encoding mode for a predetermined group, which represents a method of encoding data included in the predetermined group in units of one of a group, a subgroup, and a basic block, is read from the data parsed in operation 1910.

To determine each group, information representing the size, shape, and maximum level of the group is extracted and read from the parsed data. If each group is determined, an encoding mode for the determined group is extracted and read.

In operation 1930, data included in the determined group corresponding to the read encoding mode is decoded.

The data included in the determined group is decoded using information about a data processing unit, indicating in which units the determined group should be decoded, information about the size and shape of the data processing unit, and information about a motion prediction mode. These pieces of information are extracted and read from the encoding mode for the predetermined group.

II. Image Encoding Apparatus Based on Data Processing Unit

FIGS. 20A, 20B, 20C, 20D, 20E, and 20F are block diagrams of modified exemplary embodiments of the image encoding apparatus 100 that consider a dynamically determined data processing unit.

The group encoding unit 130 of the image encoding apparatus 100 performs frequency transformation and quantization, motion estimation including inter prediction and intra prediction, in-loop filtering, and entropy encoding, to encode the data of a group based on a data processing unit and a prediction mode that are based on the group encoding mode determined by the group encoding mode determination unit 120.

The image encoding apparatus 100 dynamically determines a data processing unit of the group. Accordingly, the data processing unit of the group may be a group, a subgroup, or a basic block that form a hierarchical structure.

Since the data processing unit dynamically determined by the image encoding apparatus 100 may be a data processing unit that is not defined in an existing image encoding format, a unique process distinguished from related image encoding processes is required. For example, when a large data processing unit having a size larger than a 16×16 or 8×8 macroblock is used, the group encoding unit 130 should perform image encoding through a process that considers the large data processing unit.

Figure 20A:
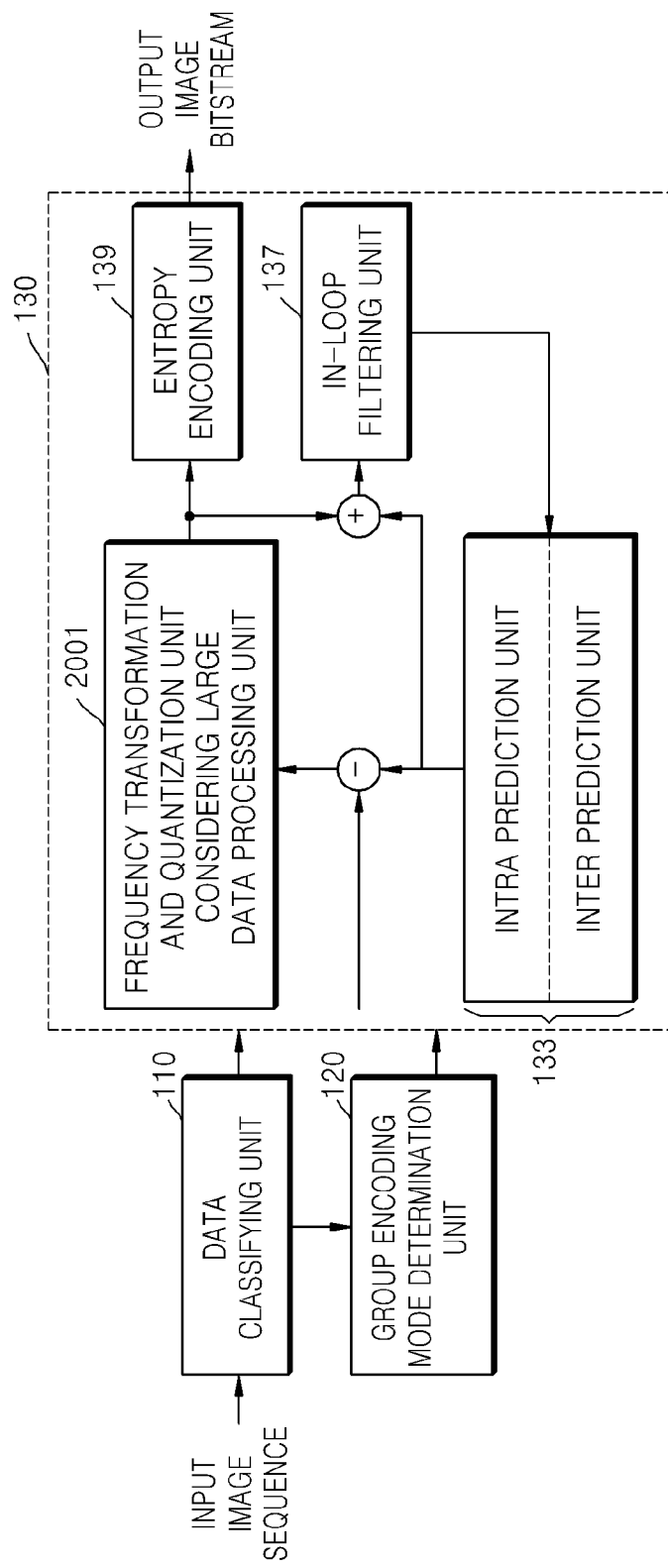

FIG. 20A is a block diagram of a case where frequency transformation and quantization, considering a large data processing unit, is applied to the group encoding unit 130 of the image encoding apparatus 100.

A first exemplary embodiment of the group encoding unit 130 of the image encoding apparatus 100 includes a frequency transformation and quantization unit 2001 considering a large data processing unit, a motion estimation unit 133 including an intra prediction unit and an inter prediction unit, an in-loop filtering unit 137, and an entropy encoding unit 139.

The frequency transformation and quantization unit 2001 considering the large data processing unit according to the first exemplary embodiment in the group encoding unit 130 may perform integer discrete cosine transformation and quantization based on the large data processing unit in order to perform frequency transformation and quantization by a large data processing unit based on the group encoding mode determined by the group encoding mode determination unit 120.

The frequency transformation and quantization unit 2001 considering the large data processing unit according to the first exemplary embodiment in the group encoding unit 130 may perform discrete cosine transformation and quantization on a chroma component of a large data processing unit, to perform frequency transformation and quantization by the large data processing unit.

The frequency transformation and quantization unit 2001 considering the large data processing unit according to the first exemplary embodiment in the group encoding unit 130 may perform low-complexity discrete cosine transformation, in order to reduce the number of calculations that may be added by discrete cosine transformation based on the large data processing unit.

Figure 20B:
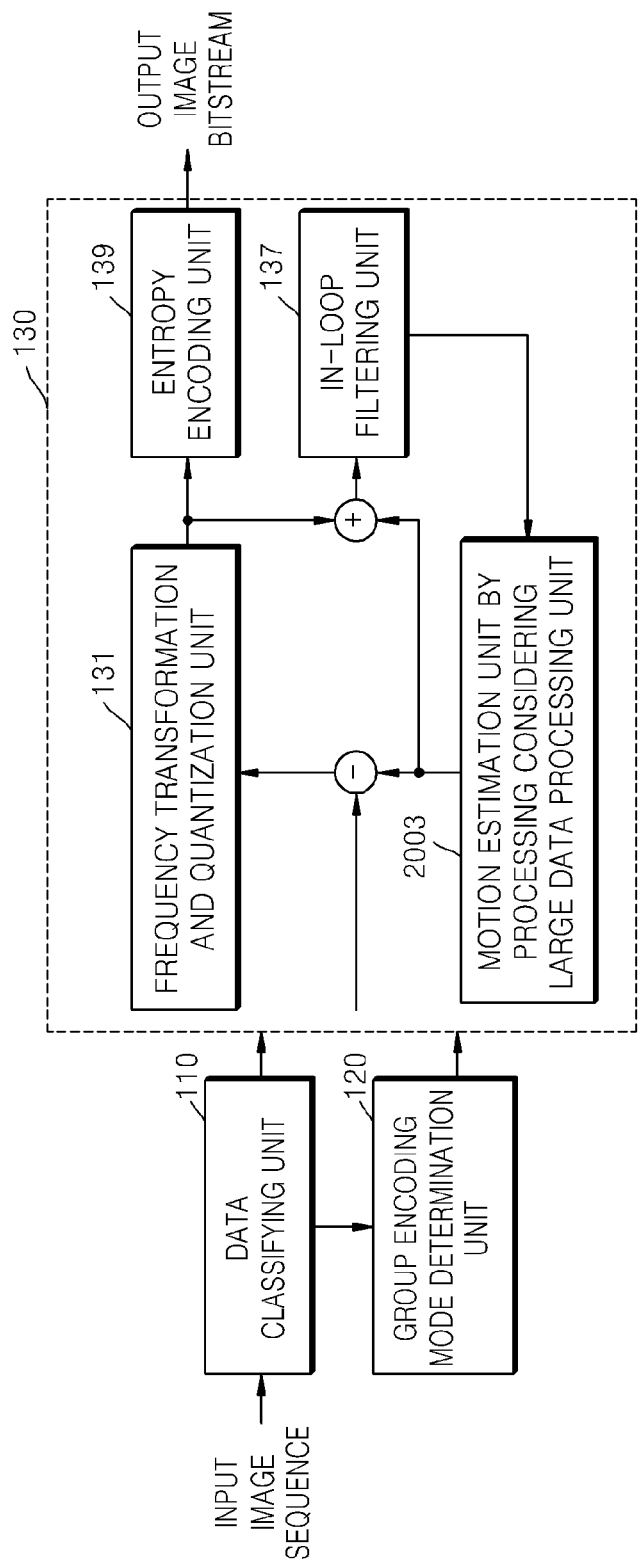

FIG. 20B is a block diagram of a case where motion estimation processing considering a large data processing unit is applied to the group encoding unit 130 of the image encoding apparatus 100.

A second exemplary embodiment of the group encoding unit 130 of the image encoding apparatus 100 includes a frequency transformation and quantization unit 131, a motion estimation unit 2003 by processing considering the large data processing unit, the in-loop filtering unit 137, and the entropy encoding unit 139. Intra prediction and inter prediction may be performed based on the processing considering the large data processing unit.

The motion estimation unit 2003 by the processing considering the large data processing unit according to the second exemplary embodiment in the group encoding unit 130 may previously determine a combination of a large data processing unit for motion estimation and a large data processing unit for frequency transformation, in consideration of a large data processing unit based on the group encoding mode determined by the group encoding mode determination unit 120. The size of the data processing unit for frequency transformation may be smaller than that of the data processing unit for motion estimation.

The motion estimation unit 2003 by the processing considering the large data processing unit according to the second exemplary embodiment in the group encoding unit 130 may determine a scanning method for motion estimation for each data processing unit and neighbor availability in which a neighboring block can be used as a reference block, in consideration of the large data processing unit.

The motion estimation unit 2003 by the processing considering the large data processing unit according to the second exemplary embodiment in the group encoding unit 130 may use a simplified encoding mode using only a square-shaped data processing unit in consideration of the large data processing unit, in order to reduce bit rate of bits representing an encoding mode.

Figure 20C:
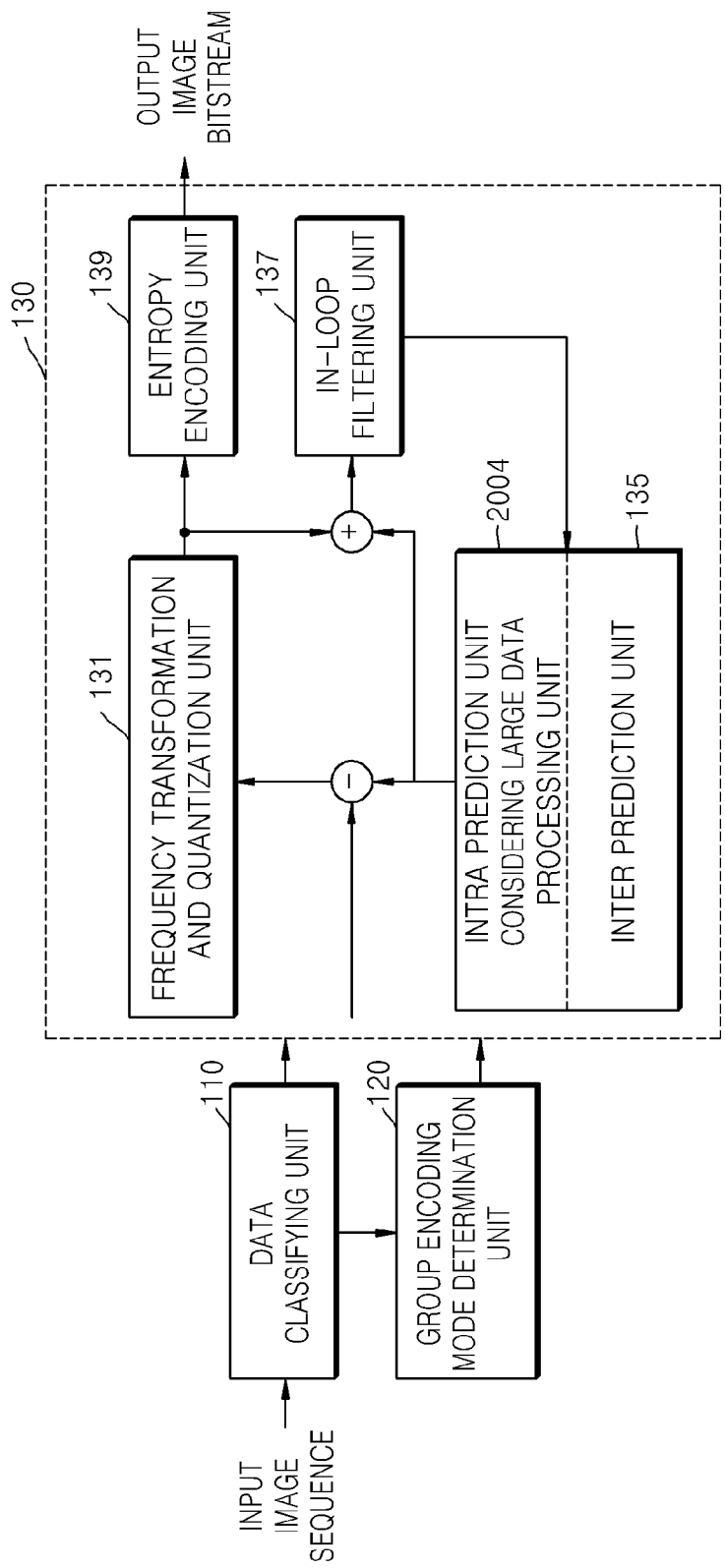

FIG. 20C is a block diagram of a case where intra prediction considering a large data processing unit is applied to the group encoding unit 130 of the image encoding apparatus 100.

A third exemplary embodiment of the group encoding unit 130 of the image encoding apparatus 100 includes the frequency transformation and quantization unit 131, an intra prediction unit 2004 considering a large data processing unit, an inter prediction unit 135, the in-loop filtering unit 137, and the entropy encoding unit 139.

The intra prediction unit 2004 considering the large data processing unit according the third exemplary embodiment in the group encoding unit 130 may additionally define an intra mode for performing intra prediction with respect to a predetermined large data processing unit.

The intra prediction unit 2004 considering the large data processing unit according the third exemplary embodiment in the group encoding unit 130 may use a prediction mode using a complex plain into the intra mode, in order to perform more accurate intra prediction with respect to a larger data processing unit.

The intra prediction unit 2004 considering the large data processing unit according the third exemplary embodiment in the group encoding unit 130 may restrict the type of large data processing unit on which intra prediction can be performed.

Figure 20D:
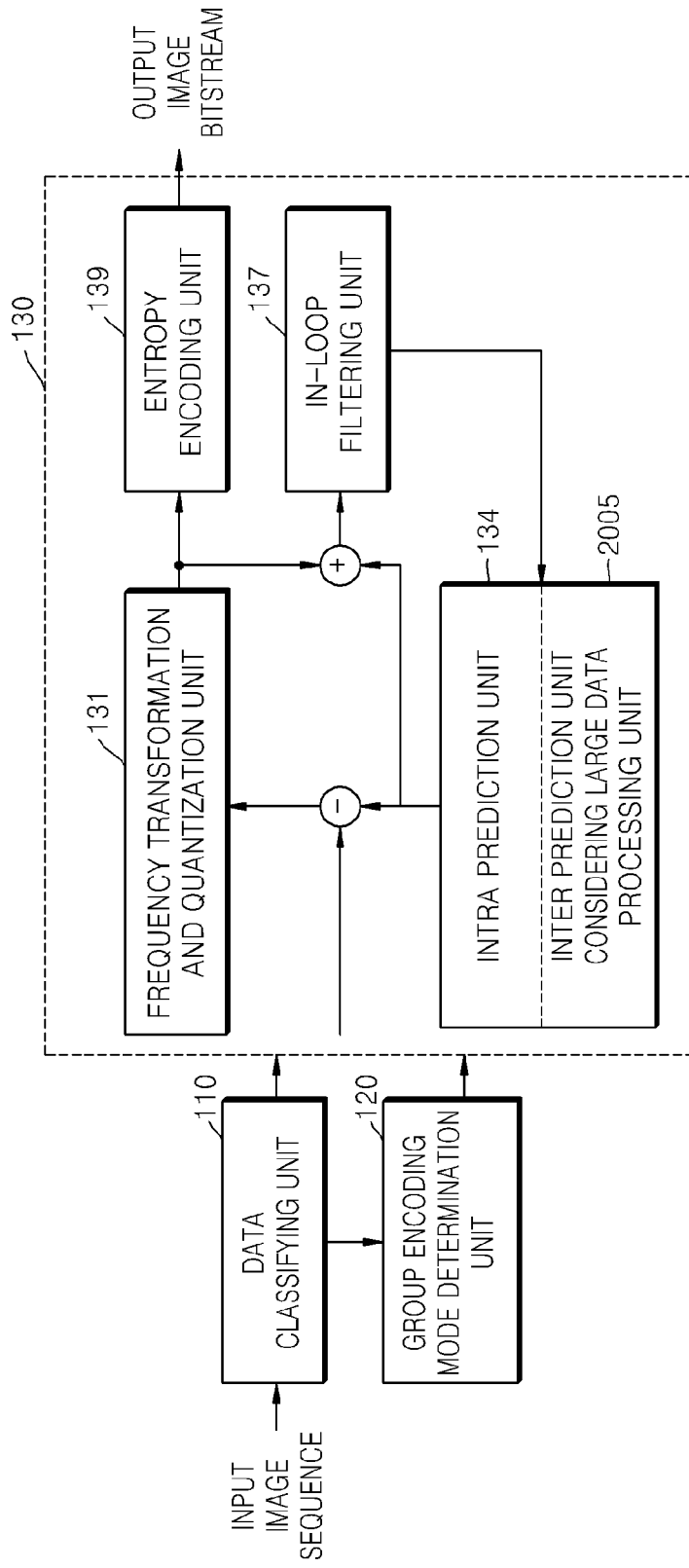

FIG. 20D is a block diagram of a case where inter prediction considering a large data processing unit is applied to the group encoding unit 130 of the image encoding apparatus 100.

A fourth exemplary embodiment of the group encoding unit 130 of the image encoding apparatus 100 includes the frequency transformation and quantization unit 131, an intra prediction unit 134, an inter prediction unit 2005 considering a large data processing unit, the in-loop filtering unit 137, and the entropy encoding unit 139.

The inter prediction unit 2005 considering the large data processing unit according the fourth exemplary embodiment in the group encoding unit 130 may use a combination mode in which inter prediction and intra prediction can be mixed, as a prediction mode of the large data processing unit.

The inter prediction unit 2005 considering the large data processing unit according the fourth exemplary embodiment in the group encoding unit 130 may determine a motion vector (MV) for each large data processing unit and induce a motion vector predictor (MVP) according to the MV.

The inter prediction unit 2005 considering the large data processing unit according the fourth embodiment in the group encoding unit 130 may newly use a skip mode for a large data processing unit and set a skip group including a plurality of data processing units of a plurality of skip modes. All of the data processing units of the skip modes included in the skip group may be skipped all together.

Figure 20E:
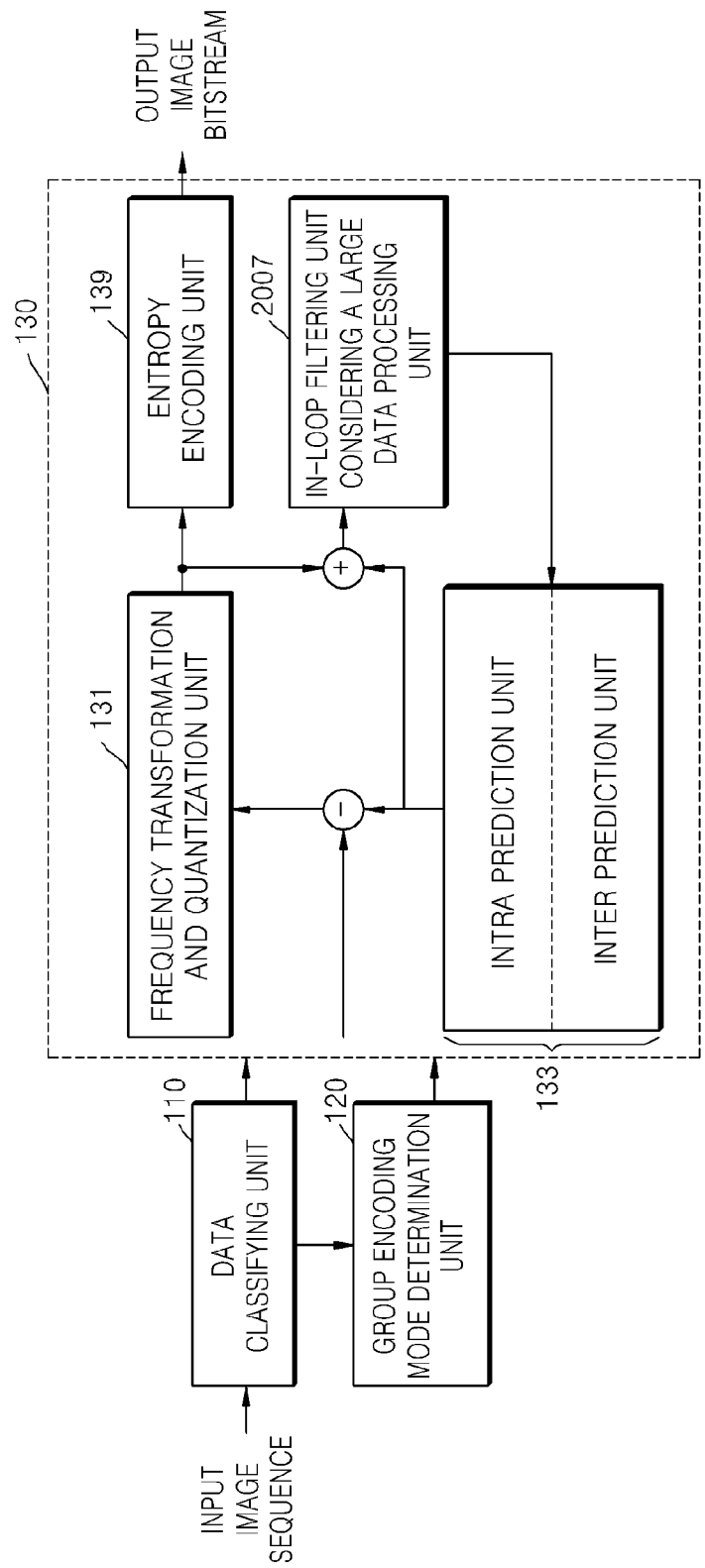

FIG. 20E is a block diagram of a case where in-loop filtering considering a large data processing unit is applied to the group encoding unit 130 of the image encoding apparatus 100.

A fifth exemplary embodiment of the group encoding unit 130 of the image encoding apparatus 100 includes the frequency transformation and quantization unit 131, the motion estimation unit 133 including an intra prediction unit and an inter prediction unit, an in-loop filtering unit 2007 considering a large data processing unit, and the entropy encoding unit 139.

The in-loop filtering unit 2007 considering the large data processing unit according the fifth exemplary embodiment in the group encoding unit 130 may determine whether a boundary of a lower data processing unit in a large data processing unit is filtered, and adjust the degree of the filtering.

The in-loop filtering unit 2007 considering the large data processing unit according the fifth exemplary embodiment in the group encoding unit 130 may perform in-loop filtering for reducing a ringing effect generated within the large data processing unit.

FIG. 20F is a block diagram of a case where entropy encoding considering a large data processing unit is applied to the group encoding unit 130 of the image encoding apparatus 100.

A sixth exemplary embodiment of the group encoding unit 130 of the image encoding apparatus 100 includes the frequency transformation and quantization unit 131, the motion estimation unit 133 including an intra prediction unit and an inter prediction unit, the in-loop filtering unit 137, and an entropy encoding unit 2009 considering a large data processing unit.

The entropy encoding unit 2009 considering the large data processing unit according the sixth exemplary embodiment in the group encoding unit 130 defines a coded block pattern (CBP) for the large data processing unit. The entropy encoding unit 2009 may also scan the CBP based on the probability that a CBP, which is not 0, exists within a data processing unit.

The entropy encoding unit 2009 considering the large data processing unit according the sixth embodiment in the group encoding unit 130 may apply context-based adaptive binary arithmetic coding (CABAC) or context-based adaptive variable length coding (CAVLC) to a large data processing unit.

The entropy encoding unit 2009 considering the large data processing unit according the sixth exemplary embodiment in the group encoding unit 130 may set a new context of a CBP for a large data processing unit.

The first through sixth exemplary embodiments of the group encoding unit 130 are unique processes that can be performed considering a large data processing unit for each encoding process. Hereinafter, a method of encoding an image sequence based on a large block from among large data processing units on the entire image encoding process will be described with reference to FIG. 20G.

Figure 20G:
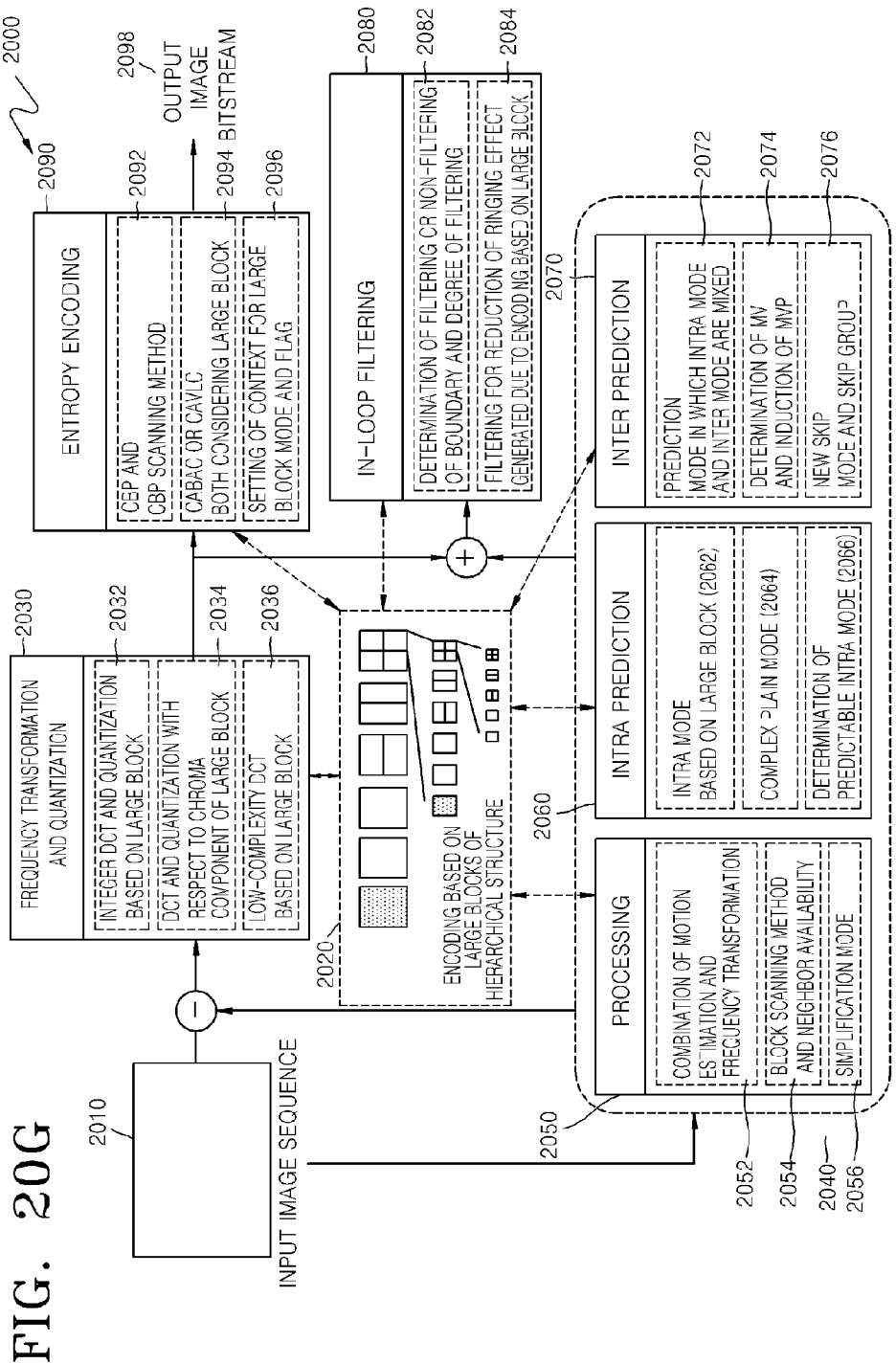
FIG. 20G illustrates an outline of image encoding methods that consider a dynamically determined data processing unit for a large data processing unit, according to an exemplary embodiment.

FIG. 20G illustrates an outline 2000 of image encoding methods that consider a data processing unit dynamically determined for a large data processing unit according to an exemplary embodiment.

According to the outline 2000 of image encoding methods, an input image sequence 2010 is encoded by using a block corresponding to a predetermined encoding mode from a hierarchical structure 2020 of blocks. The hierarchical structure 2020 of blocks is the same as that of groups, subgroups, and basic blocks described above with reference to FIG. 10.

According to the outline 2000 of image encoding methods, an image bitstream output operation s2098 is performed after a frequency transformation and quantization operation s2030, a motion estimation operation s2040, an in-loop filtering operation s2080, an entropy encoding operation s2090. The motion estimation operation s2040 includes an intra prediction operation s2060 and an inter prediction operation s2070 which are based on predetermined processing 2050.

Since the image encoding method s2000 considers a large block, a unique process considering the large block may be performed in the frequency transformation and quantization operation s2030, the processing 2050 for motion estimation, the intra prediction operation s2060, the inter prediction operation s2070, the in-loop filtering operation s2080, and the entropy encoding operation s2090.

For example, the unique process considering the large block in the frequency transformation and quantization operation s2030 may include at least one selected from the group consisting of integer discrete cosine transformation (DCT) and quantization 2032 based on the large block, DCT and quantization 2034 with respect to a chroma component of the large block, and a low-complexity DCT 2036 based on the large block.

The unique process considering the large block in the processing 2050 for motion estimation may include at least one selected from the group consisting of a combination 2052 of a large block for motion estimation and a large block for frequency transformation, a block scanning method and neighbor availability 2054 for motion estimation, and a simplification mode 2056 of a hierarchical structure large block.

The unique process considering the large block in the intra prediction operation s2060 may include at least one selected from the group consisting of introduction 2062 of an intra mode based on the large block, introduction 2064 of a complex plain for intra prediction, and determination 2066 of a predictable intra mode.

The unique process considering the large block in the inter prediction operation s2070 may include at least one selected from the group consisting of introduction 2072 of a prediction mode in which an intra mode and an inter mode are mixed, an operation 2074 of determining an MV of the large block and inducing an MVP, and introduction 2076 of a new skip mode and a skip group of the large group.

The unique process considering the large block in the in-loop filtering operation s2080 may include at least one selected from the group consisting of determination 2082 of filtering or non-filtering of a boundary within the large block and the degree of the filtering, and filtering 2084 for reduction of the ringing effect generated in the large block.

The unique process considering the large block in the entropy encoding operation s2090 may include at least one selected from the group consisting of an operation 2092 corresponding to a CBP for the large block and an CBP scanning method, CABAC or CAVLC 2094 both considering the large block, and a method 2096 of setting a context for the CBP of the large block.

In the image encoding apparatus 100 or the outline 2000 of image encoding methods both considering a large data processing unit, described above with reference to FIGS. 20A through 20G, an image can be encoded by adding or replacing unique processes considering a large data processing unit, without greatly changing an existing image encoding format.

Although only image encoding has been described above with reference to FIGS. 20A through 20G, the unique processes considering a large data processing unit may be applied to image decoding corresponding to the image encoding. Accordingly, a unique process for each operation which will be described below may be applied not only to image encoding but also to image decoding.

III. Motion Prediction Processing

Unique processing of the motion estimation unit 133 of the group encoding unit 130 of the image encoding apparatus 100, and the processing 2050 for motion estimation in the image encoding method 2000 will now be described in greater detail. The processing 2050 for motion estimation, which will be described below, may also be applied to an image decoding apparatus corresponding to the image encoding apparatus 100.

The processing 2050 for motion estimation may be characterized by the combination 2052 of a large data processing unit for motion estimation and a data processing unit for frequency transformation, the block scanning method and neighbor availability 2054 for motion estimation, and the simplification mode 2056 of a large block.

First, as the data processing unit for motion estimation is enlarged to be equal to or greater than an existing 16×16 or 8×8 macroblock, the data processing unit for frequency transformation may be enlarged in proportion to the data processing unit for motion estimation, so as to be equal to or greater than a maximum size of the data processing unit for motion estimation.

In other words, when the data processing unit for motion estimation is a 32×32 or 16×16 macroblock, the data processing unit for frequency transformation may be combined into a 32×32 block, a 16×16 block, a 8×8 block, or a 4×4 block according to the data processing unit for motion estimation.

Second, the scanning method and neighbor availability of a neighboring block 2054 will be described below with reference to FIGS. 21 and 22.

Figure 21:
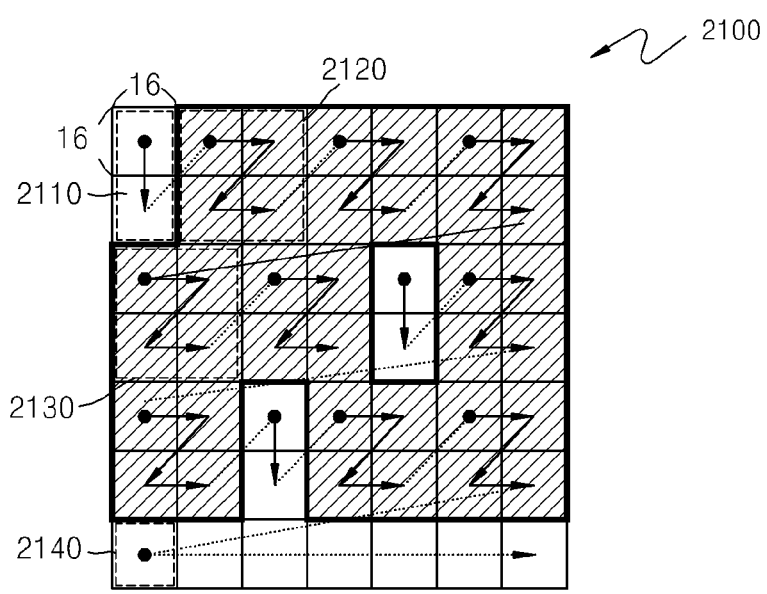
FIG. 21 illustrates a scanning method performed for each type of data processing unit to perform motion estimation designed for a large data processing unit, according to an exemplary embodiment.

FIG. 21 illustrates a scanning method for each data processing unit to perform motion estimation that considers a large data processing unit according to an exemplary embodiment. As the scanning method in units of super macroblocks has been described above with reference to FIG. 13, a large data processing unit within the frame 1320 is scanned in a zigzag scanning method, so that an encoding mode is determined.

As in FIG. 13, super macroblocks within the frame 1320 may be arranged parallel to each other in vertical and horizontal directions, so that blocks are arranged in units of 64×64 large blocks. The scanning method for motion estimation according to an exemplary embodiment may also be applied to a case where super macroblocks are not arranged within a frame 2100 as in FIG. 21, besides a case where super macroblocks are arranged within the frame 1320 as in FIG. 13.

For example, a first scan target 2110 of the frame 2100 may not be a square-shaped super macroblock. Super macroblocks 2140 having square shapes, which are scanned in a zigzag manner, may not necessarily be arranged parallel to each other. A super macroblock 2120 and a super macroblock 2130 are adjacent to each other but are not arranged in a line.

Although not scanned in units of square-shaped super macroblocks 32×32 S-MB and 32×16/16×32 S-MB, scanning may be performed in units of 16×16 macroblocks 2140 at a location where scanning may be performed in units of a rectangular super macroblock 32×16/16×32 S-MB_half.

When scan target blocks are arranged as in the frame 1320 of FIG. 13, a neighboring block may be used as a reference block in the same method as an existing method related with a neighboring block estimation and context. However, when no scan target blocks are arranged as in the frame 2100 of FIG. 21, since a reference block varies according to circumstances, an MVP or an intra predictor of a current block may be set to indicate a block that is closest to the current block and has the same size as the current block.

In a simplification mode where only square-shaped blocks 32×32 S-MB, 32×16/16×32 S-MB, and 16×16 MB can be set, calculation complexity and signaling that are additionally generated may be controlled.

Figure 22:
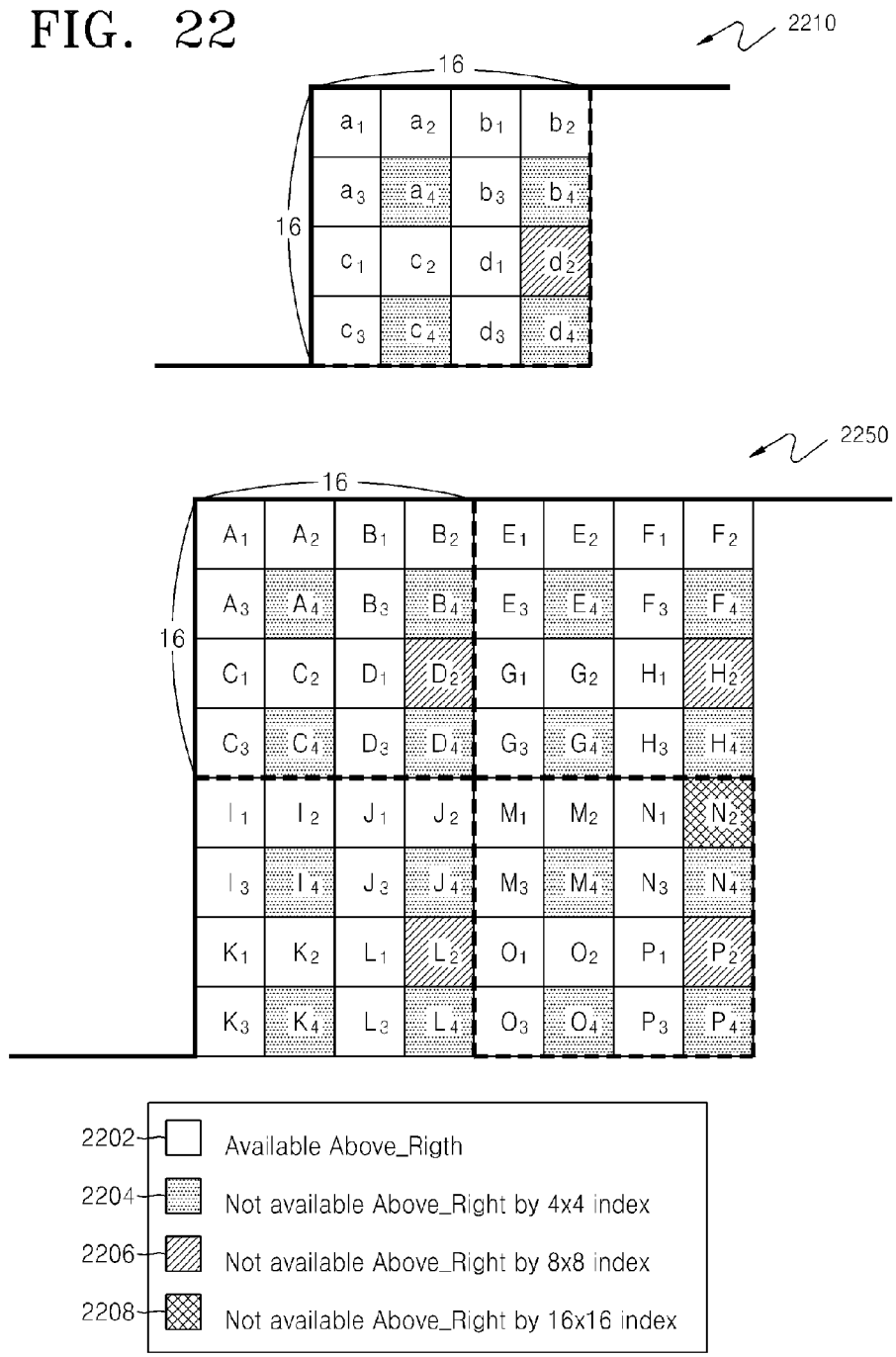
FIG. 22 illustrates a scanning method performed for each type of data processing unit to perform motion estimation designed for a large data processing unit, according to an exemplary embodiment.

FIG. 22 illustrates availability of a neighboring data processing unit in motion estimation considering a large data processing unit according to an exemplary embodiment. An existing 16×16 macroblock 2200 and a 32×32 super macroblock 2250 are used as examples of a data processing unit.

During MVP and intra prediction, whether a neighboring block located on the right upper side of a current block can be used as a reference block (hereinafter, referred to as neighbor availability) may be determined according to a location index unit and whether the neighboring block has already been scanned.

The neighbor availability will now be described with reference to FIG. 22, illustrating a case where a square block is used as a data processing unit. The blocks included in a frame are classified into a first block group 2202 capable of referring to right upper neighbor blocks in units of 4×4 blocks, being a minimum data unit, a second block group 2204 incapable of referring to right upper neighbor blocks only in a 4×4 index case, a third block group 2206 incapable of referring to right upper neighbor blocks only in a 8×8 index case, and a fourth block group 2208 incapable of referring to right upper neighbor blocks only in a 16×16 index case.

For example, in the existing 16×16 macroblock 2210, 4×4 blocks $a_1, a_2, a_3, b_1, b_2, b_3, c_1, c_2, c_3, d_1$, and $d_2$ correspond to the first block group 2202 capable of referring to right upper neighbor blocks. 4×4 blocks $a_4, b_4, c_4$, and $d_4$ correspond to the second block group 2204 incapable of referring to right upper neighbor blocks only in a 4×4 index case. A 4×4 blocks $d_2$ corresponds to the third block group 2206 incapable of referring to right upper neighbor blocks only in a 8×8 index case.

Accordingly, in the existing 16×16 macroblock 2210, the blocks may be classified into the first block group 2202, the second block group 2204, and the third block group 2206 in relation to the neighbor availability.

When a large data processing unit according to an exemplary embodiment is used, an 16×16 index may be added in addition to a 4×4 or 8×8 index in order to determine a reference block. Accordingly, the fourth block group 2208 incapable of referring to right upper neighbor blocks only in a 16×16 index case may exist.

In the 32×32 super macroblock 2250, 4×4 blocks $A_1, A_2, A_3, B_1, B_2, B_3, C_1, C_2, C_3, D_1, D_3, E_1, E_2, E_3, F_1, F_2, F_3, G_1, G_2, G_3, H_1, H_3, I_1, I_2, I_3, J_1, J_2, J_3, K_1, K_2, K_3, L_1, L_3, M_1, M_2, M_3, N_1, N_3, O_1, O_2, O_3, P_1$, and $P_3$ correspond to the first block group 2202 capable of referring to right upper neighbor blocks.

4×4 blocks $A_4, B_4, C_4, D_4, E_4, F_4, G_4, H_4, I_4, J_4, K_4, L_4, M_4, N_4, O_4$ and $P_4$ correspond to the second block group 2204 incapable of referring to right upper neighbor blocks only in a 4×4 index case. 4×4 blocks $D_2, H_2, L_2$ and $P_2$ correspond to the third block group 2206 incapable of referring to right upper neighbor blocks only in a 8×8 index case.

A 4×4 blocks N2 corresponds to the fourth block group 2208 incapable of referring to right upper neighbor blocks only in a 16×16 index case.

The neighbor availability of right upper neighboring blocks may be used as a condition for determining an MVP or an intra predictor, or as input parameters of an induction function of an MVP or an intra predictor. Accordingly, when a large data processing unit is used according to an exemplary embodiment, the neighbor availability of right upper neighboring blocks by the 16×16 index may also be used as the condition for determining an MVP or an intra predictor or as an input parameter of the induction function of the MVP or the intra predictor.

A simplified encoding mode using only a square-shaped data processing unit will now be described with reference to FIGS. 23A and 23B.

Figure 23A:
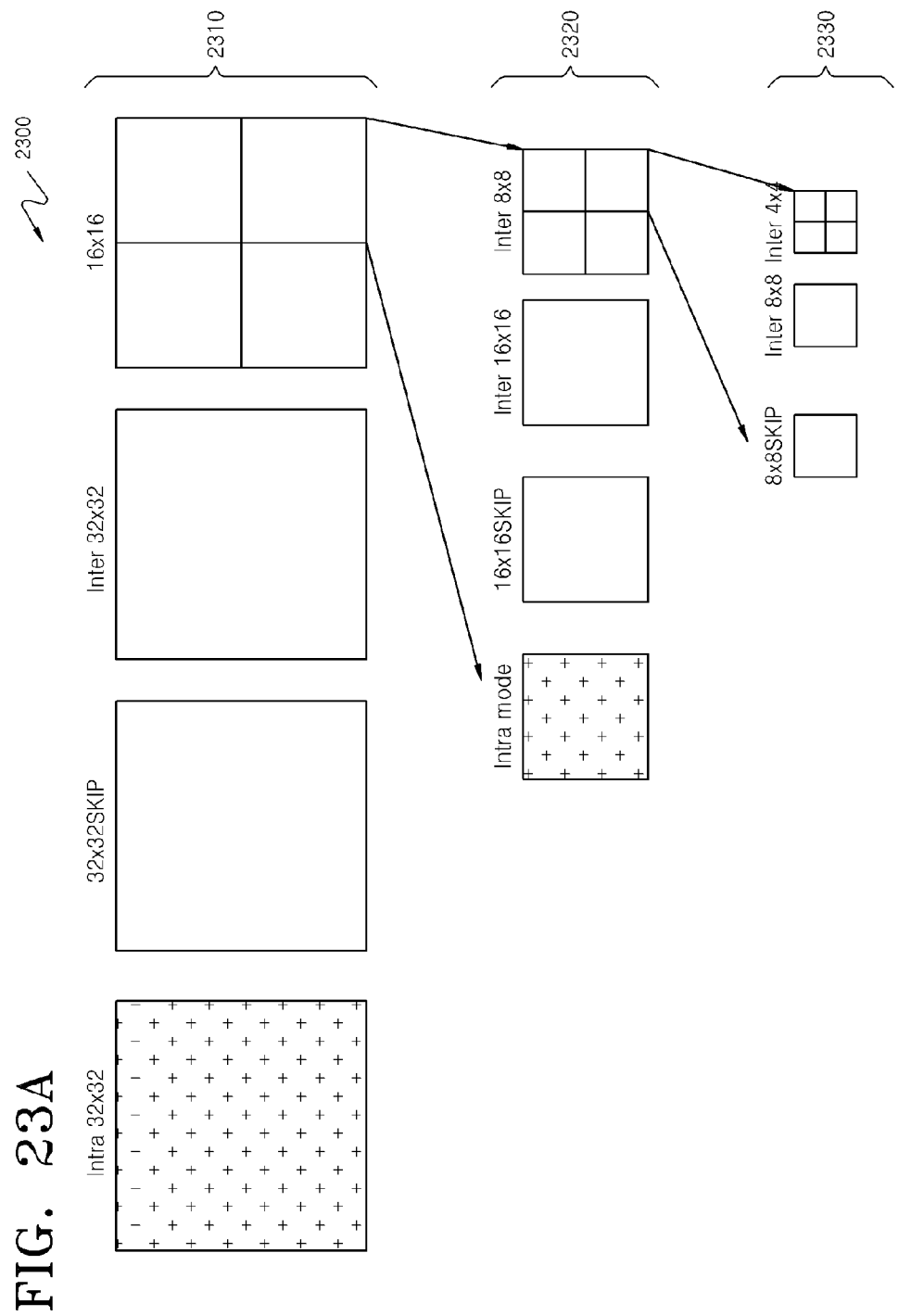
FIG. 23A illustrates simplified hierarchical data processing units from among a large data processing unit, according to an exemplary embodiment.

FIG. 23A illustrates a simplified hierarchical data processing unit from among large data processing units according to an exemplary embodiment.

According to the hierarchical structure 1000 of a data processing unit described above in FIG. 10, a data processing unit according to an exemplary embodiment includes both square blocks 32×32, 16×16, 8×8, and 4×4 and rectangular blocks 32×16, 16×32, 16×8, 8×16, 8×4, and 4×8. According to the hierarchical structure 1000 of the data processing unit, encoding based on various data processing units may be performed.

The image encoding apparatus 100 may be simplified into a hierarchical structure 2300 of data processing units including only square blocks.

A first layer 2310 may include a 32×32 super macroblock of an intra mode, a 32×32 super macroblock of a skip mode, a 32×32 super macroblock of an inter mode, and a 16×16 macroblock. The first layer 2310 may be frequency-transformed in units of at least one selected from the group consisting of a 32×32 block, a 16×16 block, a 8×8 block, and a 4×4 block.

A second layer 2320 may include a 16×16 super macroblock of an intra mode, a 16×16 super macroblock of a skip mode, a 16×16 super macroblock of an inter mode, and a 8×8 macroblock of an inter mode. The second layer 2320 may be frequency-transformed in units of at least one selected from the group consisting of a 16×16 block, a 8×8 block, and a 4×4 block.

A third layer 2330 may include a 8×8 super macroblock of a skip mode, a 8×8 super macroblock of an inter mode, and a 4×4 block of an inter mode. The third layer 2330 may be frequency-transformed in units of at least one selected from the group consisting of a 8×8 block and a 4×4 block.

According to the simplified hierarchical structure 2300 of data processing units, an inter mode block and an intra mode block both having the same size and the same shape exist. As the number of encoding modes decreases, bits representing the encoding modes may decrease.

Figure 23B:
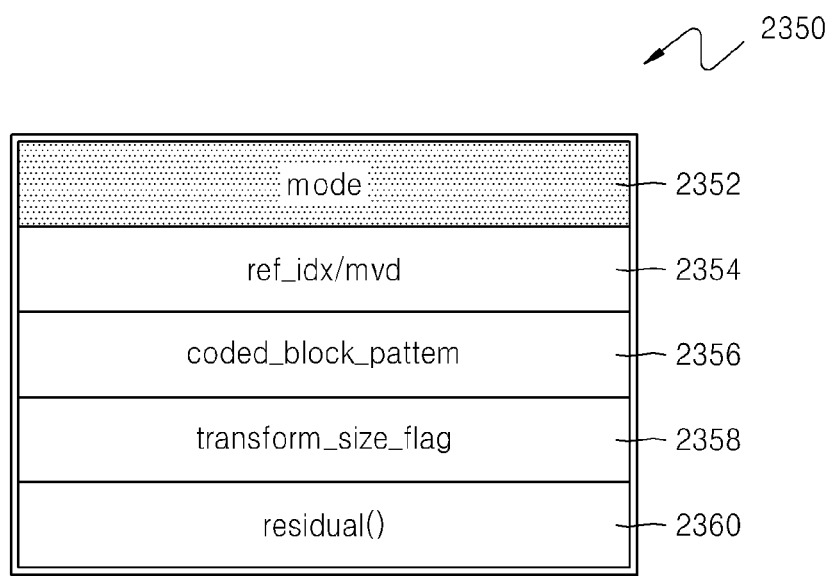
FIG. 23B illustrates a syntax designed for a large data processing unit, according to an exemplary embodiment.

FIG. 23B illustrates a syntax 2350 considering a large data processing unit according to an exemplary embodiment. The syntax 2350 includes various pieces of information about an encoding mode of a predetermined data processing unit.

A value 'mode' 2352 indicates the encoding mode. A value 'ref_idx/mvd' 2354 indicates a reference index and a deviation of an MV. A value 'coded_block_pattern' 2356 indicates a CBP. A value 'transform_size_flag' 2358 indicates the size of a data processing unit for frequency transformation. A value 'residual( )' 2360 indicates information about a residual component.

According to the simplified hierarchical structure 2300 of data processing units, a bit for the value 'mode' 2352 may be saved. When the size of the data processing unit for frequency transformation based on the encoding mode is restricted, the value 'coded_block_pattern' 2356 and the value 'transform_size_flag' 2358 in the syntax 2350 may be changed.

III-1. Intra Prediction

The intra prediction unit 2004 of the image encoding apparatus 100, and the intra estimation operation s2060 of the image encoding method 2000 may use a unique process considering a large data processing unit.

First, an intra mode 2062 based on the large block is included in the intra prediction operation s2060. For example, a 32×32 super macroblock of an intra mode and a 16×16 macroblock of an intra mode may be added.

Second, a prediction mode using a complex plain for delicate intra prediction may be used.

Third, an encoding mode representing the possibility of intra prediction may be determined for each data processing unit.

III-2. Inter Prediction

The inter prediction unit 2005 of the image encoding apparatus 100, and the inter prediction operation s2070 of the image encoding method 2000 may use a unique process considering a large data processing unit.

First, a prediction mode in which an intra mode and an inter mode are mixed may be set for an arbitrary large data processing unit. lso, an intra mode and an inter mode may be mixed and set for each lower data processing unit in a large data processing unit.

Second, a skip mode for a large data processing unit may be newly defined, and a skip group including a data processing unit of at least one skip mode may be used. For example, a 32×32 super macroblock of a skip mode, and a skip group including a plurality of 32×32 super macroblocks of skip modes are proposed through FIGS. 24A through 24C.

Figure 24A:
FIGS. 24A, 24B, and 24C illustrate methods of constructing a skip group, according to an exemplary embodiment.
Figure 24B:
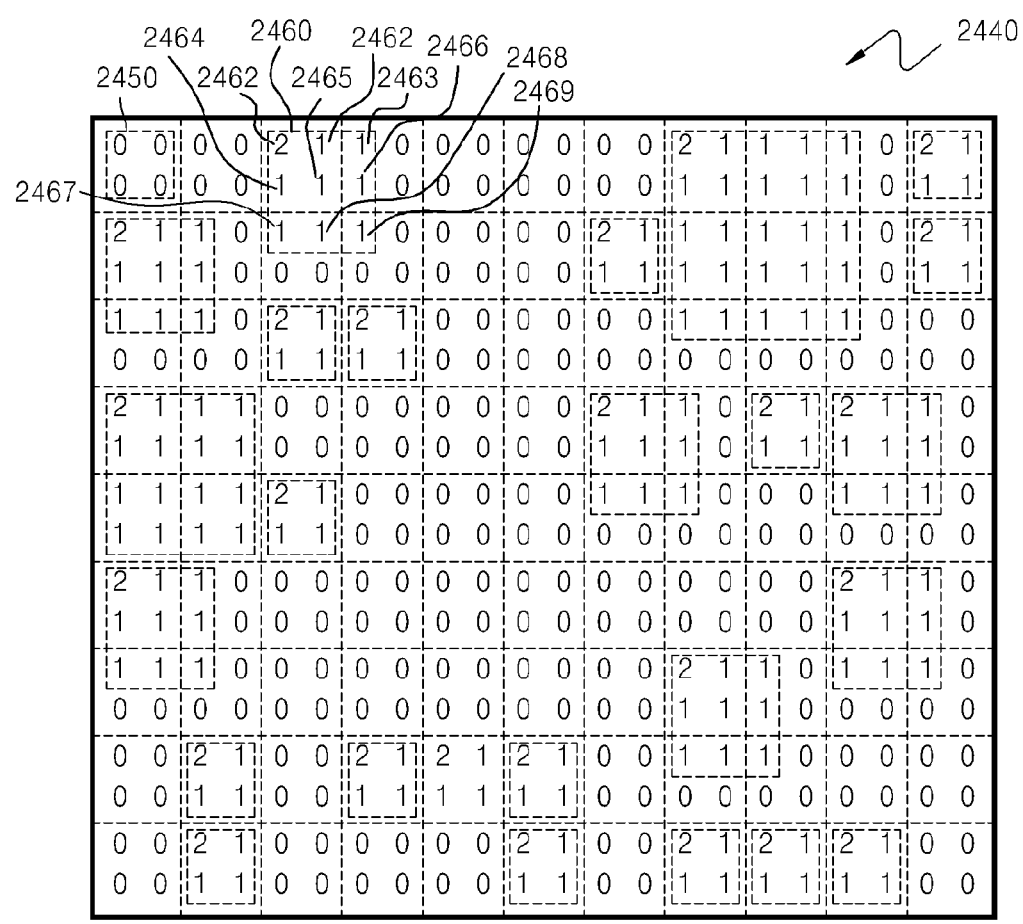
Figure 24C:
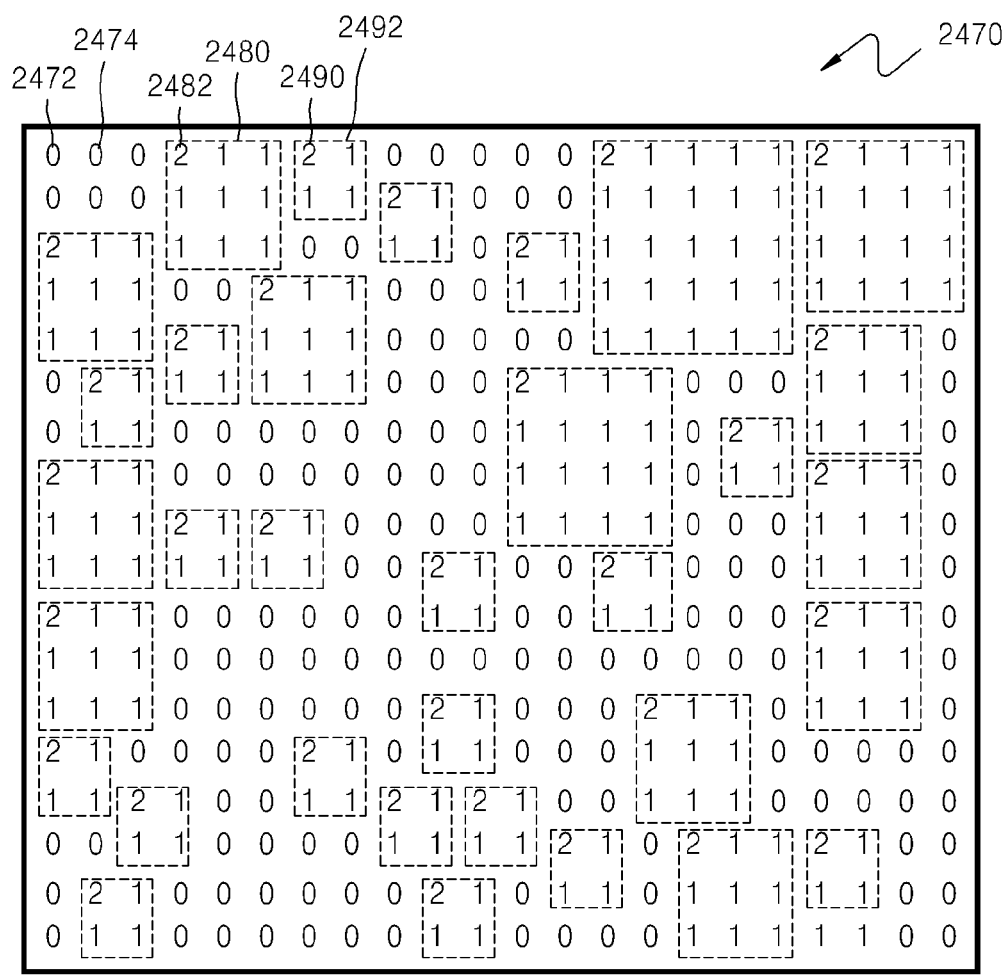

FIGS. 24A, 24B, and 24C illustrate methods of constructing a skip group, according to an exemplary embodiment. For convenience of explanation, a 32×32 super macroblock is used as the large data processing units of FIGS. 24A, 24B, and 24C.

In image encoding and image decoding according to an exemplary embodiment, adjacent skip mode blocks may be bound into a skip group and thus skipping may be performed in units of skip groups. Accordingly, when a skip group is read while a frame is being scanned, whether neighboring blocks adjacent to the skip group are skip mode blocks included in the skip group is determined.

Accordingly, a mark indicating whether a predetermined block is a skip mode block and is included in a skip group is needed. In the exemplary embodiment illustrated in FIGS. 24A, 24B, and 24C, a skip mode flag is used as the mark indicating whether a predetermined block is a skip mode block and is included in a skip group. When the skip mode flag is '0', a corresponding block is not a skip mode block. When the skip mode flag is '2', the corresponding block is the start block of a skip group. When the skip mode flag is '1', the corresponding block is included in the skip group.

In relation to a skip group according to an exemplary embodiment, the skip group may be located to search for a skip mode block from the frame and scan the skip group. Moreover, the maximum size of a skip group including adjacent skip mode blocks may be restricted.

Accordingly, in inter prediction based on a large data processing unit according to an exemplary embodiment, a case where the position and size of a skip group are fixed (a frame 2400 of FIG. 24A), a case where the position of a skip group is fixed and the skip group is formed in an arbitrary size (a frame 2440 of FIG. 24B), and a case where a skip group may be positioned at any location and may be formed in any size (a frame 2470 of FIG. 24C) may be considered to perform skip processing.

In the first frame 2400 of FIG. 24A, the size of a skip group is fixed to a 64×64 block. Accordingly, to scan a scan group, only a 32×32 super macroblock located on the left upper side of each 64×64 block needs to be checked to determine whether the 32×32 super macroblock is a skip mode block. For example, since the skip mode flag of a 32×32 super macroblock 2412 is '0', the 32×32 super macroblock 2412 is not a skip mode block, and a 64×64 block 2410 including the super macroblock 2412 is not a skip group.

Next, when it is determined from scanning of a super macroblock located on the right upper side of a 64×64 block 2420 that the skip mode flag thereof is '0', the 64×64 block 2420 is not a skip group either.

Since the skip mode flag of a super macroblock 2432 is '2', the super macroblock 2432 is the start block of a skip group. Since the size of a skip group of the first frame 2400 is fixed to the 64×64 block size, a 64×64 block 2430 including the super macroblock 2432 at the left upper side thereof is a skip group. The other super macroblocks 2434 and the like in the 64×64 block 2430 may be predicted to be skip mode blocks each having a skip mode flag of '1'.

In a skip group having a fixed position and a fixed size illustrated in FIG. 24A, once it is determined whether the skip mode flag of a 32×32 block at a fixed location is '0' or '2', it may also be determined whether neighboring blocks are skip mode blocks. Thus, when a decoder receives only the skip mode flag of a corresponding block at a fixed location from an encoder, the decoder may sufficiently ascertain whether all of the blocks of a corresponding frame are skip mode blocks by using the received skip mode flag.

In the frame 2440 of FIG. 24B, the size of a skip group is not fixed, but a location where the skip group can start is fixed. In other words, since a skip group may start from a 32×32 block located on the left upper side of each 64×64 block, when the frame 2440 is scanned, it has only to be determined whether the skip mode flag of a 32×32 block located on the left upper side of each 64×64 block is '0' or '2'. For example, when a 32×32 block located on the left upper side of a 64×64 block 2450 is scanned to have a skip mode flag of '0', the 64×64 block 2450 is not a skip group.

When a 32×32 block 2461 located on the left upper side of another 64×64 block is scanned, the scan mode flag of the 32×32 block 2461 is '2', and thus a 64×64 block 2460 starting from the 32×32 block 2461 should be determined. When 32×32 blocks adjacent to the 32×32 block 2461 rightwards and downwards are scanned, 32×32 blocks 2462, 2463, 2464, 2465, 2466, 2467, 2468, and 2469 consecutively have skip mode flags of '1'. Thus, they are included in the skip group 2460 in which the 32×32 block 2461 is included.

Although the skip mode flags of 32×32 blocks at fixed positions are supposed to be checked during scanning of the frame 2440, blocks that have been already scanned and determined to be included in a skip group are not scanned again. For example, since 32×32 blocks 2463, 2467, and 2469 are located on the respective left upper sides of 64×64 blocks, they are position-fixed blocks which are to be scanned, but they have already been checked as blocks included in the skip group 2460 according to a scanning sequence. Accordingly, scanning of the 32×32 blocks 2463, 2467, and 2469 is skipped, and scanning is performed on the next block.

In a skip group having a fixed position and any size illustrated in FIG. 24B, the skip mode flag of a 32×32 block at a fixed location and the size of a skip group may be transmitted from an encoder and received by a decoder. The decoder may determine whether a corresponding block is a skip mode block, by reading the skip mode flags of the blocks of a corresponding frame. However, the skip mode flag of a block that is indicated as a block included in another skip block through the skip mode flag of ' 1' although it is a block having a fixed position does not need to be transmitted and received.

In the frame 2470 of FIG. 24C, the size of a skip group is not fixed, and a location where the skip group can start is not fixed either. Accordingly, when the frame 2470 is scanned, the skip mode flags of all 32×32 blocks need to be checked.

For example, since the skip mode flag of a 32×32 block 2472 is '0', a 32×32 block 2474 right next to the 32×32 block 2472 is then scanned. During scanning, all of the 32×32 blocks are sequentially scanned until a 32×32 block having a skip mode flag of '2' is found.

When a 32×32 block 2482 having a skip mode flag of '2' is scanned, a skip group 2480 starting from the 32×32 block 2482 should be determined. Consecutive 32×32 blocks checked to have skip mode flags of '1' by scanning 32×32 blocks adjacent to the 32×32 block 2482 rightwards and downwards may be all included in the skip group 2480 in which the 32×32 block 2482 is included.

After the skip group 2480 is determined, scanning of the 32×32 blocks included in the skip group 2480 is skipped, and scanning continues on a 32×32 block 2492 not included in the skip group 2480. Similarly, a skip group 2490 starting from the 32×32 block 2492 may be determined.

In a skip group having any position and any size illustrated in FIG. 24C, the skip mode flags of 32×32 blocks at all locations and the size of a skip group may be transmitted from an encoder and received by a decoder. The decoder may determine whether each block in a corresponding frame is a skip mode block, by using the skip mode flags of all of the blocks of the corresponding frame. However, the skip mode flag of a 32×32 block checked to be included in a skip group other than the skip group does not need to be transmitted and received.

Accordingly, since skip processing may be performed on skip mode blocks in units of groups according the various exemplary embodiments described above with reference to FIGS. 24A, 24B, and 24C, the number of bits for representing the skip modes of blocks may be reduced, and the skip modes may be efficiently searched for without needing to scan all blocks.

Third, a MV depending on inter prediction may be determined in units of large data processing units, and an MVP may also be induced in units of large data processing units.

Figure 25A:
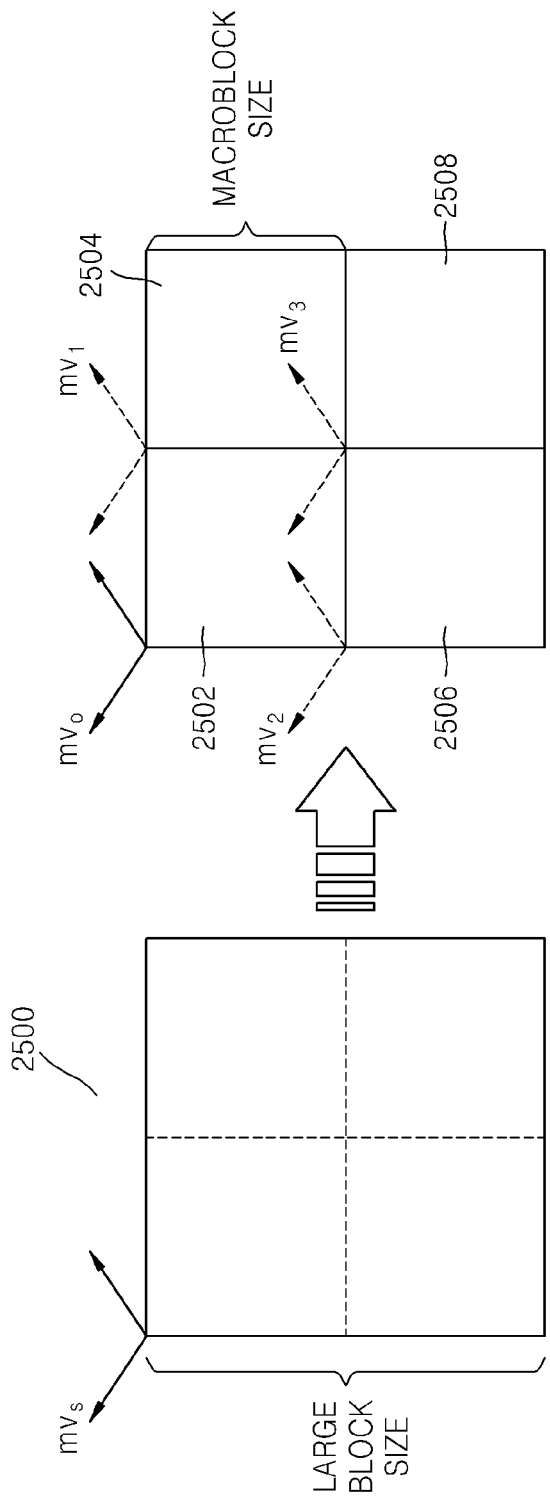
FIGS. 25A and 25B are block diagrams respectively illustrating a method of inducing a motion vector of a large data processing unit, and a method of inducing a motion vector of a lower data processing unit, according to an exemplary embodiment.
Figure 25B:
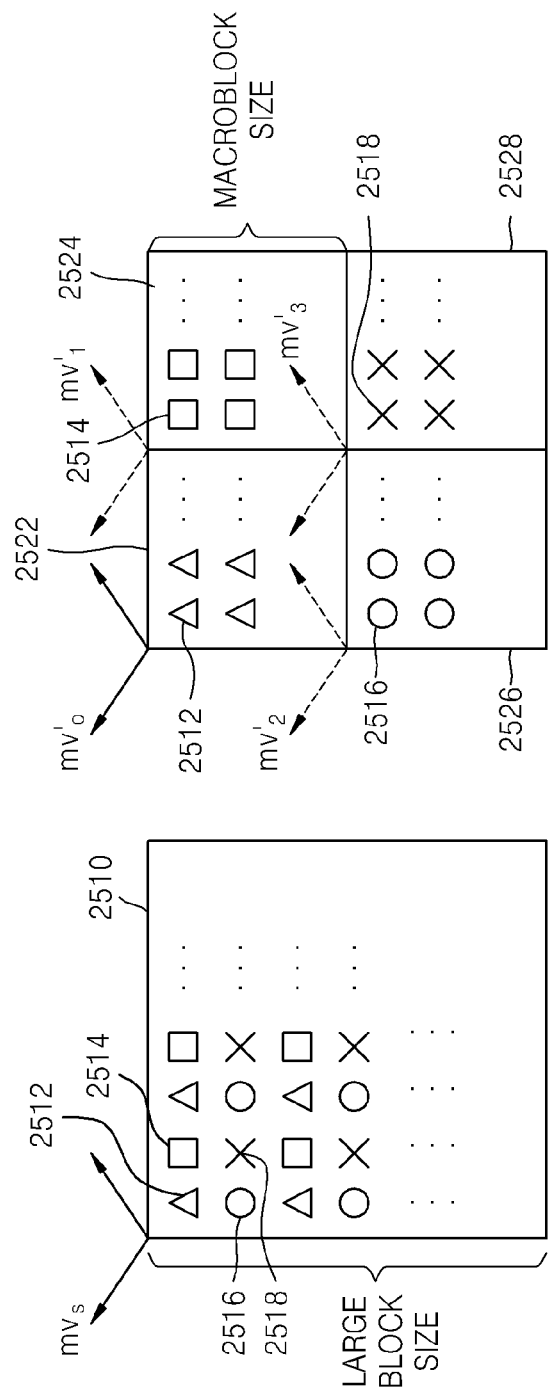

FIGS. 25A and 25B are block diagrams for illustrating a method of inducing a MV of a large data processing unit according to an exemplary embodiment, and a method of inducing a MV of a lower data processing unit of the large data processing unit.

A MV and an MVP generated by inter prediction according to an embodiment are induced in units of large data processing units. However, FIGS. 25A and 25B illustrate a method of inducing an MV of a large data processing unit (a group of 16×16 macroblocks, namely, a 32×32 block) by using the MV of an existing data processing unit (a 16×16 macroblock), without adding an encoding mode for each large data processing unit.

For example, in inter prediction of a 32×32 super macroblock 2500 being a large data processing unit according to an exemplary embodiment, a motion vector mvs of a 32×32 super macroblock corresponding to an inter mode is estimated or induced.

In image encoding or image decoding where an encoding mode of a large data processing unit is not individually defined, a motion vector of a super macroblock may be induced using the MV of a macroblock.

For example, when the MVs of 16×16 macroblocks 2502, 2504, 2506, and 2508 are $mv_0$, $mv_1$, $mv_2$, and $mv_3$, respectively, the MVs $mv_1$, $mv_2$, and $mv_3$ may be induced using the MV $mv_0$. For example, the $mv_1$, $mv_2$, and $mv_3$ may be estimated using Equation 6.

$$mv_1 = mv_2 = mv_3 = f(mv_0), \text{ (where } f(x) = \text{median}(x, \text{neighbors}))$$ [Equation 6]

where a function median (x, y) denotes a function for obtaining a median value of x and y and an input parameter 'neighbors' denotes a representative MV of a neighboring large data processing unit. The MV of a 16×16 macroblock may be estimated as a median value of the MV mv0 of a representative 16×16 macroblock 2502 and a representative MV of a neighboring 32×32 block.

Accordingly, in the case of FIG. 25A, without needing to measure all MVs of 16×16 macroblocks, a single MV may be considered as the MV of each 16×16 macroblock, and the MV $mv_s$ of each 32×32 super macroblock may be estimated from the MV of each 16×16 macroblock.

In the case of FIG. 25A, an additional flag for signaling the MV $mv_0$ of a macroblock (or the MV $mv_s$ of a 32×32 block) needs to be transmitted between an encoder and a decoder in order to achieve signaling of the MV of a 32×32 block. The decoder may induce the other MVs $mv_1$, $mv_2$, and $mv_3$ not signaled, through three inducing processes using received MVs.

FIG. 25B proposes another method of estimating an MV of a 32×32 block by using the MV of a 16×16 macroblock. In another estimating method, a 32×32 block 2510 is sub-sampled into 16×16 macroblocks so as to estimate the MV of the 32×32 block 2510 by using the MVs of the 16×16 macroblocks.

For example, a left upper pixel 2512, a right upper pixel 2514, a left lower pixel 2516, and a right lower pixel 2518 may be sequentially mapped into a left upper macroblock 2522, a right upper macroblock 2524, a left lower macroblock 2526, and a right lower macroblock 2528, respectively, thereby generating the sub-sampled 16×16 macroblocks 2522, 2524, 2526, and 2528.

The MVs $mv_0'$, $mv_1'$, $mv_2'$, and $mv_3'$ of the sub-sampled 16×16 macroblocks 2522, 2524, 2526, and 2528 may be induced as follows.

$$mv_1' = mv_2' = mv_3' = mv_0'$$ [Equation 7]

Accordingly, when only one of the MVs $mv_0'$, $mv_1'$, $mv_2'$, and $mv_3'$ of the 16×16 macroblocks 2522, 2524, 2526, and 2528 is measured, the other MVs may be estimated.

The MV of the 32×32 block 2510 may be estimated as a representative MV $MV(=mv_1'=mv_2'=mv_3'=mv_0')$ of the 16×16 macroblocks 2522, 2524, 2526, and 2528. Alternatively, the MV may be estimated using an MVP using the MVs $mv_1'$, $mv_2'$, $mv_3'$, and $mv_0'$. Accordingly, in the case of FIG. 25B, an additional flag for signaling the MV of a macroblock ($mv_0'$, $mv_1'$, $mv_2'$, or $mv_3'$) needs to be transmitted between an encoder and a decoder in order to achieve signaling of the MV of a 32×32 block.

IV. Frequency Transformation and Quantization

The frequency transformation and quantization unit 2001 of the image encoding apparatus 100, and the frequency transformation and quantization operation s2030 of the image encoding method 2000 may use a unique process considering a large data processing unit.

In image encoding or image decoding according to an exemplary embodiment, since the size of a data processing unit for each encoding mode may be greater than the size of an existing macroblock, data processing units other than a 8×8 or 4×4 block, which are data processing units for existing frequency transformation, may be used.

Accordingly, in the image encoding or image decoding according to an exemplary embodiment, (i-1) integer DCT and quantization based on a large block other than the 8×8 or 4×4 block may be used, and (i-2) the size of a data processing unit may be changed according to a luma component in consideration of a color standard in DCT on a chroma component based on a large block. Moreover, (i-3) low-complexity DCT may be modified and used to reduce the number of calculations generated by the DCT based on a large block.

Figure 26A:
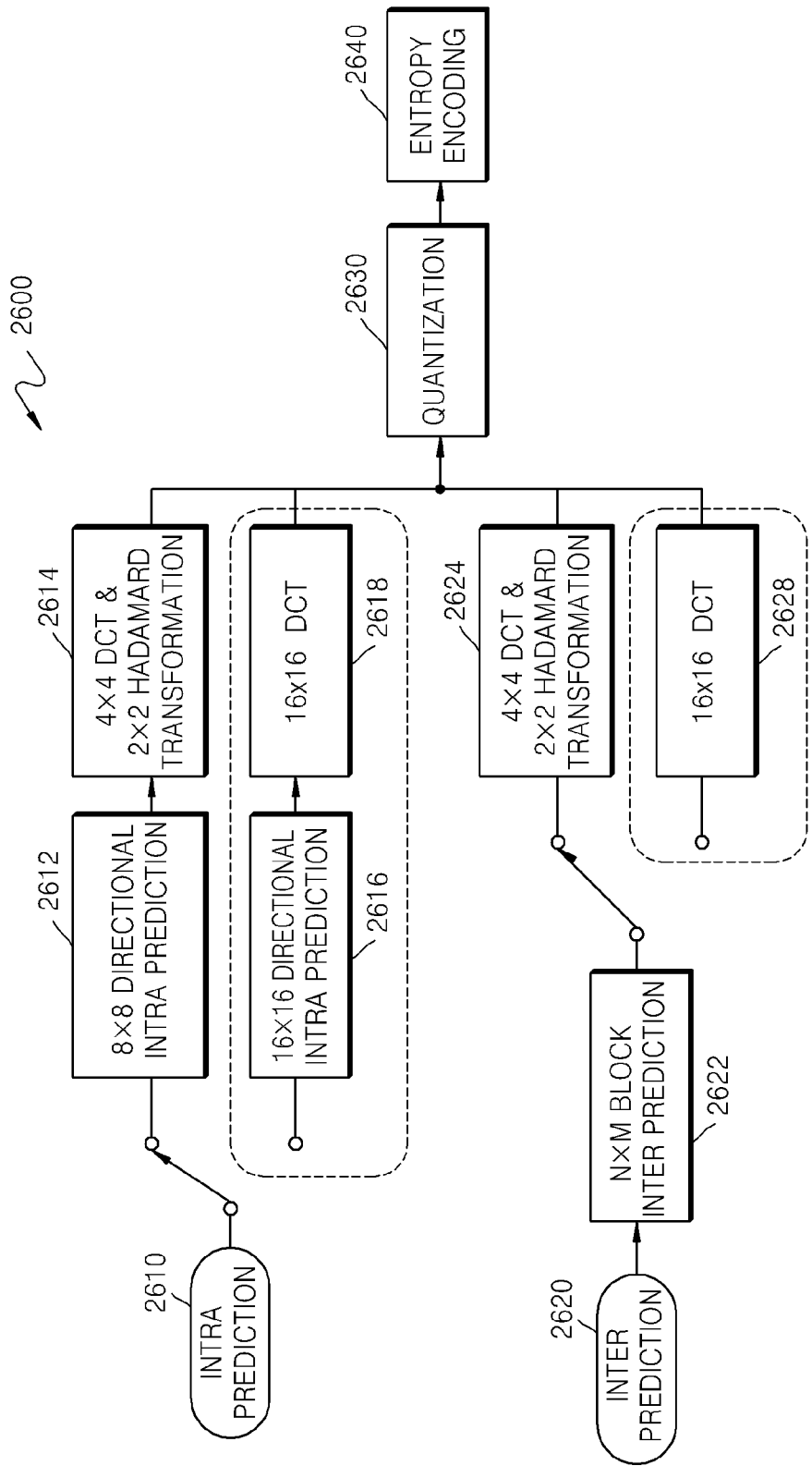
FIGS. 26A and 26B are block diagrams respectively illustrating motion estimation methods for a chroma component of a large data processing unit, according to an exemplary embodiment.
Figure 26B:
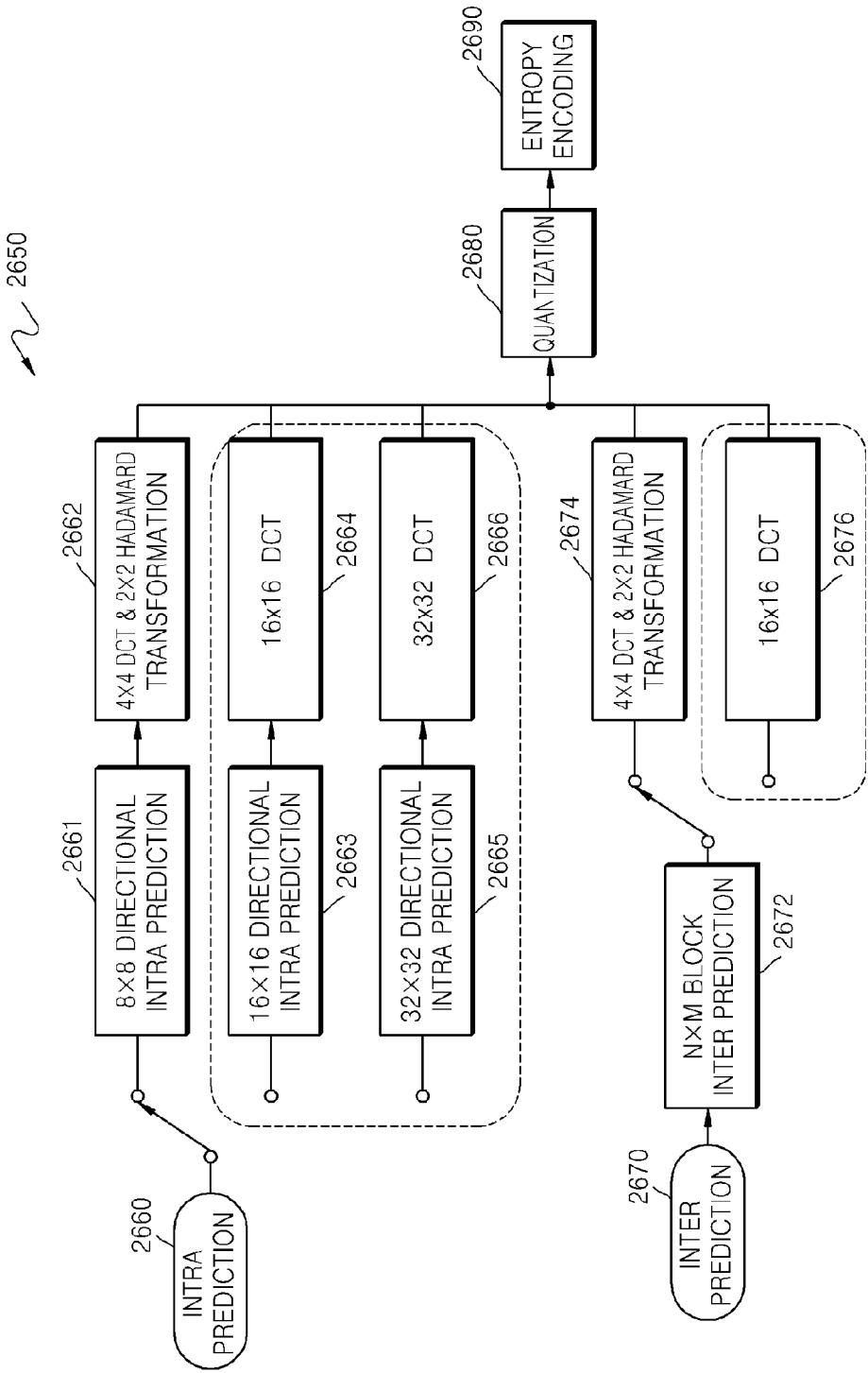

FIGS. 26A and 26B are block diagrams for illustrating several motion estimation methods for a chroma component of a large data processing unit according to an exemplary embodiment. The DCT 2034 with respect to a chroma component based on a large block (i−2) will be described later. A YUV color standard format includes a YUV 420 format and a YUV 444 format. FIG. 26A illustrates a frequency transformation method for each prediction mode with respect to the YUV 420 format, and FIG. 26B illustrates a frequency transformation method for each prediction mode with respect to the YUV 444 format. A case where a data processing unit for each prediction mode with respect to a luma component is a 32×32 super macroblock will be illustrated.

A block diagram 2600 of FIG. 26A corresponds to an exemplary embodiment of the frequency transformation and quantization unit 2001 considering a large data processing unit, and illustrates a frequency transformation method that can be applied for each prediction mode to a chroma component with the YUV 420 format.

Since a ratio of the numbers of bits allocated to a Y component, a U component, and a V component, respectively, is 4:1:1 in the YUV 420 format, the number of bits allocated to a chroma component corresponding to each of the U and V components is a quarter or less the number of bits allocated to a luma component corresponding to the Y component. Accordingly, the size of a data processing unit for a chroma component may be a quarter or less that of a data processing unit for a luma component. For example, the maximum size of a data processing unit for frequency transformation with respect to a chroma component may be a 16×16 block which is a quarter of a 32×32 block.

In an intra mode 2610, a new method (ii) in which 16×16 DCT 2618 is performed after 16×16 directional intra prediction 2616 may be added to an existing method (i) in which 4×4 DCT and 2×2 Hadamard transformation 2614, that is, 8×8 frequency transformation, is performed after 8×8 directional intra prediction 2612.

In an inter mode 2620, a new method (ii) in which 16×16 DCT 2628 is performed may be added to an existing method (i) in which 4×4 DCT and 2×2 Hadamard transformation 2624, that is, 8×8 frequency transformation, is performed after N×M block inter prediction 2622.

A chroma component of the large data processing unit according to an exemplary embodiment may be encoded through quantization 2630 and entropy encoding 2640 after motion prediction and frequency transformation based on the intra mode 2610 or the inter mode 2620.

A block diagram 2650 of FIG. 26B corresponds to another exemplary embodiment of the frequency transformation and quantization unit 2001 considering a large data processing unit, and illustrates a frequency transformation method that can be applied for each prediction mode to a chroma component with the YUV 444 format.

Since a ratio of the numbers of bits allocated to a Y component, a U component, and a V component, respectively, is 4:4:4 in the YUV 444 format, the number of bits allocated to each chroma component is equal to the number of bits allocated to a luma component. For example, since the maximum size of a data processing unit for a luma component is a 32×32 block size, the maximum size of a data processing unit for a chroma component may be a 32×32 block size.

In an intra mode 2660, a new method (ii) in which 16×16 DCT 2664 is performed after 16×16 directional intra prediction 2663, and a new method (iii) in which 32×32 DCT 2666 is performed after 32×32 directional intra prediction 2665 may be added to an existing method (i) in which 4×4 DCT and 2×2 Hadamard transformation 2662, that is, 8×8 frequency transformation, is performed after 8×8 directional intra prediction 2661.

In an inter mode 2670, a new method (ii) in which 16×16 DCT 2676 is performed may be added to an existing method (i) in which 4×4 DCT and 2×2 Hadamard transformation 2674, that is, 8×8 frequency transformation, is performed after N×M block inter prediction 2672.

A chroma component of the large data processing unit according to an embodiment may be encoded through quantization 2680 and entropy encoding 2690 after motion prediction and frequency transformation based on the intra mode 2660 or the inter mode 2670.

A table summarizing in detail a relationship between a prediction mode and a frequency transformation block according to the block diagrams 2600 and 2650 of FIGS. 26A and 26B is illustrated in FIG. 27. Thus, the size of a frequency transformation block for a chroma component for each prediction mode may be induced from the size of a frequency transformation block for a luma component for each prediction mode.

FIG. 27 is a table for illustrating a method of inducing the size of a data processing unit for a chroma component of a large data processing unit according to an exemplary embodiment. The integer DCT and quantization 2032 based on a large block (i−1) and the DCT 2034 with respect to a chroma component based on a large block (i−2) will be described later.

In the YUV 420 format, the size of a frequency transformation block for a chroma component is a quarter or less that of a frequency transformation block for a luma component. However, the minimum size of a frequency transformation block is a 8×8 block.

In the YUV 420 format, a data processing unit for DCT for a luma component of an intra mode includes 32×32, 16×16, 8×8, and 4×4 blocks. Accordingly, when a DCT block for a luma component of an intra mode with the YUV 420 format is a 32×32 block, a DCT block for a corresponding chroma component may be induced to a 16×16 block. Moreover, when the DCT block for a luma component of an intra mode with the YUV 420 format is a 16×16, 8×8, or 4×4 block, DCT blocks for a corresponding chroma component may be induced to a 8×8 block which is a minimum data unit.

In the YUV 420 format, a data processing unit for DCT for a luma component of an inter mode includes 16×16, 8×8, and 4×4 blocks. Accordingly, when a DCT block for a luma component of an inter mode with the YUV 420 format is a 16×16, 8×8, or 4×4 block, a DCT block for a corresponding chroma component may be induced to a 8×8 block which is a minimum data unit.

In the YUV 444 format, the size of a frequency transformation block for a chroma component may be equal to that of a frequency transformation block for a luma component, in the intra mode. Similarly, the minimum size of a frequency transformation block is a 8×8 block.

In the YUV 444 format, a data processing unit for DCT for a luma component of an intra mode includes 32×32, 16×16, 8×8, and 4×4 blocks. Accordingly, when DCT blocks for a luma component of an intra mode with the YUV 444 format are a 32×32 block and a 16×16 block, DCT blocks for a corresponding chroma component may be induced to a 32×32 block and a 16×16 block, respectively.

Moreover, when DCT blocks for a luma component of an intra mode with the YUV 444 format are 8×8 and 4×4 blocks, DCT blocks for a corresponding chroma component may be induced to a 8×8 block which is a minimum data unit.

In the YUV 444 format, a data processing unit for DCT for a luma component of an inter mode includes 16×16, 8×8, and 4×4 blocks. Accordingly, when a DCT block for a luma component of an inter mode with the YUV 444 format is a 16×16 block, a DCT block for a corresponding chroma component may be induced to a 16×16 block. Moreover, when DCT blocks for a luma component of an inter mode with the YUV 444 format are 8×8 and 4×4 blocks, DCT blocks for a corresponding chroma component may be induced to a 8×8 block which is a minimum data unit.

Accordingly, a data processing unit for DCT on a chroma component may be induced from a data processing unit for DCT on a luma component. Although frequency transformation for each prediction mode has been illustrated using only the YUV 420 format and the YUV 444 format from among the YUV color standard formats, image encoding or image decoding based on a data processing unit dynamically determined according to an exemplary embodiment is not limited to the YUV 420 format and the YUV 444 format.

V. In-Loop Filtering

The in-loop filtering unit 2007 of the image encoding apparatus 100, and the frequency transformation and quantization operation s2080 of the image encoding method 2000 may use a unique process considering a large data processing unit.

In the image encoding or image decoding according to an exemplary embodiment, since the size of a large data processing unit may be greater than the size of an existing macroblock, filtering of the inside of the large data processing unit needs to be considered.

Accordingly, a unique process associated with in-loop filtering considering a large data processing unit according to an embodiment may include a method of determining whether a boundary of a lower data processing unit included in a large data processing unit and determining the degree of the filtering of each boundary, and filtering for reducing the ringing effect caused by encoding of the large data processing unit.

Accordingly, the method of determining whether the boundary of the lower data processing unit of the large data processing unit and determining the degree of the filtering of each boundary, in the in-loop filtering considering a large data processing unit according to an exemplary embodiment, will now be described as follows by using an in-loop filtering-related flag used in in-loop filtering performed in existing image encoding or image decoding.

According to a related method, it is determined whether in-loop filtering is performed on the boundary of each 16×16 or 8×8 macroblock. For example, in an existing H.264 image encoding/decoding format, an in-loop filtering-related flag is set. The in-loop filtering-related flag includes a first flag 'filterLeftMbEdgeFlag' indicating whether in-loop filtering is performed on a boundary between a current macroblock and a neighboring macroblock located on the left side of the current macroblock, and a second flag 'filterTopMbEdgeFlag' indicating whether in-loop filtering is performed on a boundary between the current macroblock and a neighboring macroblock located on the upper side of the current macroblock.

The in-loop filtering-related flag may also include a third flag 'filterInternalEdgeflag' indicating whether in-loop filtering is performed on the inside of a 16×16 or 8×8 macroblock, in order to reduce a block artifact generated by frequency transformation based on a 8×8 or 4×4 block within the 16×16 or 8×8 macroblock.

The in-loop filtering-related flag may also include a fourth flag 'chromaEdgeflag' indicating whether in-loop filtering is performed on a boundary of a block for a chroma component.

In the image encoding or image decoding according to an exemplary embodiment, since encoding is performed in units of data processing units larger than a 16×16 or 8×8 macroblock, whether in-loop filtering is performed on the inside of a large data processing unit should be added to conditions for performing in-loop filtering, in order to use an existing in-loop filtering-related flag.

For example, in the in-loop filtering performed in the image encoding or image decoding according to an exemplary embodiment, when a current boundary is within a large data processing unit, the first, second, and fourth flags may be set to be '0', and when the current boundary is outside the large data processing unit, the first, second, and fourth flags may be set to be '1'. In other words, an in-loop filtering-related flag may be set so that in-loop filtering is not performed on boundaries of macroblocks included in a large data processing unit.

Moreover, in the in-loop filtering performed in the image encoding or image decoding according to an embodiment, when frequency transformation is performed in units of 16×16 macroblocks, the third flag may be set to be '0'. In other words, when frequency transformation is performed in units of 16×16 macroblocks in an encoding mode of 16×16 macroblocks, an in-loop filtering-related flag may be set so that in-loop filtering for reducing a block artifact caused by frequency transformation is not performed on the inside of a 16×16 macroblock.

The in-loop filtering-related flag may also include a fifth flag 'mixedModeEdgeFlag' indicating whether in-loop filtering is performed on a boundary between neighboring blocks of different prediction modes, in the case of a macroblock of a prediction mode in which an intra mode and an inter mode are mixed.

In the in-loop filtering performed in the image encoding or image decoding according to an exemplary embodiment, since neighboring blocks of an intra mode and an inter mode may exist within a large data processing unit, a case where a current data processing unit is the large data processing unit may be added to the conditions of the fifth flag. The degree of in-loop filtering may be set for each boundary of a lower data processing unit in the large data processing unit.

In the image encoding or image decoding according to an embodiment, since various processes are performed in units of large data processing units, a ringing effect may be generated in addition to the block artifact. In the in-loop filtering performed in the image encoding or image decoding according to an exemplary embodiment, filtering for reducing a ringing effect caused by encoding of the large data processing unit may be performed.

VI. Entropy Encoding

The entropy encoding unit 2009 of the image encoding apparatus 100, and the entropy encoding operation s2090 of the image encoding method 2000 may use a unique process considering a large data processing unit.

The unique process for entropy encoding or decoding, considering the large data processing unit according to an exemplary embodiment, includes the operation 2092 corresponding to introduction of a hierarchical CBP considering the large data processing unit and an CBP scanning method, CABAC or CAVLC 2094 both considering the large data processing unit, and a single context for the CBP 2096 for the large data processing unit of an intra mode or a chroma component.

Figure 28:
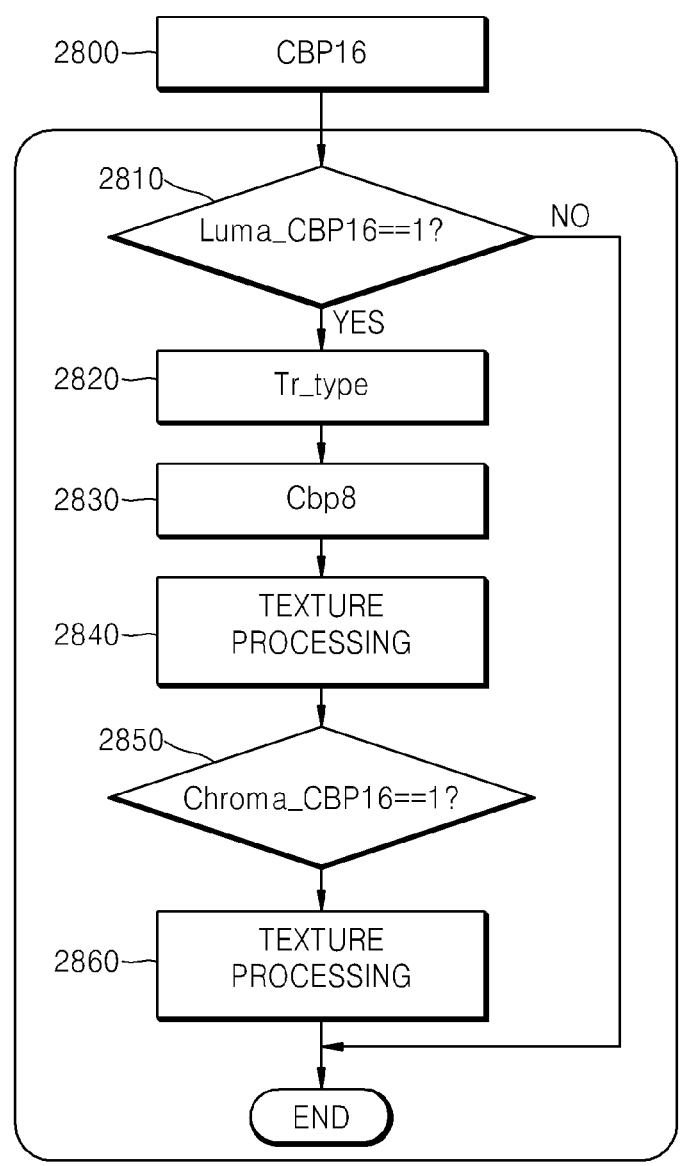
FIG. 28 is a flowchart illustrating a method of using a CBP that considers a large data processing unit, according to an exemplary embodiment.

FIG. 28 is a flowchart illustrating a method of using a CBP that considers a large data processing unit according to an embodiment of the present invention.

Entropy encoding and entropy decoding according to an embodiment may use not only a CBP for a 8×8 block, CBP8, which is an existing CBP, but also a hierarchical CBP considering the large data processing unit.

For example, when an encoding mode of a data processing unit according to an embodiment is an encoding mode of a data processing unit that is equal to or greater than a 16×16 block inter mode such as an inter mode Inter_32×32 of a 32×32 super macroblock, an inter mode Inter_32×16 of a 32×16 super macroblock, an inter mode Inter_16×32 of a 16×32 super macroblock, and the like, a CBP for a 16×16 block, CBP16, is added. Accordingly, entropy encoding or decoding may be performed according to a hierarchical CBP including the CBP CBP16 and the CBP CBP8.

Accordingly, in operation 2800, encoding should be performed starting from the CBP CBP16 in the case of entropy encoding with respect to the encoding modes Inter_32×32, Inter_32×16, and Inter_16×32. First, in operation 2810, it is determined whether a CBP CBP16 for a luma component, Luma_CBP16, is '1'. When the CBP Luma_CBP16 is '0', texture processing for entropy encoding is concluded. When the CBP Luma_CBP16 is '1', a flag Tr_type indicating the size of a data processing unit is encoded in operation 2820, and then a CBP CBP8 is encoded in operation 2830. In operation 2840, texture processing for a luma component is performed.

In operation 2850, it is determined whether a CBP CBP16 for a chroma component, Chroma_CBP16, is '1'. In operation S2860, texture processing for the chroma component is performed.

As described above, in an encoding mode of a data processing unit equal to or greater than a 16×16 block inter mode according to an exemplary embodiment, the operation 2800 of performing entropy encoding by using the CBP CBP16 illustrates a caser where the CBP CBP16 for a 16×16 block is added. However, even when the data processing unit is additionally deformed, a CBP deformed considering the data processing unit may exist.

Figure 29A:
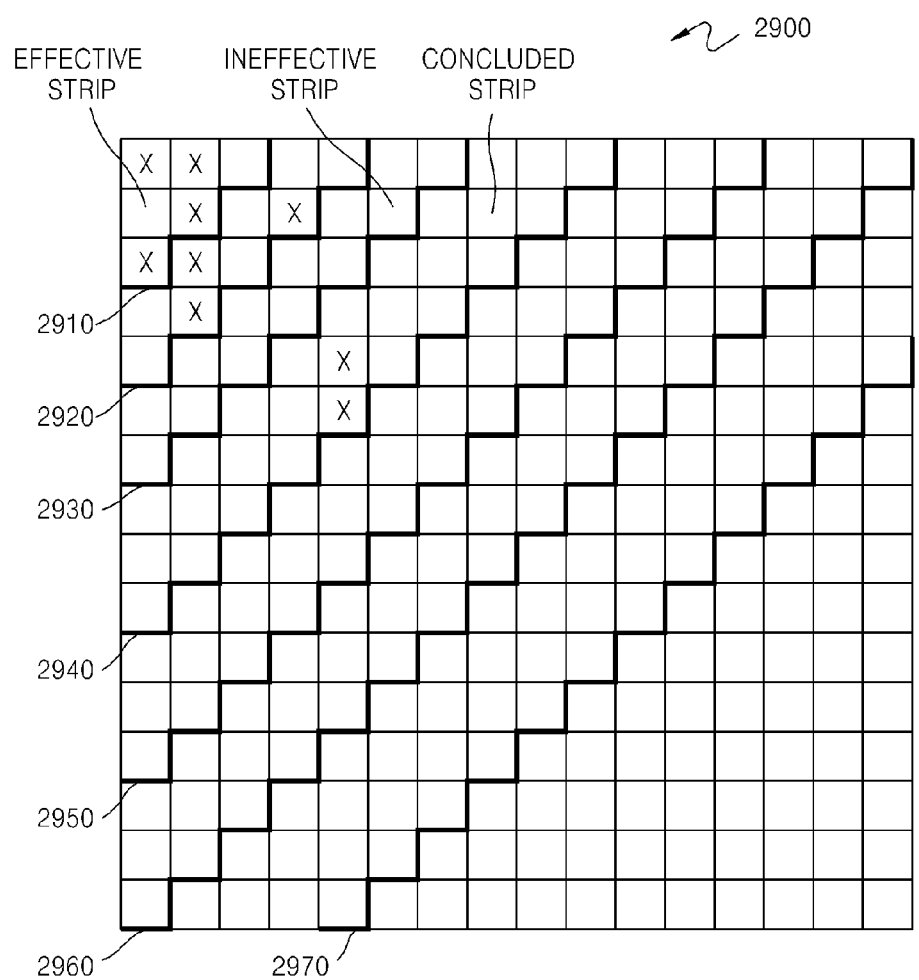
FIGS. 29A and 29B illustrate methods of scanning a CBP that considers a large data processing unit, according to an exemplary embodiment.
Figure 29B:
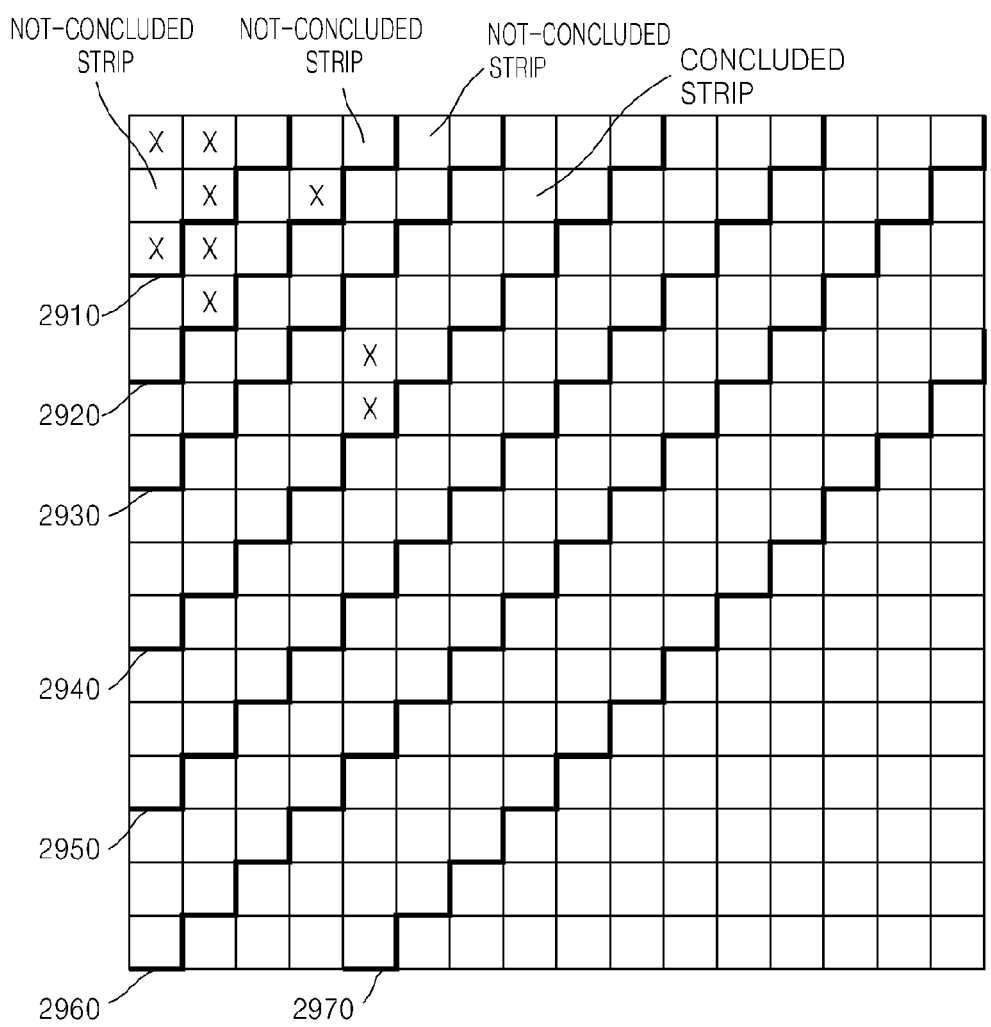

FIGS. 29A and 29B illustrate several methods of scanning a CBP that considers a large data processing unit according to an embodiment of the present invention. The operation 2092 corresponding to a CBP scanning method considering the large data processing unit will now be described.

In entropy encoding according to an embodiment, a data processing unit 2900 is scanned to search for a CBP that is not '0'. In an existing scanning method, a square 8×8 block is scanned in an interleaved manner.

The entropy encoding according to an exemplary embodiment uses a method of scanning the data processing unit 2900 back and forth in a zigzag manner about a diagonal line from the left upper end of the data processing unit 2900 to the right lower end thereof. As a CBP is located closer to the left upper end of the data processing unit 2900, the possibility that a CBP is not 0 is higher. Thus, the efficiency of entropy encoding for encoding effective bits that are not 0 may be increased.

To obtain the efficiency of scanning CBPs according to an exemplary embodiment, the data processing unit 2900 may be partitioned by a plurality of boundaries 2910, 2920, 2930, 2940, 2950, 2960, and 2970. According to a zigzag scanning method, it may be determined whether a CBP which is not 0 (a location marked with 'x') exists in a strip of a region between boundaries, and only a strip including a CBP which is not 0 may be encoded.

In other words, in the method of scanning CBPs according to an exemplary embodiment, the data processing unit 2900 is scanned to find a strip of a region including a CBP which is not 0 from among a first region before the boundary 2910, a second region between the boundaries 2910 and 2920, a third region between the boundaries 2920 and 2930, a fourth region between the boundaries 2930 and 2940, a fifth region between the boundaries 2940 and 2950, a sixth region between the boundaries 2950 and 2960, a seventh region between the boundaries 2960 and 2970, and an eighth region after the boundary 2970 so as to encode the strip of a region including a CBP which is not 0.

Two methods of representing a strip of a region including a CBP which is not 0 in order to reduce the number of transmission bits are illustrated in FIGS. 29A and 29B, respectively.

In FIG. 29A, an effective strip and a concluded strip are defined to indicate that only the data of at least one of the regions between the region of the effective strip and the region of the concluded strip is effective data. In FIG. 29B, a concluded strip may be defined to indicate that only the data of at least one of the regions until the region of the concluded strip is effective data.

In the case of FIG. 29A, flags representing the effective strip and the concluded strip have only to be defined on a syntax in order to determine CBP scan regions of the data processing unit 2900. Although an ineffective strip exists between the regions of the effective strip and the concluded strip, a flag representing the ineffective strip is not needed, and a flag representing a not-concluded strip is not needed either. Accordingly, only two bits for flags representing an effective strip and a concluded strip, respectively, in relation to a CBP are needed as the transmission bits of the single data processing unit 2900.

In the case of FIG. 29B, a flag representing the concluded strip has only to be defined on a syntax in order to determine CBP scan regions of the data processing unit 2900. A flag representing a not-concluded strip before the region of a concluded strip is not needed. Accordingly, only one bit for a flag representing a concluded strip in relation to a CBP is needed as the transmission bits of the single data processing unit 2900.

In the entropy encoding according to an exemplary embodiment, a new CBP for a large data processing unit of an intra mode or a chroma component, and a single context of the new CBP may be defined according to an encoding mode of the large data processing unit.

For example, the encoding mode of the large data processing unit according to an exemplary embodiment may newly include an intra mode Intra_32×32 of a 32×32 super macroblock, an intra mode Intra_16×16 of a 16×16 macroblock, and intra modes Cr_16×16 and Cb_16×16 for chroma components of a 16×16 macroblock.

A large data processing unit of an intra mode has a very low possibility that all of the internal data is 0. Accordingly, instead that the context of a CBP of a current data processing unit uses the context of a neighboring data processing unit, a single context for a CBP may be set for each large data processing unit.

The context of a CBP of an inter mode may be set in the same manner as the manner in which the context of a CBP for a 8×8 macroblock of an existing inter mode is set.

Accordingly, the context of a current 8×8 macroblock may be determined using the context of a neighboring 8×8 macroblock of an inter mode.

In a decoder according to an exemplary embodiment, when an image bitstream encoded by entropy encoding based on a large data processing unit is decoded, entropy decoding considering the large data processing unit is needed. For example, the decoder according to an embodiment restores an image through entropy decoding using a CBP for each 16×16 macroblock.

VII. Image Decoding Apparatus Based on Dynamically-Determined Data Processing Unit FIGS. 30A, 30B, 30C, 30D, 30E, and 30F are block diagrams of modified exemplary embodiments of the image decoding apparatus 200 that consider a dynamically determined data processing unit.

To apply a large data processing unit to the image encoding apparatus 200, the group decoding unit 230 generates a restored image through entropy decoding, inverse quantization and inverse frequency transformation, intra prediction and inter prediction, and in-loop filtering by considering the large data processing unit.

The receiving unit 210 may receive an image bitstream from the image encoding apparatus 100, and the group encoding mode reading unit 220 may read an encoding mode from the image bitstream. The encoding mode may be read from a syntax, a flag, or the like. The group decoding unit 230 decodes group data based on the read-out encoding mode.

The group decoding unit 230 may perform a unique process distinguished from an existing image encoding and decoding format, in order to perform decoding considering the dynamically-determined data processing unit. Unique processes considering a large data processing unit from among dynamically-determined data processing units correspond to the techniques described above with reference to FIGS. 21 through 29B. A unique process for each operation of the group decoding unit 230 will be described in detail.

Figure 30A:
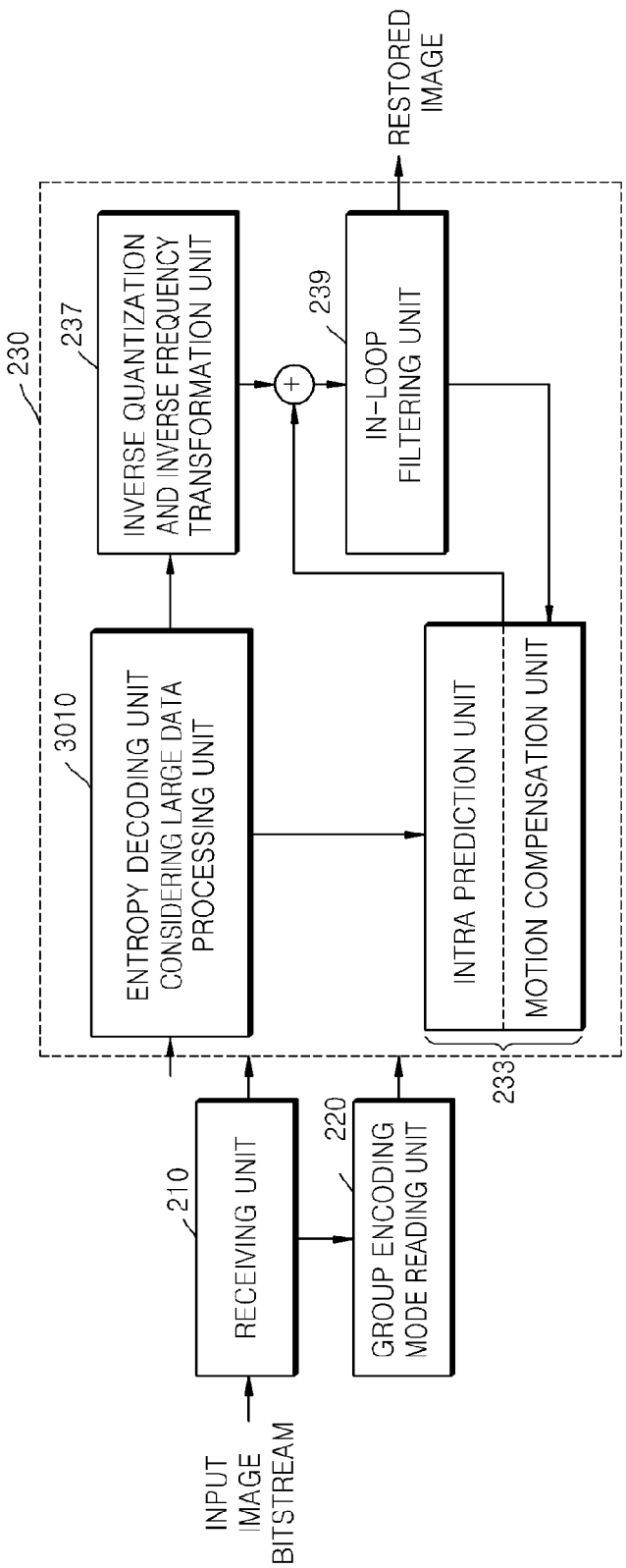
FIGS. 30A, 30B, 30C, 30D, 30E, and 30F are block diagrams of modified exemplary embodiments of the image decoding apparatus of FIG. 2 that consider a dynamically determined data processing unit, according to an dynamically determined embodiment.

FIG. 30A is a block diagram of a case where entropy decoding considering a large data processing unit is applied to the group decoding unit 230 of the image decoding apparatus 200.

A first exemplary embodiment of the group decoding unit 230 of the image decoding apparatus 200 includes an entropy encoding unit 3010 considering the large data processing unit, an intra prediction unit and motion compensation unit 233, an inverse quantization and inverse frequency transformation unit 237, and an in-loop filtering unit 239.

The entropy decoding unit 3010 considering a large data processing unit according to the first embodiment in the group decoding unit 230 may perform entropy decoding in units of the large data processing unit based on the encoding mode read out by the group encoding mode reading unit 220. The entropy decoding performed by the entropy decoding unit 3010, corresponds to decoding of a bitstream obtained by the entropy encoding described above in section [VI. Entropy encoding].

The CBP described above with reference to FIGS. 28 through 29B may be used in the entropy decoding unit 3010. The read-out CBP may be a result obtained by scanning in a direction where the possibility of generating a CBP which is not '0' increases and encoding the CBP which is not '0'.

The entropy decoding unit 3010 considering the large data processing unit according to the first embodiment in the group decoding unit 230 may apply CABAC or CAVLC to a large data processing unit in order to perform entropy decoding on the large data processing unit.

The entropy decoding unit 3010 considering the large data processing unit according to the first exemplary embodiment in the group decoding unit 230 may decode a context newly set for a CBP based on the large data processing unit.

Figure 30B:
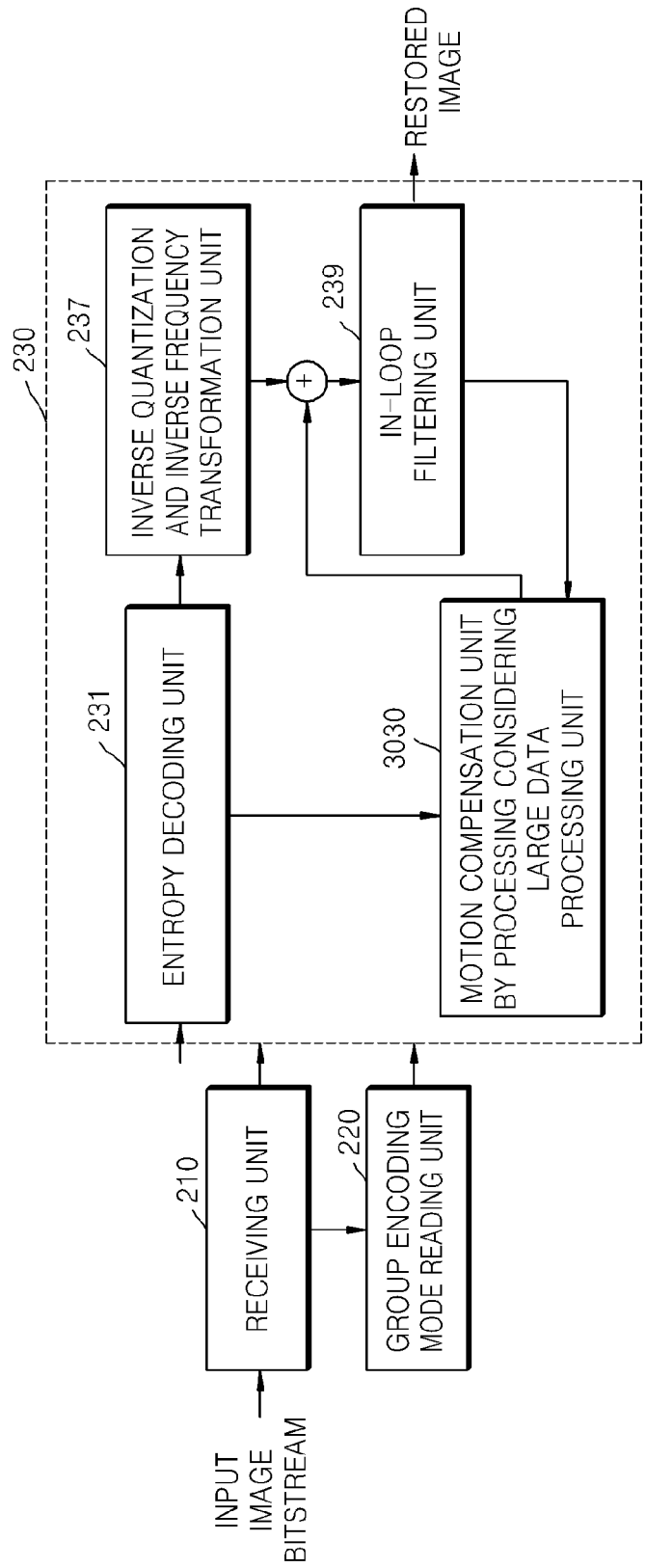

FIG. 30B is a block diagram of a case where motion prediction considering a large data processing unit is applied to the group decoding unit 230 of the image decoding apparatus 200.

A second exemplary embodiment of the group decoding unit 230 of the image decoding apparatus 200 includes an entropy decoding unit 231, an intra prediction unit and motion compensation unit 3030 following a processing considering a large data processing unit, an inverse quantization and inverse frequency transformation unit 237, and an in-loop filtering unit 239.

The intra prediction unit and motion compensation unit 3030 following the processing considering a large data processing unit according to the second embodiment in the group decoding unit 230 may perform motion prediction or compensation according to a process by the large data processing unit based on the encoding mode read out by the group encoding mode reading unit 220. The processing considering the large data processing unit according to an exemplary embodiment has been described above in section [III. Motion prediction processing].

The data processing unit according to an exemplary embodiment may be determined by a combination of a large data processing unit for motion prediction and a data processing unit for frequency transformation.

The intra prediction unit and motion compensation unit 3030 following the processing considering the large data processing unit according to the second exemplary embodiment in the group decoding unit 230 may use a scanning method for motion prediction or compensation for each type of data processing unit and neighbor availability of a neighboring block, which are determined in consideration of the large data processing unit. The scanning method for motion prediction or compensation for each data processing unit and the neighbor availability of a neighboring block have been described above with reference to FIGS. 13, 21, and 22.

The intra prediction unit and motion compensation unit 3030 following the processing considering the large data processing unit according to the second exemplary embodiment in the group decoding unit 230 may use the simplified encoding mode using only a square-shaped large data processing unit. An exemplary embodiment of the simplified encoding mode has been described above with reference to FIGS. 23A and 23B.

Figure 30C:
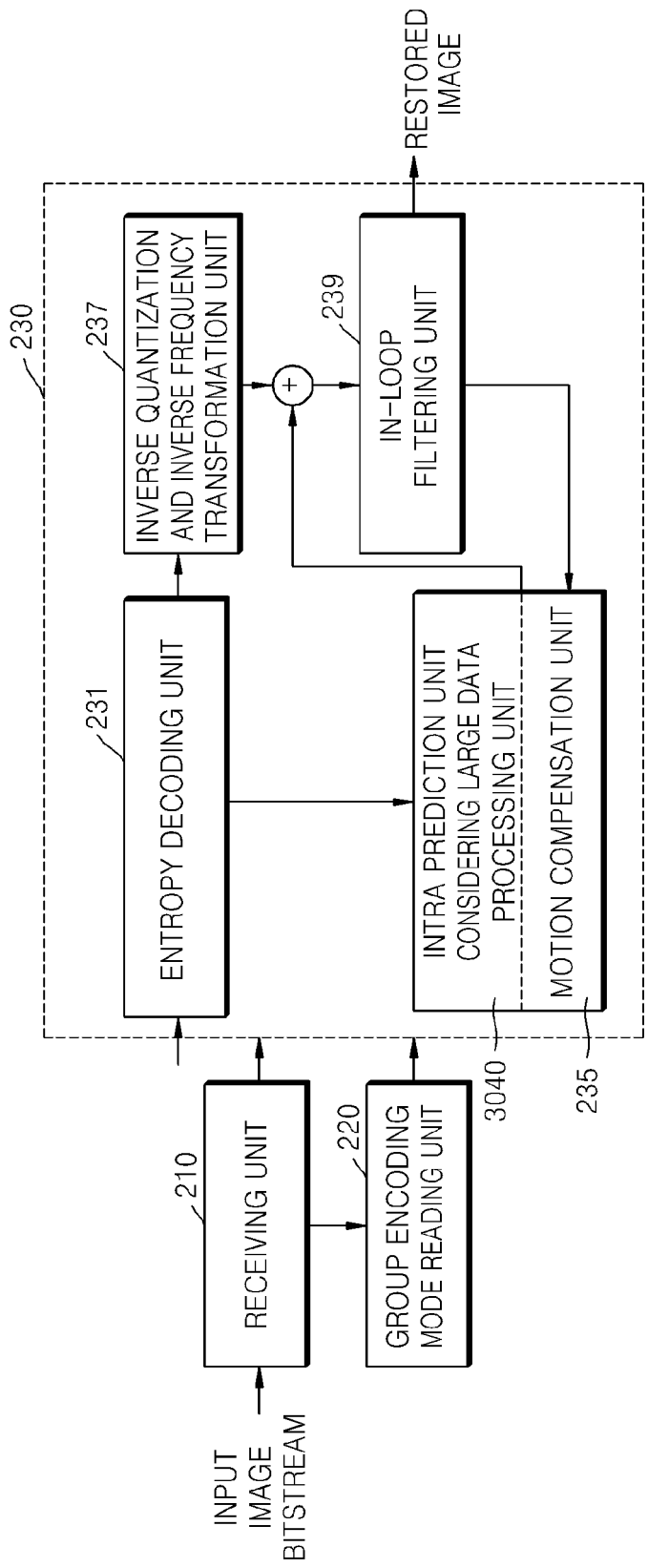

FIG. 30C is a block diagram of a case where intra prediction considering a large data processing unit is applied to the group decoding unit 230 of the image decoding apparatus 200.

A third exemplary embodiment of the group decoding unit 230 of the image decoding apparatus 200 includes the entropy decoding unit 231, an intra prediction unit 3040 considering the large data processing unit, a motion compensation unit 235, the inverse quantization and inverse frequency transformation unit 237, and the in-loop filtering unit 239. When an image has been encoded according to the unique process according to an embodiment described above in section [III. Intra prediction], the image decoding apparatus 200 may perform decoding according to the process described above in section [III. Intra prediction].

The intra prediction unit 3040 considering the large data processing unit according the third exemplary embodiment in the group decoding unit 230 may use an intra mode added for a predetermined large data processing unit. For example, the intra prediction unit 3040 may use a 32×32 super macroblock of an intra mode, a 16×16 super macroblock of an intra mode, or the like.

The intra prediction unit 3040 considering the large data processing unit according the exemplary third embodiment in the group decoding unit 230 may perform a prediction mode using a complex plain into the intra mode, in order to perform more accurate intra prediction with respect to a large data processing unit.

The intra prediction unit 3040 considering the large data processing unit according the third exemplary embodiment in the group decoding unit 230 may perform intra prediction by using only a restricted type of large data processing unit.

Figure 30D:
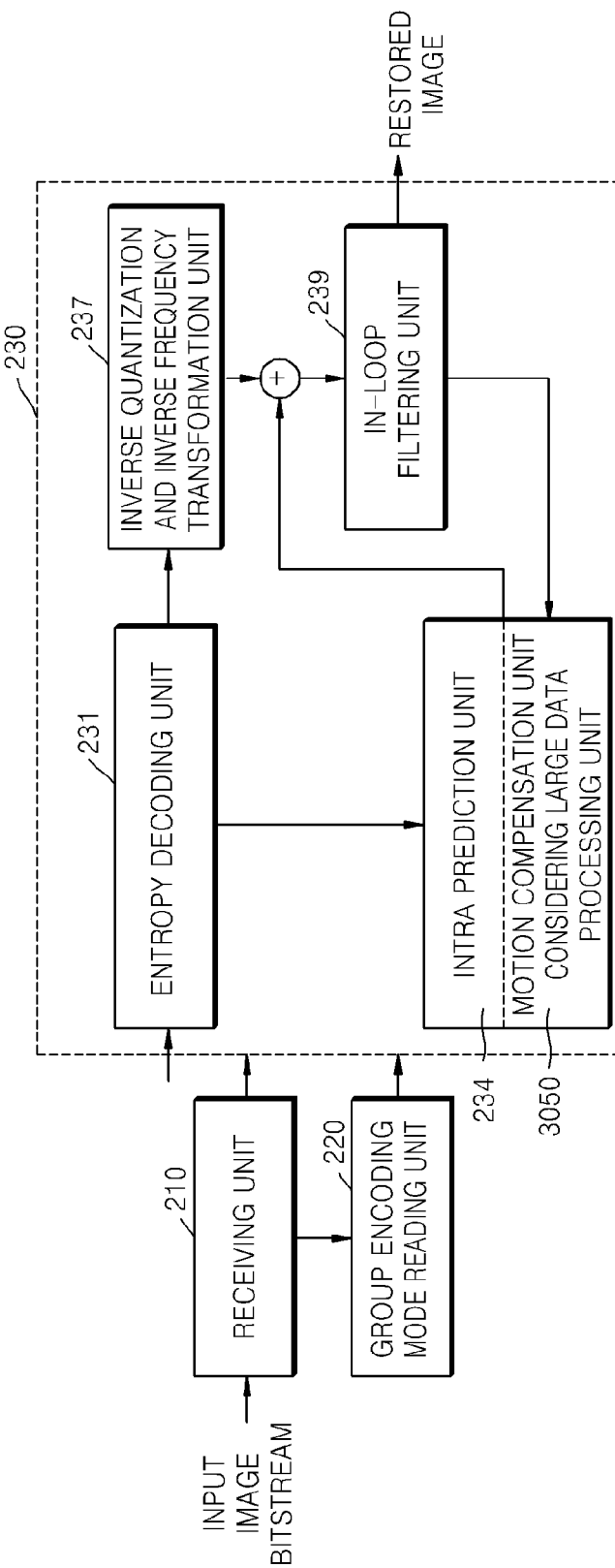

FIG. 30D is a block diagram of a case where motion compensation considering a large data processing unit is applied to the group decoding unit 230 of the image decoding apparatus 200.

A fourth exemplary embodiment of the group decoding unit 230 of the image decoding apparatus 200 includes the entropy decoding unit 231, an intra prediction unit 234, a motion compensation unit 3050 considering a large data processing unit, the inverse quantization and inverse frequency transformation unit 237, and the in-loop filtering unit 239. An image obtained by encoding in units of large data processing units according to an exemplary embodiment may undergo motion prediction and motion compensation according to the unique process according to an exemplary embodiment described above in section [III-2 Inter prediction].

The motion compensation unit 3050 considering the large data processing unit according the fourth exemplary embodiment in the group decoding unit 230 may use the combination mode in which inter prediction and intra prediction can be mixed, as an prediction mode for the large data processing unit.

The motion compensation unit 3050 considering the large data processing unit according the fourth exemplary embodiment in the group decoding unit 230 may perform motion compensation by using an MV determined for each large data processing unit and an MVP.

The motion compensation unit 3050 considering the large data processing unit according the fourth exemplary embodiment in the group decoding unit 230 may use a new skip mode defined for each large data processing unit and may perform skip processing in units of skip groups including a plurality of data processing units of a plurality of skip modes.

Figure 30E:
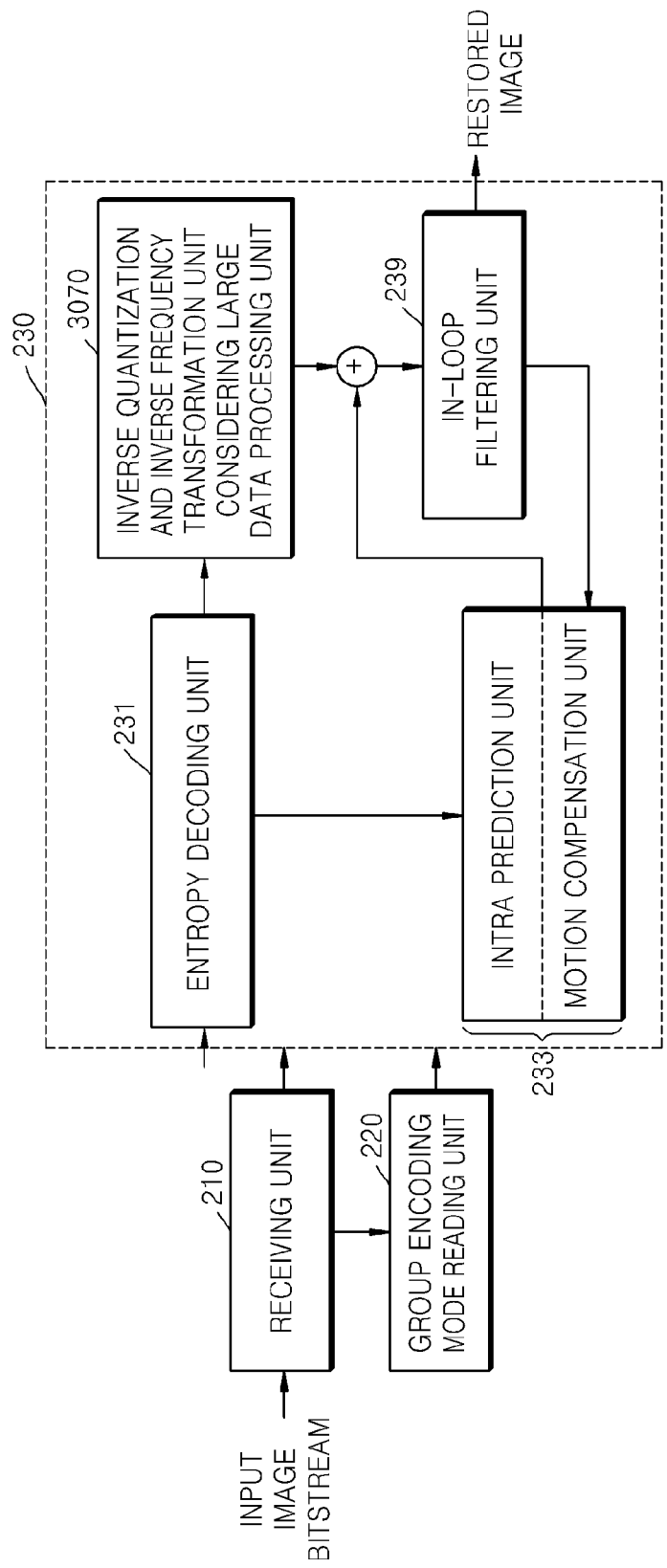

FIG. 30E is a block diagram of a case where inverse quantization and inverse frequency transformation considering a large data processing unit is applied to the group decoding unit 230 of the image decoding apparatus 200.

A fifth exemplary embodiment of the group decoding unit 230 of the image decoding apparatus 200 includes the entropy decoding unit 231, the intra prediction unit and motion compensation unit 233, an inverse quantization and inverse frequency transformation unit 3070 considering the large data processing unit, and the in-loop filtering unit 239. The inverse quantization and inverse frequency transformation unit 3070 considering the large data processing unit may perform an inverse operation of the frequency transformation and quantization according to an exemplary embodiment described above in section [IV. frequency transformation and quantization].

The inverse quantization and inverse frequency transformation unit 3070 considering the large data processing unit according to the fifth embodiment in the group decoding unit 230 may perform integer DCT and inverse quantization based on a large data processing unit, in order to perform inverse quantization and inverse frequency transformation by the large data processing unit.

The inverse quantization and inverse frequency transformation unit 3070 considering the large data processing unit according to the fifth embodiment in the group decoding unit 230 may perform inverse DCT and inverse quantization on a chroma component of the large data processing unit, in order to perform inverse frequency transformation and inverse quantization by the large data processing unit.

The inverse quantization and inverse frequency transformation unit 3070 considering the large data processing unit according to the fifth exemplary embodiment in the group decoding unit 230 may perform inverse DCT aiming at lowly complex calculation, in order to reduce the number of calculations that may increase due to the inverse DCT based on the large data processing unit.

Figure 30F:
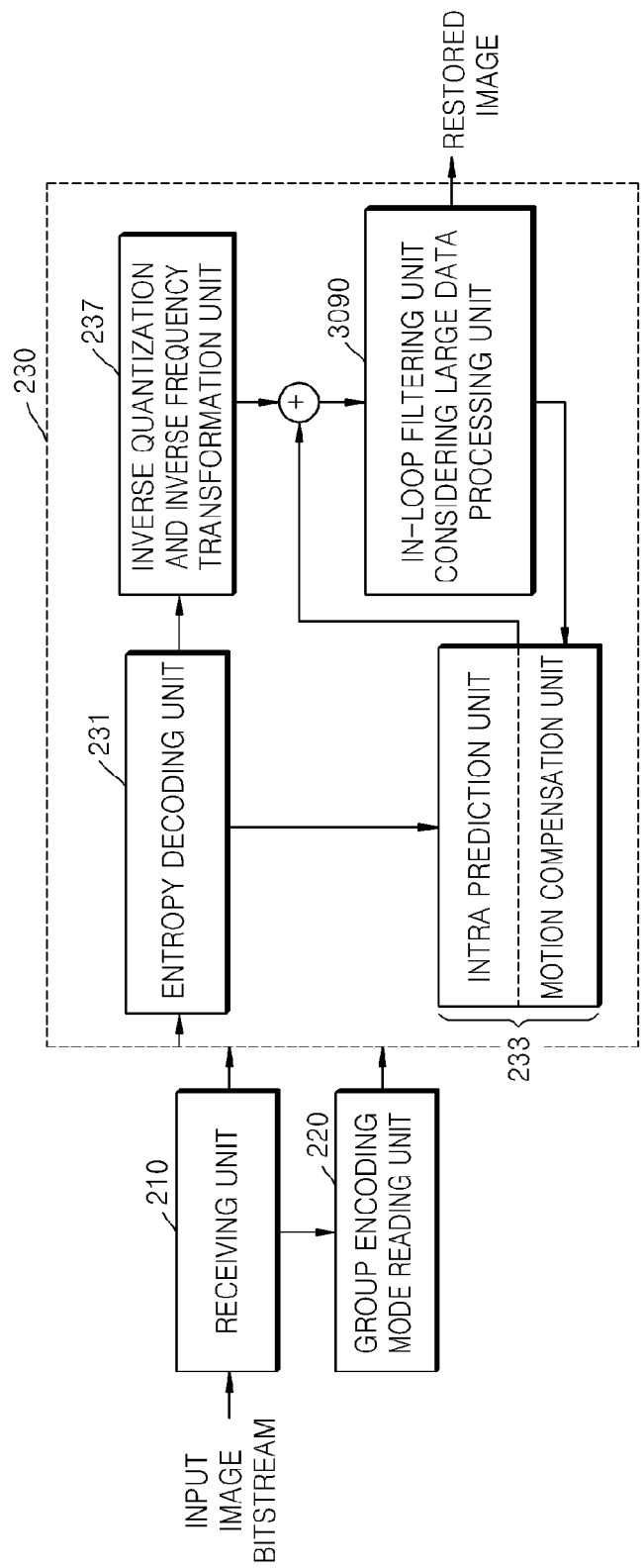

FIG. 30F is a block diagram of a case where in-loop filtering considering a large data processing unit is applied to the group decoding unit 230 of the image decoding apparatus 200.

A sixth exemplary embodiment of the group decoding unit 230 of the image decoding apparatus 200 includes the entropy decoding unit 231, the intra prediction unit and motion compensation unit 233, the inverse quantization and inverse frequency transformation unit 237, and an in-loop filtering unit 3090 considering the large data processing unit. The in-loop filtering unit 3090 considering the large data processing unit may perform an operation corresponding to the in-loop filtering according to an exemplary embodiment described above in section [V. In-loop filtering].

The in-loop filtering unit 3090 considering the large data processing unit according the sixth exemplary embodiment in the group decoding unit 230 may determine whether filtering is performed on a boundary of a lower data processing unit in a large data processing unit. The degree of in-loop filtering may be adjusted for each boundary of the lower data processing unit in the large data processing unit.

The in-loop filtering unit 3090 considering the large data processing unit according the sixth exemplary embodiment in the group decoding unit 230 may perform in-loop filtering in order to reduce the ringing effect within the large data processing unit.

In the first through sixth exemplary embodiments of the group decoding unit 230 described above with reference to FIGS. 30A through 30F, the data of a group may be decoded using a data processing unit other than existing 16×16, 8×8, and 4×4 blocks according to the read-out encoding mode. In particular, various processes by a large data processing unit may be applied to an existing image encoding and decoding format by deforming the syntax of the existing image encoding and decoding format in consideration of a large data processing unit.

VIII. Image Encoding Method and Image Decoding Method Based on Dynamically-Determined Data Processing Unit FIGS. 31A, 31B, 31C, 31D, 31E, and 31F are flowcharts of modified exemplary embodiments of the image encoding method 1800 that consider a dynamically determined data processing unit.

In operation 1810 of each of FIGS. 31A, 31B, 31C, 31D, 31E, and 31F, image data classified into basic blocks are classified in an extended concept, namely, into groups, subgroups, and basic blocks. Also, in operation 1820, information about a data processing unit and an encoding mode of a group, which are used to encode the group, are determined. The encoding mode of the group may include an encoding mode considering a large data processing unit.

In operation 1830, frequency transformation and quantization, motion prediction, in-loop filtering, and entropy encoding may be performed to encode the group. A unique process for each operation for encoding the group will now be described in detail with reference to FIGS. 31A through 31F.

Figure 31A:
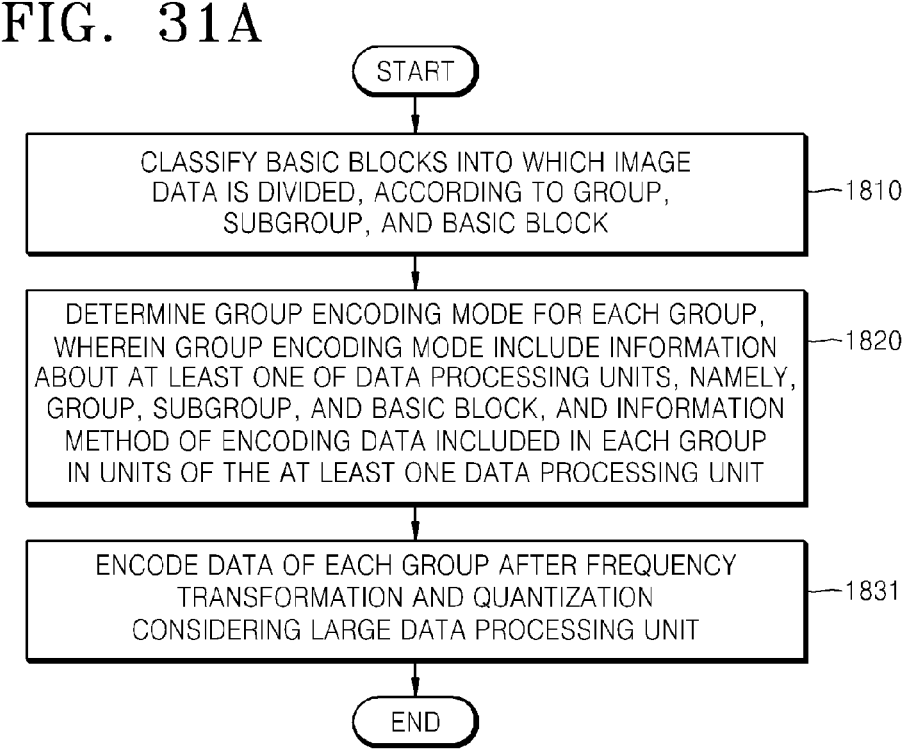

FIG. 31A is a flowchart of a case where frequency transformation and quantization considering a large data processing unit is applied to the group encoding operation 1830 of the image encoding method 1800.

In operation 1831, the data of the group is encoded via frequency transformation and quantization based on an encoding mode considering the large data processing unit. To perform the frequency transformation and quantization considering the large data processing unit, at least one selected from the group consisting of the integer DCT and quantization 2032 based on a large block, the DCT and quantization 2034 with respect to a chroma component of the large block, and the low-complexity DCT 2036 based on the large block may be performed.

Figure 31B:
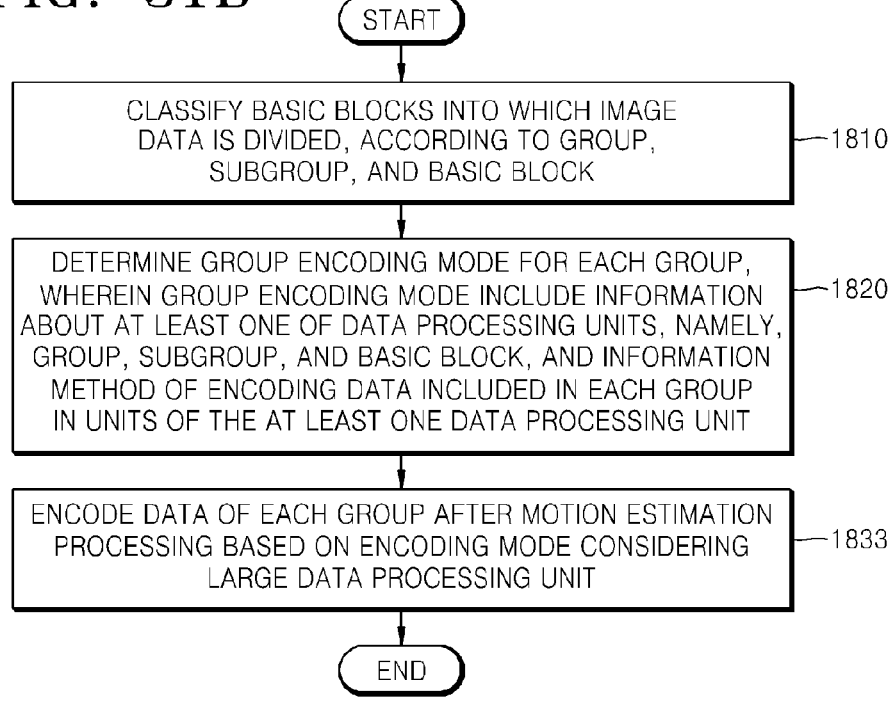

FIG. 31B is a flowchart of a case where motion estimation by a processing considering a large data processing unit is applied to the group encoding operation 1830 of the image encoding method 1800.

In operation 1833, the data of the group is encoded via motion estimation processing based on the encoding mode considering the large data processing unit. To perform the motion estimation processing considering the large data processing unit, at least one selected from the group consisting of the combination 2052 of a large block for motion estimation and a large block for frequency transformation, the block scanning method and neighbor availability 2054 for motion estimation, and the simplification mode 2056 of a hierarchical structure large block may be performed.

Figure 31C:
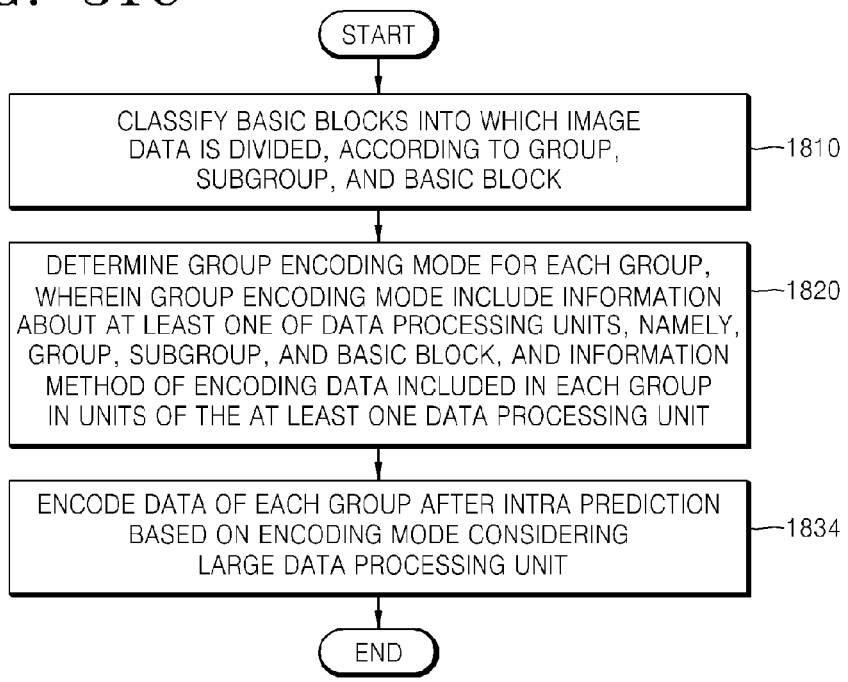

FIG. 31C is a flowchart of a case where intra prediction considering a large data processing unit is applied to the group encoding operation 1830 of the image encoding method 1800.

In operation 1834, the data of the group is encoded via intra prediction based on the encoding mode considering the large data processing unit. To perform the intra prediction considering the large data processing unit, at least one selected from the group consisting of the introduction 2062 of an intra mode based on a large block, the introduction 2064 of a complex plain for intra prediction, and the determination 2066 of a predictable intra mode may be performed.

Figure 31D:
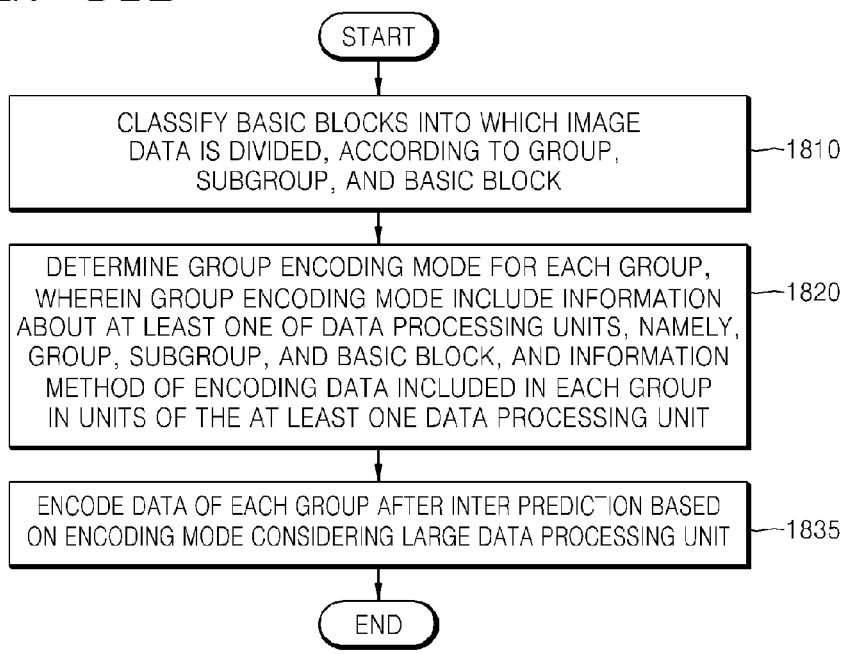

FIG. 31D is a flowchart of a case where inter prediction considering a large data processing unit is applied to the group encoding operation 1830 of the image encoding method 1800.

In operation 1835, the data of the group is encoded via inter prediction based on the encoding mode considering the large data processing unit. To perform the inter prediction considering the large data processing unit, at least one selected from the group consisting of the introduction 2072 of the prediction mode in which an intra mode and an inter mode are mixed, the operation 2074 of determining the MV of a large block and inducing an MVP, and the introduction 2076 of a new skip mode of the large group and a skip group may be performed.

FIG. 31E is a flowchart of a case where in-loop filtering considering a large data processing unit is applied to the group encoding operation 1830 of the image encoding method 1800.

In operation 1837, the data of the group is encoded via in-loop filtering based on the encoding mode considering the large data processing unit. To perform the in-loop filtering considering the large data processing unit, at least one selected from the group consisting of the determination 2082 of filtering or non-filtering of a boundary within a large block and the degree of the filtering, and the filtering 2084 for reduction of the ringing effect generated in the large block may be performed.

FIG. 31F is a flowchart of a case where entropy encoding considering a large data processing unit is applied to the group encoding operation 1830 of the image encoding method 1800.

In operation 1839, the data of the group is encoded via entropy encoding based on the encoding mode considering the large data processing unit. To perform the in-loop filtering considering the large data processing unit, at least one selected from the group consisting of the operation 2092 corresponding to introduction of a CBP for a large block and an CBP scanning method, the introduction 2094 of CABAC or CAVLC both considering the large block, and the operation 2096 corresponding to a method of setting a context for the CBP for the large block may be performed.

FIGS. 32A, 32B, 32C, 32D, 32E, and 32F are flowcharts of modified exemplary embodiments of the image decoding method 1900 that consider a dynamically determined data processing unit.

In operation 1910 of each of FIGS. 32A, 32B, 32C, 32D, 32E, and 32F, an image bitstream is received and parsed. The received image bitstream includes data obtained by encoding in units of basic blocks, groups, and subgroups. In operation 1920, a group encoding mode representing a method of encoding a group is read out. The group encoding mode may include a data processing unit of the group, and a motion prediction mode such as an intra mode, an inter mode, a skip mode, etc.

In operation 1930, entropy decoding, inverse frequency transformation and inverse quantization, motion compensation, and in-loop filtering may be performed to decode the group. A unique process for each operation for decoding the group will now be described in detail with reference to FIGS. 32A through 32F.

FIG. 32A is a flowchart of a case where entropy decoding considering a large data processing unit is applied to the group decoding operation 1930 of the image decoding method 1900.

In operation 1931, the data of the group is decoded via entropy decoding considering the large data processing unit. To perform the entropy decoding considering the large data processing unit, a CBP based on the large data processing unit may be used. In the entropy decoding considering a large data processing unit, CABAC or CAVLC may be applied to the large data processing unit.

To perform the entropy decoding considering the large data processing unit, a CBP based on the large data processing unit may be decoded using a context newly set for the CBP.

FIG. 32B is a flowchart of a case where motion compensation processing considering a large data processing unit is applied to the group decoding operation 1930 of the image decoding method 1900.

In operation 1933, the data of a group is decoded via motion prediction or compensation performed according to a process considering the large data processing unit. The data processing unit according to an embodiment may be determined by a combination of a large data processing unit for motion prediction and a data processing unit for frequency transformation. The scanning method for motion prediction for each type of data processing unit and the neighbor availability of a neighboring block, which are determined in consideration of the large data processing unit, may be used.

In the processing considering a large data processing unit for intra prediction and motion compensation according to an embodiment, the simplified encoding mode using only a square large data processing unit may be used.

Figure 32C:
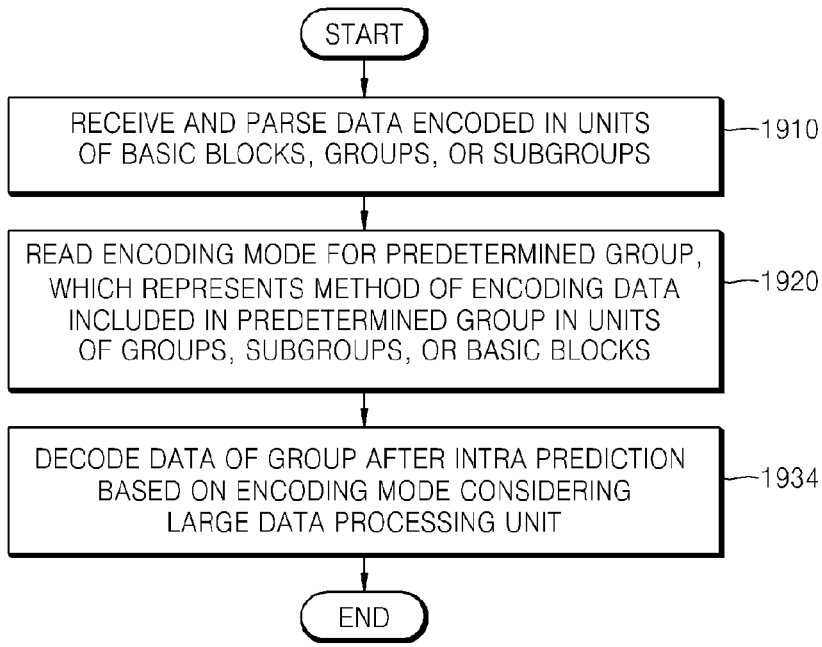

FIG. 32C is a flowchart of a case where intra prediction considering a large data processing unit is applied to the group decoding operation 1930 of the image decoding method 1900.

In operation 1934, the data of the group is decoded via intra prediction based on the encoding mode considering the large data processing unit. The intra prediction operation considering the large data processing unit may use an intra mode added for a large data processing unit. A prediction mode using a complex plain may be used into the intra mode considering the large data processing unit. The intra prediction considering the large data processing unit may be performed on only a restricted type of large data processing unit.

Figure 32D:
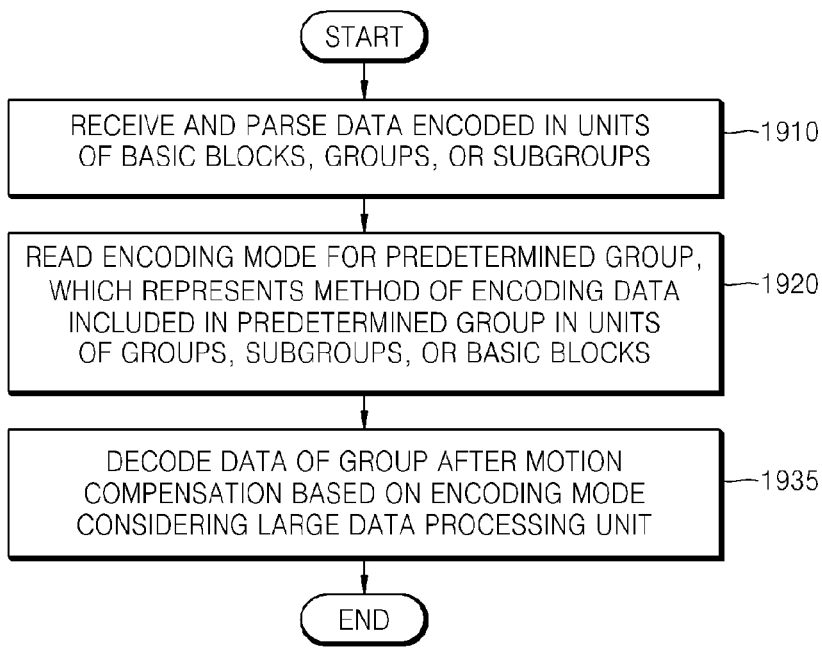

FIG. 32D is a flowchart of a case where motion compensation considering a large data processing unit is applied to the group decoding operation 1930 of the image decoding method 1900.

In operation 1935, the data of the group is decoded via motion compensation based on the encoding mode considering the large data processing unit. To perform the motion compensation considering the large data processing unit, a combination mode in which inter prediction and intra prediction can be mixed may be used as an prediction mode for the large data processing unit.

A MV and an MVP determined for each large data processing unit may be used to perform motion compensation. A new skip mode defined for each large data processing unit may be used, and skip processing may be performed in units of a skip group including data processing units of a plurality of skip modes.

Figure 32E:
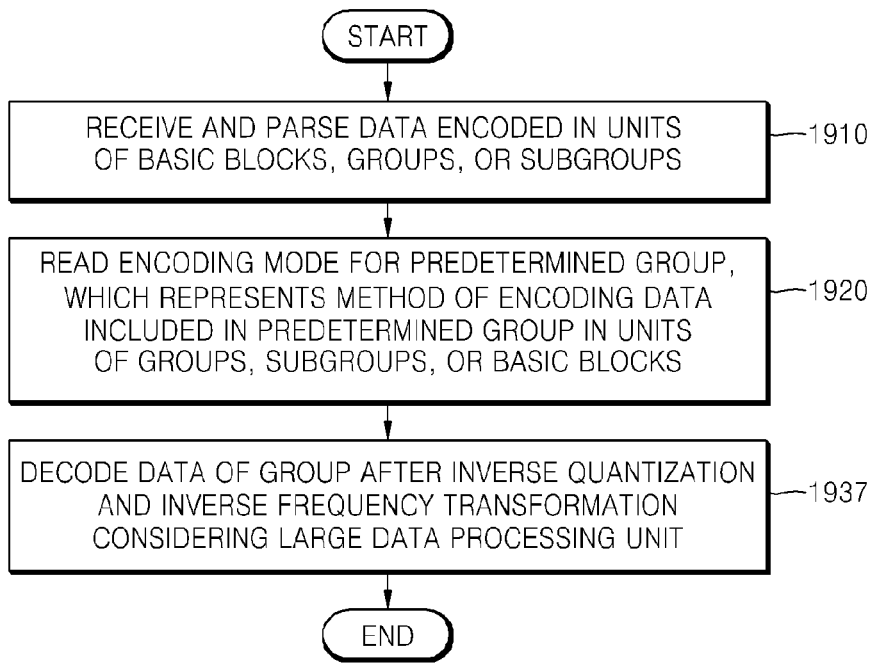

FIG. 32E is a flowchart of a case where inverse quantization and inverse frequency transformation considering a large data processing unit is applied to the group decoding operation 1930 of the image decoding method 1900.

In operation 1937, the data of the group is decoded via inverse quantization and inverse frequency transformation based on the encoding mode considering the large data processing unit.

To perform the inverse quantization and inverse frequency transformation considering the large data processing unit, integer inverse DCT and inverse quantization based on the large data processing unit may be performed. Integer inverse DCT and inverse quantization for the chroma component of a large data processing unit may be performed. Inverse DCT with low-complexity may be performed to reduce the number of calculations that may increase due to the inverse DCT based on the large data processing unit.

Figure 32F:
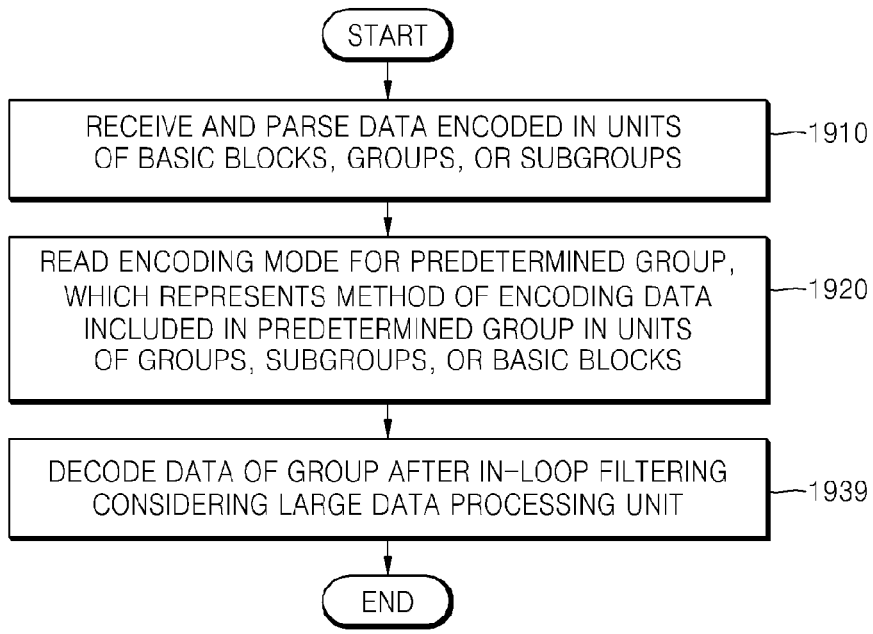

FIG. 32F is a flowchart of a case where in-loop filtering considering a large data processing unit is applied to the group decoding operation 1930 of the image decoding method 1900.

In operation 1939, the data of the group is decoded via in-loop filtering considering the large data processing unit.

To perform the in-loop filtering considering the large data processing unit, it may be determined whether a boundary of a lower data processing unit in a large data processing unit is filtered. The degree of in-loop filtering may be adjusted for each boundary of the lower data processing unit in the large data processing unit. The in-loop filtering may also be performed to reduce the ringing effect within the large data processing unit.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs). The exemplary embodiments may also be implemented as computer readable transmission media as carrier waves or signals for transmission over a network, such as the Internet.

As will be understood by the skilled artisan, the exemplary embodiments may be implemented as software or hardware components, such as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image decoding method comprising:
parsing a number indicating the number of subgroups in a group included in an image from a bitstream and a shape property of the group;
determining a size of the group based on the parsed number;
determining a plurality of subgroups from the image and determining one or more basic blocks which are hierarchically split from a subgroup among the plurality of subgroups according to information related to a hierarchical structure of a basic block;
determining a shape formed by basic blocks included in the group;
determining a data processing unit for prediction from the basic block based on information about the data processing unit for prediction from the bitstream;
determining a data processing unit for transformation split from the basic block based on information about data processing unit for transformation from the bitstream;
decoding the one or more basic blocks in the group according to a zigzag scan order,
wherein the one or more basic blocks comprises a first basic block, a second basic block, a third basic block and a fourth basic block, wherein a top left pixel of the first basic block is located at (x0, y0),
a top left pixel of the second basic block is located at (x0+S, y0),
a top left pixel of the third basic block is located at (x0, y0+S), and
a top left pixel of a fourth basic block is located at (x0+S, y0+S),
wherein S is a size of the first basic block,
wherein the zigzag scan order represents a decoding order from the first basic block, to the second basic block, to the third basic block, to the fourth basic block, and
wherein when a prediction mode is determined to be an inter prediction mode, the data processing unit for transformation may be enlarged in proportion to the data processing unit for prediction, so as to be equal to or greater than a maximum size of the data processing unit for prediction, and
when a prediction mode is determined to be an intra prediction mode, a predetermined large data processing unit is used and a size of the data processing unit for transformation in the basic block is determined to be smaller than or equal to a size of the data processing unit for prediction in the basic block.

2. The image decoding method of claim 1, wherein a size of the predetermined subgroup is set as one of 8×8, 16×16 and 32×32.

3. The image decoding method of claim 1, wherein a size of each of the one or more basic blocks is set as one of 8×8, 16×16 and 32×32.

4. The image decoding method of claim 1, wherein the decoding the one or more basic blocks comprises:
when the top left pixel of second basic block deviates from a boundary of the image data and the top left pixel of first basic block and the top left pixel of the third basic block remain within the boundary of the image data, decoding the third basic block after the decoding of the first basic block, without decoding the second basic block.

5. The image decoding method of claim 1, further comprising:
parsing a coded block pattern from the bitstream;
performing inverse-transformation on the data processing unit for transformation based on the coded block pattern.

6. The image decoding method of claim 5 further comprising:
when the coded block pattern is '1', performing inverse-transformation on the data processing unit for transformation.

* * * * *